US011252361B2

United States Patent
Miyatani

(10) Patent No.: US 11,252,361 B2
(45) Date of Patent: Feb. 15, 2022

(54) IMAGING ELEMENT, IMAGING DEVICE, AND INFORMATION PROCESSING METHOD WITH IMAGE RESTORATION PIXELS AND UNIDIRECTIONAL PIXEL

(71) Applicant: Sony Group Corporation, Tokyo (JP)

(72) Inventor: Yoshitaka Miyatani, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/981,558

(22) PCT Filed: Mar. 26, 2019

(86) PCT No.: PCT/JP2019/012722
§ 371 (c)(1),
(2) Date: Sep. 16, 2020

(87) PCT Pub. No.: WO2019/189099
PCT Pub. Date: Oct. 3, 2019

(65) Prior Publication Data
US 2021/0306582 A1    Sep. 30, 2021

(30) Foreign Application Priority Data
Mar. 26, 2018  (JP) .............................. JP2018-057581

(51) Int. Cl.
*H04N 5/369*  (2011.01)
(52) U.S. Cl.
CPC ................................ *H04N 5/3696* (2013.01)
(58) Field of Classification Search
CPC .................................................. H04N 5/3696
See application file for complete search history.

(56) References Cited

U.S. PATENT DOCUMENTS

2004/0218714 A1    11/2004   Faust
2005/0052561 A1    3/2005    Altice, Jr. et al.
(Continued)

FOREIGN PATENT DOCUMENTS

EP         3487165 A1    5/2019
JP         2014-026062 A  2/2014
(Continued)

OTHER PUBLICATIONS

Extended European Search Report dated Mar. 3, 2021 for corresponding European Application No. 19776752.8.
(Continued)

*Primary Examiner* — Padma Haliyur
(74) *Attorney, Agent, or Firm* — Michael Best & Friedrich LLP

(57) ABSTRACT

An imaging element, an imaging device, and an information processing method are disclosed. In one example, an imaging element includes pixel output units configured for independently setting incident angle directivity for incident light incident through both of an imaging lens and a pinhole. The pixel output units include image restoration pixel output units arranged in a matrix, at least some of the pixel output units having the incident angle directivity both in a row direction and in a column direction of the matrix, and a unidirectional pixel output unit having the incident angle directivity only in the row direction of the matrix or only in the column direction of the matrix.

25 Claims, 39 Drawing Sheets

(56) References Cited

U.S. PATENT DOCUMENTS

| | | | |
|---|---|---|---|
| 2005/0253947 A1 | 11/2005 | Kim et al. | |
| 2009/0020687 A1 | 1/2009 | Lehmann et al. | |
| 2014/0267818 A1 | 9/2014 | Perlman | |
| 2014/0368618 A1* | 12/2014 | Ushinaga | H04N 13/207 348/49 |
| 2015/0219808 A1 | 8/2015 | Gill et al. | |
| 2017/0104942 A1* | 4/2017 | Hirota | H01L 27/14621 |
| 2018/0166487 A1* | 6/2018 | Noudo | H01L 27/14621 |
| 2019/0215473 A1* | 7/2019 | Miyatani | G02B 5/00 |
| 2019/0313018 A1* | 10/2019 | Ono | G02B 3/08 |

FOREIGN PATENT DOCUMENTS

| | | |
|---|---|---|
| JP | 2016-510910 A | 4/2016 |
| WO | 2016/123529 A1 | 8/2016 |
| WO | 2018/012492 A1 | 1/2018 |

OTHER PUBLICATIONS

M. Salman Asif et al., "FlatCam: Thin,Bare-Sensor Cameras using Coded Aperture and Computation", Aug. 31, 2015 (Aug. 31, 2015), XP055250990, Retrieved from the Internet: URL:http://arxiv.org/pdf/1509.00116v2.pdf, [retrieved on Feb. 17, 2016].

M. Salman Asif et al., "FlatCam: Replacing Lenses with Masks and Computation", 2015 IEEE International Conference on Computer Vision Workshop (ICCVW). IEEE, Dec. 7, 2015 (Dec. 7, 2015), pp. 663-666, XP032865019, DOI: 10.1109/ICCVW.2015.89 [retrieved on Feb. 11, 2016].

* cited by examiner

IMAGING ELEMENT, IMAGING DEVICE, AND INFORMATION PROCESSING METHOD WITH IMAGE RESTORATION PIXELS AND UNIDIRECTIONAL PIXEL

TECHNICAL FIELD

The present technology relates to an imaging element, an imaging device, and an information processing method, and more particularly to an imaging element, an imaging device, and an information processing method capable of generating a more accurate restored image.

BACKGROUND ART

Conventionally, an imaging element is typically used in combination with an imaging lens that focuses light on the imaging element. The imaging lens guides light from an object plane to each pixel of the imaging element so as to reproduce light intensity distribution on the object plane, so that the imaging element can obtain a detection signal at a level corresponding to the light intensity distribution in each pixel and can obtain a captured image of the object as a whole.

However, in this case, the physical size increases. Therefore, imaging elements without using an imaging lens have been conceived (see, for example, Patent Documents 1 to 3 and Non-Patent Document 1). A detection image is generated in such an imaging element. A restored image is restored by solving multidimensional simultaneous linear equations (performing a matrix operation) using the detection image and a restoration matrix according to characteristics of the imaging element. This restoration matrix is generated on the basis of, for example, design values of an imaging element, and the like. Ideally, a correct restored image can be restored using a correct restoration matrix.

CITATION LIST

Patent Document

Patent Document 1: International Publication No. 2016/123529
Patent Document 2: PCT Japanese Translation Patent Publication No. 2016-510910
Patent Document 3: International Publication No. 2018/012492

Non-Patent Document

Non-Patent Document 1: M. Salman Asif and four others, "Flatcam: Replacing lenses with masks and computation", "2015 IEEE International Conference on Computer Vision Workshop (ICCVW)", 2015, pages 663-666

SUMMARY OF THE INVENTION

Problems to be Solved by the Invention

However, in reality, the characteristics of the imaging element may have a gap from design values due to individual differences during manufacturing. That is, there is a possibility that a correct restored image cannot be obtained because the restored image is restored using a restoration matrix that does not correspond to (has a gap from) the actual characteristics.

The present disclosure has been made in view of such circumstances and is to enable generation of a more accurate restored image.

Solutions to Problems

An imaging element according to one aspect of the present technology is an imaging element including a plurality of pixel output units each having a configuration capable of independently setting incident angle directivity for incident light incident without through both of an imaging lens and a pinhole, in which the plurality of pixel output units includes a plurality of image restoration pixel output units arranged in a matrix, at least some of the pixel output units having the incident angle directivity both in a row direction and in a column direction of the matrix, and a unidirectional pixel output unit having the incident angle directivity only in the row direction of the matrix or only in the column direction of the matrix.

An imaging device according to another aspect of the present technology is an imaging device including an imaging element including a plurality of pixel output units each having a configuration capable of independently setting incident angle directivity for incident light incident without through both of an imaging lens and a pinhole, the plurality of pixel output units including a plurality of image restoration pixel output units arranged in a matrix, at least some of the pixel output units having the incident angle directivity both in a row direction and in a column direction of the matrix, and a unidirectional pixel output unit having the incident angle directivity only in the row direction of the matrix or only in the column direction of the matrix; and a generation unit configured to generate, using an output of the unidirectional pixel output unit, a restoration matrix to be used when generating a restored image from a detection image that is an output of the plurality of image restoration pixel output units.

An information processing method according to still another aspect of the present technology is an information processing method including generating a restoration matrix to be used when generating a restored image from a detection image that is an output of a plurality of image restoration pixel output units, using an output of a unidirectional pixel output unit, of an imaging element including a plurality of pixel output units each having a configuration capable of independently setting incident angle directivity for incident light incident without through both of an imaging lens and a pinhole, the plurality of pixel output units including the plurality of image restoration pixel output units arranged in a matrix, at least some of the pixel output units having the incident angle directivity both in a row direction and in a column direction of the matrix, and the unidirectional pixel output unit having the incident angle directivity only in the row direction of the matrix or only in the column direction of the matrix.

The imaging element according to one aspect of the present technology includes a plurality of pixel output units each having a configuration capable of independently setting incident angle directivity for incident light incident without through both of an imaging lens and a pinhole, and the plurality of pixel output units includes a plurality of image restoration pixel output units arranged in a matrix, at least some of the pixel output units having the incident angle directivity both in a row direction and in a column direction of the matrix, and a unidirectional pixel output unit having the incident angle directivity only in the row direction of the matrix or only in the column direction of the matrix.

The imaging device according to another aspect of the present technology includes an imaging element including a plurality of pixel output units each having a configuration capable of independently setting incident angle directivity for incident light incident without through both of an imaging lens and a pinhole, the plurality of pixel output units including a plurality of image restoration pixel output units arranged in a matrix, at least some of the pixel output units having the incident angle directivity both in a row direction and in a column direction of the matrix, and a unidirectional pixel output unit having the incident angle directivity only in the row direction of the matrix or only in the column direction of the matrix; and a generation unit configured to generate, using an output of the unidirectional pixel output unit, a restoration matrix to be used when generating a restored image from a detection image that is an output of the plurality of image restoration pixel output units.

In the information processing method according to still another aspect of the present technology, a restoration matrix to be used when generating a restored image from a detection image that is an output of a plurality of image restoration pixel output units is generated using an imaging element including a plurality of pixel output units each having a configuration capable of independently setting incident angle directivity for incident light incident without through both of an imaging lens and a pinhole, the plurality of pixel output units including the plurality of image restoration pixel output units arranged in a matrix, at least some of the pixel output units having the incident angle directivity both in a row direction and in a column direction of the matrix, and a unidirectional pixel output unit having the incident angle directivity only in the row direction of the matrix or only in the column direction of the matrix, and using an output of the unidirectional pixel output unit.

Effects of the Invention

According to the present technology, an image of an object can be captured or information can be processed. Furthermore, according to the present technology, a more accurate restored image can be generated.

MODE FOR CARRYING OUT THE INVENTION

Figure 1:
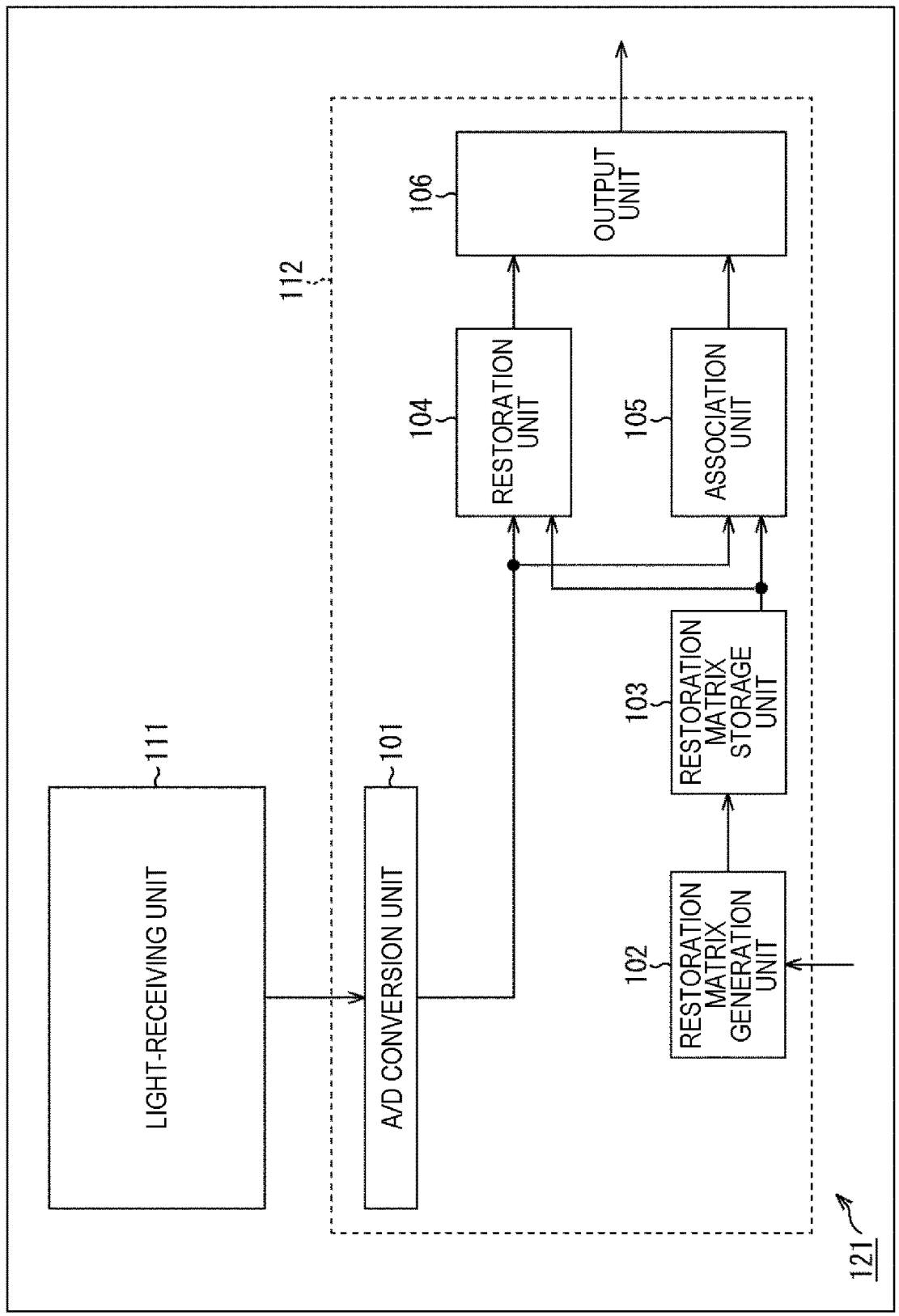
FIG. 1 is a diagram for describing principles of imaging in an imaging device to which the technology of the present disclosure is applied.

Hereinafter, modes for implementing the present disclosure (hereinafter referred to as embodiments) will be described. Note that the description will be given in the following order.

1. Imaging Element Calibration
2. First Embodiment (Imaging Element)
3. Second Embodiment (Imaging Device)
4. Third Embodiment (Imaging Device)
5. Fourth Embodiment (Calibration System)
6. Appendix

1. Imaging Element Calibration

<Imaging Element Calibration>

Conventionally, an imaging element is typically used in combination with an imaging lens that focuses light on the imaging element. The imaging lens guides light from an object plane to each pixel of the imaging element so as to reproduce light intensity distribution on the object plane, so that the imaging element can obtain a detection signal at a level corresponding to the light intensity distribution in each pixel and can obtain a captured image of the object as a whole. However, in this case, the physical size increases.

Therefore, for example, imaging elements not using an imaging lens (also referred to as imaging lens-free imaging elements) as described in Patent Document 1, Patent Document 2, and Non-Patent Document 1 have been conceived. A detection image is generated in such an imaging lens-free imaging element. A restored image is restored by solving multidimensional simultaneous linear equations (performing a matrix operation) using the detection image and a restoration matrix according to characteristics of the imaging element. This restoration matrix is generated on the basis of, for example, design values of an imaging element, and the like. Ideally, a correct restored image can be restored using a correct restoration matrix.

However, in reality, the characteristics (incident angle directivity and the like) of the imaging element may have a gap from the design values due to individual differences during manufacturing. That is, there is a possibility that a correct restored image cannot be obtained because the restored image is restored using a restoration matrix that does not correspond to (has a gap from) the actual characteristics.

Therefore, an imaging element including a plurality of pixel output units each having a configuration capable of independently setting incident angle directivity for incident light entering without passing through both of an imaging lens and a pinhole, the plurality of pixel output units including a plurality of image restoration pixel output units arranged in a matrix, at least a part of the pixel output units having the incident angle directivity both in a row direction and in a column direction of the matrix, and a unidirectional pixel output unit having the incident angle directivity only in the row direction of the matrix or only in the column direction of the matrix, is used.

By doing so, characteristics of the restoration matrix can be more accurately and more easily calibrated. That is, calibration can be performed to reduce a difference between the actual characteristics of the imaging element and the characteristics corresponding to the restoration matrix. In other words, it is possible to generate a restoration matrix further corresponding to the characteristics of the actual imaging element and generate a restored image using the restoration matrix. Therefore, a more accurate restored image can be generated.

2. First Embodiment

<Imaging Element>

FIG. 1 is a block diagram illustrating a main configuration example of an imaging element to which the present technology as described above is applied. An imaging element 121 illustrated in FIG. 1 is configured to perform processing regarding imaging of an object. For example, the imaging element 121 captures an image of the object and obtains data (electronic data) regarding the captured image. At this time, the imaging element 121 can capture an image of the object without an imaging lens, an optical filter such as a diffraction grating, or a pinhole, and can obtain the data regarding the captured image. For example, the imaging element 121 captures an image of the object and obtains data (detection signal or the like) from which data of the captured image can be obtained by a predetermined operation.

Note that, in the present specification, the captured image is an image configured using pixel values for forming an object image and visually recognizable by a user. On the other hand, an image (called detection image) configured using the detection signal that is a detection result of incident light at a pixel unit output of the imaging element 121 is an image that cannot be visually recognized by the user as an image (that is, an image from which the object cannot be visually recognized) because the object image is not formed. That is, the detection image is an image different from the captured image. However, by performing a predetermined operation for data of the detection image, as described above, the captured image, that is, an image in which the object image is formed and visually recognizable as an image by the user (that is, an image from which the object can be visually recognized) can be restored. This restored captured image is referred to as a restored image. That is, the detection image is an image different from the restored image.

Furthermore, in the present specification, an image configuring the restored image and before synchronization processing, color separation processing, and the like (for example, demosaic processing) is also referred to as a raw image. This raw image is also an image visually recognizable by the user as an image (that is, the object can be visually recognized), similarly to the captured image. In other words, the detection image is an image according to a color filter array but is an image different from a raw image.

However, in the case where the imaging element 121 has sensitivity only to invisible light such as infrared light or ultraviolet light, the restored image (raw image or captured image) may be an image that cannot be visually recognized by the user as an image (an image from which the object cannot be visually recognized). Note that the above case depends on a wavelength range of detected light. Therefore, the restored image can be made to an image from which the object can be visually recognized by converting the wavelength range into a visible light range. In contrast, since the object image is not formed in the detection image, the object image cannot be made to an image from which the object can be visually recognized only by converting the wavelength range. Therefore, even in the case where the imaging element 121 has sensitivity only to invisible light, an image obtained by performing a predetermined operation for the detection image as described above is referred to as a restored image. Note that, hereinafter, the present technology will be basically described using an example in which the imaging element 121 receives visible light unless otherwise specified.

That is, the imaging element 121 can capture the image of the object and obtain data regarding the detection image.

Such an imaging element 121 includes a plurality of pixel output units each having a configuration capable of independently setting incident angle directivity for incident light entering without passing through both of an imaging lens and a pinhole, and the plurality of pixel output units includes a plurality of image restoration pixel output units arranged in a matrix, at least a part of the pixel output units having the incident angle directivity both in a row direction and in a column direction of the matrix, and a unidirectional pixel output unit having the incident angle directivity only in the row direction of the matrix or only in the column direction of the matrix.

By using such an imaging element 121, calibration of the restoration matrix becomes possible, and a more accurate restored image can be generated.

As illustrated in FIG. 1, the imaging element 121 includes a light-receiving unit 111 and the other processing unit 112. The light-receiving unit 111 and the other processing unit 112 may be formed on the same semiconductor substrate or may be formed on different semiconductor substrates. For example, the semiconductor substrate on which the light-receiving unit 111 is formed and the semiconductor substrate on which the other processing unit 112 is formed may be stacked.

The light-receiving unit 111 includes a pixel matrix including a plurality of pixels (pixel output units), and in each pixel, receives light from the object and photoelectrically converts the light, accumulates electric charges according to the incident light, and outputs the electric charge as a detection signal at predetermined timing (outputs a detection image of an analog signal).

As illustrated in FIG. 1, the other processing unit 112 includes an A/D conversion unit 101, a restoration matrix generation unit 102, a restoration matrix storage unit 103, a restoration unit 104, an association unit 105, and an output unit 106.

The A/D conversion unit 101 is configured to perform processing regarding A/D conversion of a signal. For example, the A/D conversion unit 101 performs A/D conversion for the detection signal (detection image) of the analog signal output from the light-receiving unit 111, and supplies the converted detection signal to the restoration unit 104 and the association unit 105 as a detection signal (detection image) of digital data.

Note that the configuration of the A/D conversion unit 101 is arbitrary. For example, the A/D conversion unit 101 may be configured by one A/D conversion unit and may perform A/D conversion for the detection signals of all of pixels of the light-receiving unit 111, using the one A/D conversion unit. Furthermore, for example, the A/D conversion unit 101 may include an A/D conversion unit for each column or each row of the pixel matrix of the light-receiving unit 111, and perform A/D conversion for the detection signals read from pixels in each column or each row, using the A/D conversion unit of the each column or the each row. Furthermore, for example, the A/D conversion unit 101 may include an A/D conversion unit for each area of the pixel matrix of the light-receiving unit 111, and perform A/D conversion for the detection signals read from pixels in each area, using the A/D conversion unit of the each area. Furthermore, for example, the A/D conversion unit 101 may include an A/D conversion unit for each pixel of the light-receiving unit 111, and perform A/D conversion for the detection signal read from each pixel, using the A/D conversion unit of the each pixel.

The restoration matrix generation unit 102 is configured to perform processing regarding generation (calibration) of the restoration matrix. For example, the restoration matrix generation unit 102 generates (calibrates) the restoration matrix, using information (hereinafter also referred to as calibration information) regarding calibration of incident angle directivity of each pixel of the imaging element 121. The restoration matrix generation unit 102 supplies the generated restoration matrix to the restoration matrix storage unit 103.

Note that the calibration information is supplied from an outside of the imaging element 121, for example. Furthermore, the calibration information includes, for example, information directly or indirectly indicating a gap between the actual incident angle directivity of the imaging element 121 and its design value.

Furthermore, the method of generating the restoration matrix is arbitrary. For example, the restoration matrix generation unit 102 may acquire the calibration information indicating the actual incident angle directivity (a detection signal level according to an incident angle of incident light) of each pixel of the imaging element 121, and generate the restoration matrix corresponding to the actual incident angle directivity of the imaging element 121 on the basis of the calibration information. Furthermore, for example, the restoration matrix generation unit 102 may acquire the calibration information indicating the gap between the actual incident angle directivity (the detection signal level according to an incident angle of incident light) of each pixel of the imaging element 121 and the design value, and calibrate the restoration matrix corresponding to the design value on the basis of the calibration information to generate the restoration matrix corresponding to the actual incident angle directivity of the imaging element 121.

Furthermore, the restoration matrix generation unit 102 may read the restoration matrix stored in the restoration matrix storage unit 103 and calibrate (update) the generated restoration matrix with the read restoration matrix on the basis of the calibration information. In that case, the restoration matrix generation unit 102 supplies the updated restoration matrix to the restoration matrix storage unit 103.

The restoration matrix storage unit 103 includes a storage medium (not illustrated) and performs processing regarding storage of the restoration matrix. This storage medium is arbitrary and may be, for example, a hard disk or a semiconductor memory. The restoration matrix storage unit 103 acquires the restoration matrix supplied from the restoration matrix generation unit 102 and stores (retains) the restoration matrix in the storage medium. Note that, in the case where the restoration matrix storage unit 103 has already stored the restoration matrix in the storage medium, the restoration matrix storage unit 103 may overwrite (update) the stored restoration matrix with the restoration matrix supplied from the restoration matrix generation unit 102. Furthermore, the restoration matrix storage unit 103 reads the restoration matrix stored in the storage medium as necessary (for example, at predetermined timing or in response to a request), and supplies the read restoration matrix to the restoration unit 104 or the association unit 105, or both of the restoration unit 104 and the association unit 105.

The restoration unit 104 is configured to perform processing regarding generation of a restored image. For example, the restoration unit 104 acquires the restoration matrix supplied from the restoration matrix storage unit 103 and performs a predetermined operation using the restoration matrix, for the detection image (detection signal) supplied from the A/D conversion unit 101, thereby generating the restored image. That is, the restoration unit 104 generates the restored image, using the restoration matrix calibrated so as to correspond to the actual incident angle directivity. The restoration unit 104 supplies the generated restored image (correctly restored image) to the output unit 106 as output data. Note that the restoration unit 104 may apply arbitrary image processing such as gamma correction (γ correction) and white balance control to the restored image. Furthermore, the restoration unit 104 may convert a format of data of the restored image or compress the data of the restored image by a predetermined compression method such as the Joint Photographic Experts Group (JPEG), Tagged Image File Format (TIFF), or Graphics Interchange Format (GIF).

The association unit 105 is configured to perform processing regarding data association. For example, the association unit 105 acquires the detection image (detection signal) supplied from the A/D conversion unit 101. Furthermore, the association unit 105 acquires the restoration matrix supplied from the restoration matrix storage unit 103. Moreover, the association unit 105 associates the detection image with the restoration matrix. The association unit 105 supplies the associated data (detection image and restoration matrix) to the output unit 106 as output data.

Here, the term "associate" means, for example, making one information usable (linkable) when processing the other information (data, commands, programs, and the like). That is, pieces of information associated with each other may be collected as one file or may be individual information. For example, information B associated with information A may be transmitted on a different transmission path from the information A. Furthermore, for example, information B associated with information A may be recorded on a different recording medium (or another recording area of the same recording medium) from the information A. Note that this "association" may be a part of information instead of entire information. For example, an image and information corresponding to the image may be associated with each other in an arbitrary unit such as a plurality of frames, one frame, or a part in a frame.

More specifically, for example, actions such as assigning the same ID (identification information) to a plurality of pieces of information, recording a plurality of pieces of information to the same recording medium, storing a plurality of pieces of information in the same folder, storing a plurality of pieces of information in the same file (assigning one to the other as metadata), embedding a plurality of pieces of information in the same stream, for example, embedding metadata in an image like a digital watermark are included in the "associate".

The output unit 106 outputs the output data (restored image) supplied from the restoration unit 104 or the output data (detection image and restoration matrix) supplied from the association unit 105 to the outside of the imaging element 121.

Note that either one of the restoration unit 104 or the association unit 105 may be omitted. That is, only one of the restoration unit 104 and the association unit 105 may be formed in the imaging element 121.

<Imaging Element>

Next, the imaging element 121 will be described with reference to FIGS. 2 to 20.

<Pixel and Pixel Output Unit>

In the present specification, the present technology will be described using the term "pixel" (or "pixel output unit"). In the present specification, the "pixel" (or "pixel output unit") refers to a division unit including at least one physical configuration capable of receiving incident light of the imaging element 121 independently of the other pixels, in a region (also referred to as pixel region) where the physical configuration for receiving light is formed. The physical configuration capable of receiving light is, for example, a photoelectric conversion element, and is, for example, a photodiode (PD). The number of physical configurations (for example, photodiodes) formed in one pixel is arbitrary and may be one or plural. The type, size, shape, and the like are also arbitrary.

Furthermore, the physical configuration in units of "pixels" includes not only the above-described "physical configuration capable of receiving light" but also all physical configurations regarding receiving incident light, such as an on-chip lens, a light-shielding film, a color filter, a flattening film, and an anti-reflection film. Moreover, a configuration such as a readout circuit may be included. That is, the physical configuration in pixel units may be any configuration.

Furthermore, the detection signal read from the "pixel" (that is, the physical configuration in pixel units) may be referred to as "a detection signal in pixel units (or in pixel output units)" or the like. Moreover, the detection signal in pixel units (or in pixel output units) is also referred to as "pixel unit detection signal (or pixel output unit detection signal)". Furthermore, the pixel unit detection signal is also referred to as "pixel output". Moreover, a value of the pixel output is also referred to as "output pixel value".

The imaging element 121 includes a plurality of the pixel output units each configured to receive incident light incident without through both of an imaging lens and a pinhole, and output one detection signal indicating an output pixel value modulated according to an incident angle of the incident light. Therefore, the value (output pixel value) of the detection signal in pixel units of the imaging element 121 can have incident angle directivity indicating directivity with respect to the incident angle of the incident light from the object independently of the others. For example, each pixel unit (pixel output unit) of the imaging element 121 may have a configuration capable of independently setting the incident angle directivity of the output pixel value, the incident angle directivity indicating directivity with respect to the incident angle of the incident light from the object. In other words, in the imaging element 121, the incident angle directivities of the output pixel values of at least two pixel units can be made different from each other.

Note that, as described above, the number of "physical configurations that can receive light" included in the "pixel (or pixel output unit)" is arbitrary. Therefore, the pixel unit detection signal may be a detection signal obtained by a single "physical configuration capable of receiving light" or may be a detection signal obtained by a plurality of the "physical configurations capable of receiving light".

Furthermore, a plurality of the pixel unit detection signals (output pixel values) can be combined into one signal (one value) in an arbitrary stage. For example, the output pixel values of a plurality of pixels may be added in a state of an analog signal or may be converted into a digital signal and then added.

Furthermore, after the detection signal is read from the imaging element 121, that is, in the detection image, a plurality of the detection signals can be combined into a single signal, or a single detection signal can be divided into a plurality of detection signals. That is, the resolution (the number of data) of the detection image is variable. For example, to improve sensitivity, the detection signals of a plurality of pixels having the same incident angle directivity can be added together.

By the way, hereinafter, description will be given on the assumption that the imaging element 121 includes a pixel region where a plurality of pixels is arranged in a matrix (a pixel array is formed) unless otherwise specified, for convenience of description. Note that an array pattern of pixels (or pixel output units) of the imaging element 121 is arbitrary and is not limited to this example. For example, the pixels (or pixel output units) may be arranged in a honeycomb manner. Furthermore, for example, the pixels (or pixel output units) may be arranged in one row (or one column). That is, the imaging element 121 may be a line sensor.

Note that the wavelength range in which (the pixels of) the imaging element 121 has sensitivity is arbitrary. For example, (the pixels of) the imaging element 121 may have sensitivity to visible light, may have sensitivity to invisible light such as infrared light or ultraviolet light, or may have sensitivity to both the visible light and invisible light. For example, in a case where the imaging element detects far-infrared light that is invisible light, a thermograph (an image representing heat distribution) can be generated using a captured image obtained by the imaging element. However, in the case of the imaging element with an imaging lens, glass is difficult to transmit far-infrared light. Therefore, an expensive imaging lens formed using a special material is required, which may increase a manufacturing cost. Since the imaging element 121 can capture an image of the object without through an imaging lens or the like and obtain data regarding the captured image, the pixels of the imaging element 121 are made able to detect far-infrared light, thereby suppressing an increase in manufacturing cost. That is, an image of far-infrared light can be captured at a lower cost (a thermograph can be obtained at a lower cost). In other words, the restored image may be an image of visible light or an image of invisible light (for example, (far) infrared light or ultraviolet light).

<Incident Angle Directivity>

As described above, the imaging element 121 can obtain detection signals for a plurality of pixel output units (a plurality of pixel output unit detection signals). Then, the incident angle directivities of at least two pixel output unit detection signals can be made different from each other.

Here, the "incident angle directivity" refers to a light-receiving sensitivity characteristic according to the incident angle of the incident light, that is, detection sensitivity to the incident angle of the incident light. For example, there are some cases where the detection sensitivity varies depending on the incident angle even if the incident light has the same light intensity. Such deviation of the detection sensitivity (including a case where there is no deviation) is referred to as "incident angle directivity".

For example, when incident lights having the same light intensity enter the physical configurations of two pixel output units at the same incident angle, signal levels (detection signal levels) of the detection signals of the pixel output units may be different values from each other depending on the incident angle directivities. (Each pixel output unit of) the imaging element 121 has a physical configuration having such characteristics.

The incident angle directivity may be implemented by any method. For example, the incident angle directivity may be implemented by providing a light-shielding film in front of (on the light incident side of) a photoelectric conversion element (photodiode or the like) of an imaging element having a basic structure similar to a typical imaging element such as a complementary metal oxide semiconductor (CMOS) image sensor.

When an image is captured only by a typical imaging element including pixels having the same incident angle directivity, light with approximately the same light intensity enters all the pixels of the imaging element, and a formed image of the object cannot be obtained. Therefore, generally, an imaging lens or a pinhole is provided in front of the imaging element (on the light incident side). For example, by providing an imaging lens, light from the object plane can be formed on an imaging plane of the imaging element. Therefore, the imaging element can obtain a detection signal at a level corresponding to the formed image of the object at each pixel (that is, the imaging element can obtain the formed captured image of the object). However, in this case, the size physically becomes large, and it may be difficult to reduce the size of the device. Furthermore, in the case of providing a pinhole, the size can be reduced as compared with the case of providing an imaging lens. However, since the amount of light entering the imaging element is reduced, measures such as making an exposure time long or increasing a gain are indispensable, and blurring tends to occur in capturing an image of the object at a high speed or natural color expression may not be able to be achieved.

In contrast, the imaging element 121 includes a plurality of the pixel output units each configured to receive incident light incident without through both of an imaging lens and a pinhole, and output one detection signal indicating an output pixel value modulated according to an incident angle of the incident light. Note that the incident angle directivities of the pixel output units may be made different from each other (the light-receiving sensitivity characteristic according to the incident angle of the incident light may differ for each pixel output unit), some pixels may have the same light-receiving sensitivity characteristic, or some pixels may have different light-receiving sensitivity characteristics For example, in FIG. 2, assuming that a light source forming an object plane 131 is a point light source, light beams with the same light intensity emitted from the same point light source enter all the pixels but the light beams are incident at a different incident angle for each pixel in the imaging element 121. Then, since the pixels of the imaging element 121 have different incident angle directivities, the pixels detect the light beams with the same light intensity, with different sensitivities. That is, a detection signal at a different signal level is detected for each pixel.

More specifically, the sensitivity characteristic according to the incident angle of the incident light received by each pixel of the imaging element 121, that is, the incident angle directivity according to the incident angle in each pixel is expressed by a coefficient representing the light-receiving sensitivity according to the incident angle, and the signal level (also referred to as detection signal level) of the detection signal according to the incident light in each pixel is obtained by multiplying the light intensity by the coefficient set corresponding to the light-receiving sensitivity according to the incident angle of the incident light.

Figure 2:
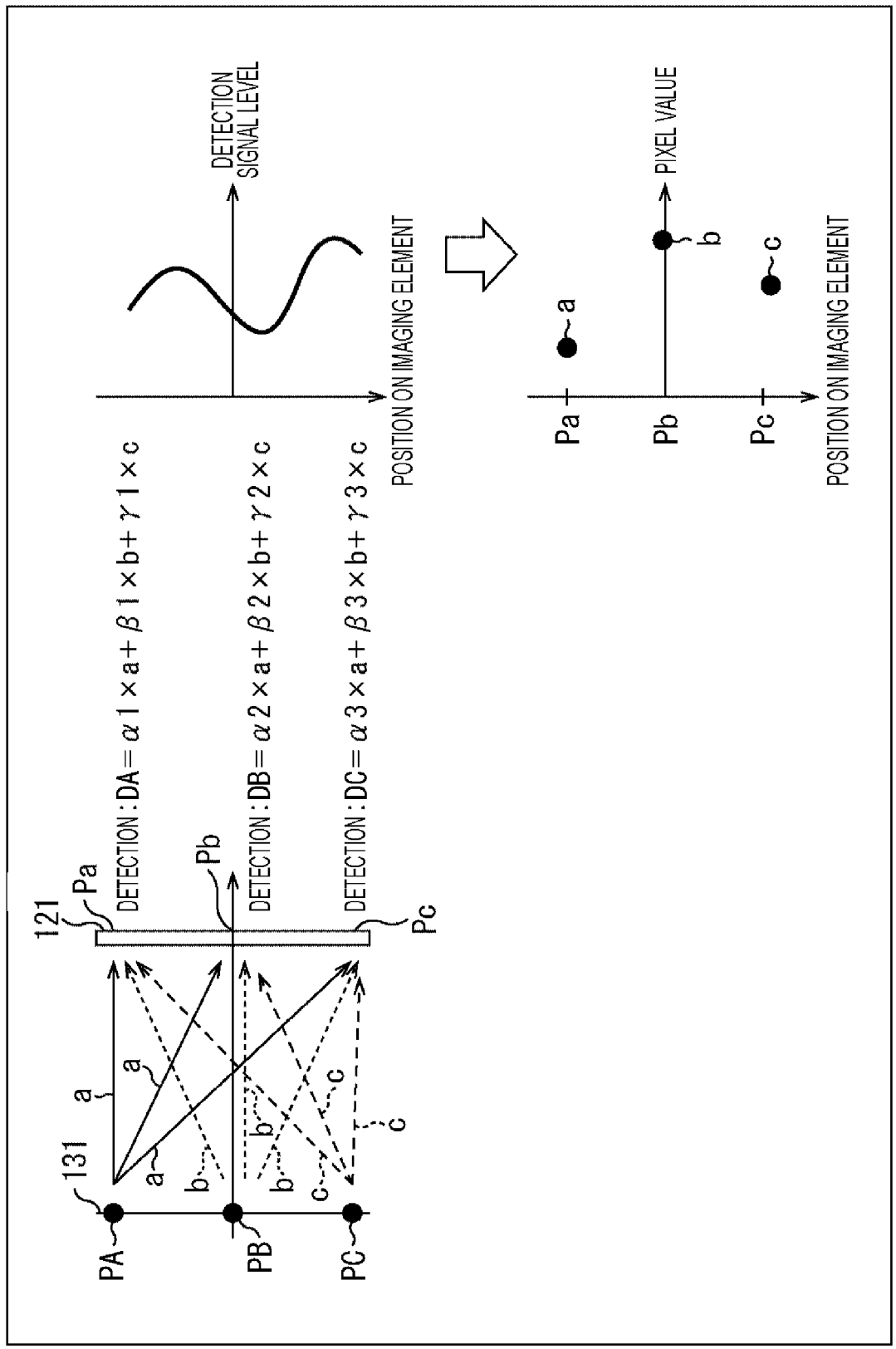
FIG. 2 is a diagram for describing a difference in configuration between a conventional imaging element and an imaging element of the present disclosure.

More specifically, as illustrated in the upper left part in FIG. 2, detection signal levels DA, DB, and DC at positions Pa, Pb, and Pc are expressed by the following equations (1) to (3), respectively.

[Math. 1]

$$DA = \alpha1 \times a + \beta1 \times b + \gamma1 \times c \qquad (1)$$

$$DB = \alpha2 \times a + \beta2 \times b + \gamma2 \times c \qquad (2)$$

$$DC = \alpha3 \times a + \beta3 \times b + \gamma3 \times c \qquad (3)$$

Here, α1 is a coefficient set according to the incident angle of a light beam from a point light source PA on the object plane 131 to be restored at the position Pa on the imaging element 121. Furthermore, β1 is a coefficient set according to the incident angle of a light beam from a point light source PB on the object plane 131 to be restored at the position Pa on the imaging element 121. Moreover, γ1 is a coefficient set according to the incident angle of a light beam from a point light source PC on the object plane 131 to be restored at the position Pa on the imaging element 121.

As illustrated in the equation (1), the detection signal level DA at the position Pa is expressed by a sum (combined value) of a product of the light intensity "a" of the light beam from the point light source PA at the position Pa and the coefficient α1, a product of the light intensity "b" of the light beam from the point light source PB at the position Pa and the coefficient β1, and a product of the light intensity "c" of the light beam from the point light source PC at position Pa and the coefficient γ1. Hereinafter, the coefficients ax, βx, and γx (x is a natural number) are collectively referred to as a coefficient set.

Similarly, a coefficient set α2, β2, and γ2 in the equation (2) is a coefficient set set according to the incident angle of the light beams from the point light sources PA, PB, and PC on the object plane 131 to be restored at the position Pb on the imaging element 121. That is, as illustrated in the above-described equation (2), the detection signal level DB at the position Pb is expressed by a sum (combined value) of a product of the light intensity "a" of the light beam from the point light source PA at the position Pb and the coefficient α2, a product of the light intensity "b" of the light beam from the point light source PB at the position Pb and the coefficient β2, and a product of the light intensity "c" of the light beam from the point light source PC at position Pb and the coefficient γ2. Furthermore, the coefficients α3, β3, and γ3 in the equation (3) are a coefficient set according to the incident angle of the light beams from the point light sources PA, PB, and PC on the object plane 131 to be restored at the position Pc on the imaging element 121. That is, as illustrated in the above-described equation (3), the detection signal level DC at the position Pc is expressed by a sum (combined value) of a product of the light intensity "a" of the light beam from the point light source PA at the position Pc and the coefficient α3, a product of the light intensity "b" of the light beam from the point light source PB at the position Pc and the coefficient β3, and a product of the light intensity "c" of the light beam from the point light source PC at position Pc and the coefficient γ3.

As described above, these detection signal levels are mixture of the light intensities of the light beams emitted from the point light sources PA, PB, and PC, and thus are different from a formed image of the object. That is, the detection signal level illustrated in the upper right part in FIG. 2 is not the detection signal level corresponding to an image in which the image of the object is formed (captured image), and thus is different from the pixel value illustrated in the lower right part in FIG. 2 (in general, the signal levels do not match).

Note that the pixel values at the positions Pa, Pb, and Pc as illustrated in the lower right part in FIG. 2 can be obtained by configuring simultaneous equations using the coefficient set α1, β1, and γ1, the coefficient set α2, β2, and γ2, the coefficient set α3, β3, and γ3, and the detection signal levels DA, DB, and DC, and solving the simultaneous equations (1) to (3) with a, b, and c as variables. As a result, a restored image (an image in which the image of the object is formed), which is a set of pixel values, is restored.

With such a configuration, the imaging element 121 can output, in each pixel, one detection signal indicating the output pixel value modulated according to the incident angle of the incident light without requiring an optical filter using an imaging lens, a diffraction grating, and the like, or a pinhole or the like. As a result, the optical filter using an imaging lens, a diffraction grating, and the like, or the pinhole or the like is not an indispensable configuration. Therefore, the height of the imaging device, that is, the thickness in the light incident direction in the configuration for implementing the imaging function can be reduced.

<Formation of Incident Angle Directivity>

Figure 3:
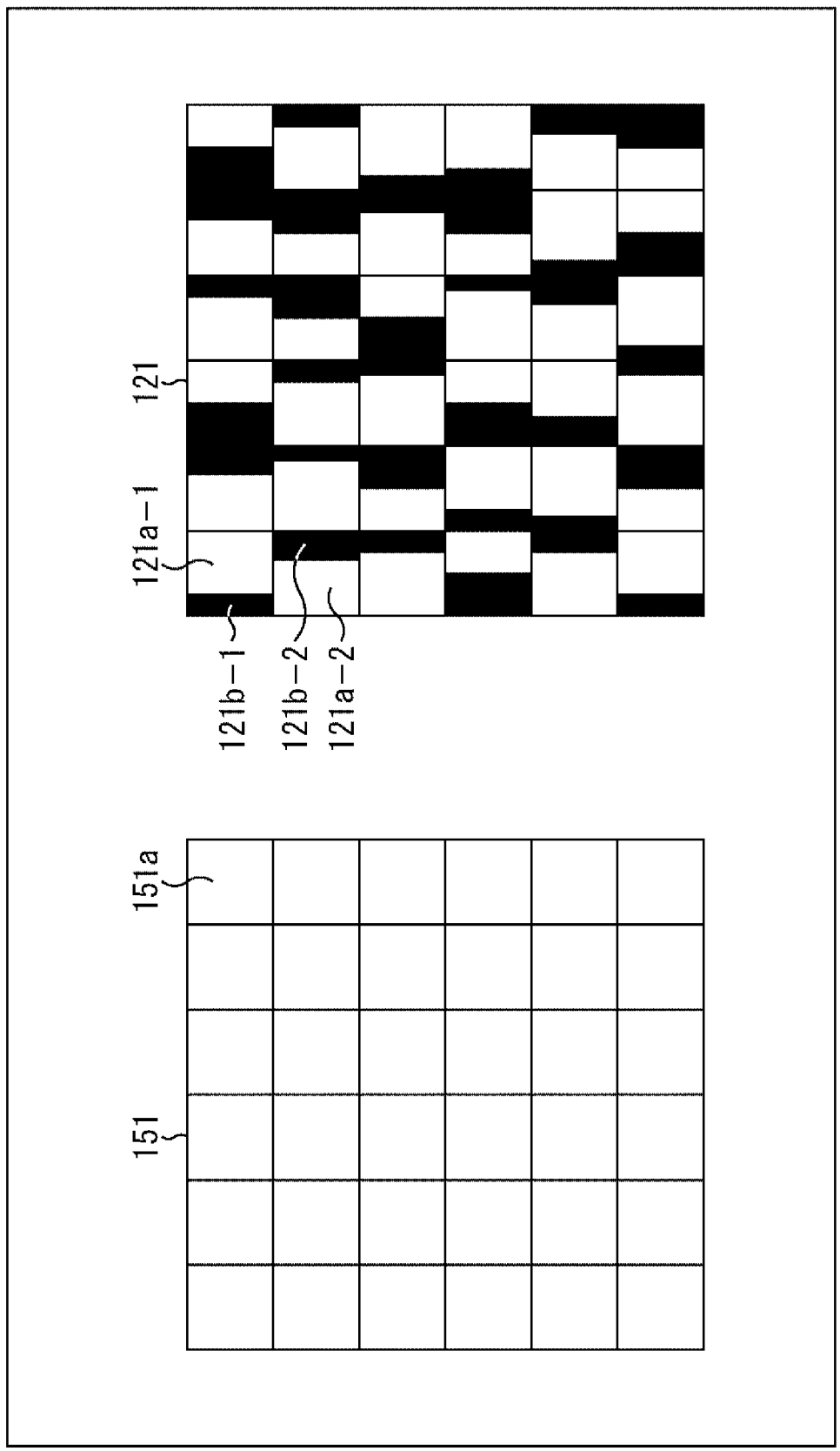
FIG. 3 is a diagram for describing a first configuration example of an imaging element.

The left part in FIG. 3 illustrates a front view of a part of a pixel array unit of a typical imaging element, and the right part in FIG. 3 illustrates a front view of a part of a pixel array unit of the imaging element 121. Note that FIG. 3 illustrates an example of the pixel array units in which the numbers of pixels in a horizontal direction x a vertical direction are six pixels×6 pixels. However, the configuration of the numbers of pixels is not limited to the example.

The incident angle directivity can be formed by, for example, a light-shielding film. In the typical imaging element 121, pixels 121*a* having the same incident angle directivity are arranged in an array manner, as illustrated in the left example in FIG. 3. Meanwhile, in the imaging element 121 in the right example in FIG. 3, a light-shielding film 121*b*, which is one of modulation elements, is provided for each pixel 121*a* so as to cover a part of a light-receiving region of the photodiode. The incident light entering each pixel 121*a* is optically modulated according to the incident angle. Then, for example, by providing the light-shielding film 121*b* in a different range for each pixel 121*a*, the light-receiving sensitivity with respect to the incident angle of the incident light becomes different for each pixel 121*a*, and each pixel 121*a* has different incident angle directivity.

For example, a pixel 121*a*-1 and a pixel 121*a*-2 have different ranges to be shielded from light by provided light-shielding films 121*b*-1 and 121*b*-2 (at least one of regions (positions) to be shielded from light or areas to be shielded from light are different). That is, in the pixel 121*a*-1, the light-shielding film 121*b*-1 is provided so as to shield light in a part of a left side of a light-receiving region of the photodiode by a predetermined width, and in the pixel 121*a*-2, the light-shielding film 121*b*-2 is provided so as to shield light in a part of a right side of a light-receiving region by a width wider in the horizontal direction than the light-shielding film 121*b*-1. Similarly, in the other pixels 121*a*, the light-shielding films 121*b* are provided so as to shield light in different ranges in the light-receiving region for respective pixels, and are randomly arranged in the pixel array.

Note that the amount of receivable light becomes smaller as the ratio of covering the light-receiving region of each pixel becomes larger. Therefore, the range of the light-shielding film 121*b* is desirably set to the area by which a desired amount of light can be secured. The area of the light-shielding film 121*b* may be limited to about ¾ of the maximum light-receivable range, for example. By doing so, an amount of light equal to or larger than a desired amount can be secured. Note that a minimum amount of light can be received by each pixel as long as a range not shielded from light with a width corresponding to a wavelength of received light is provided. That is, for example, in the case of a B pixel (blue pixel), the wavelength is about 500 nm. The minimum amount of light can be received unless the B pixel is shielded from light by the width corresponding to the wavelength or larger.

<Configuration Example of Imaging Element>

Figure 4:
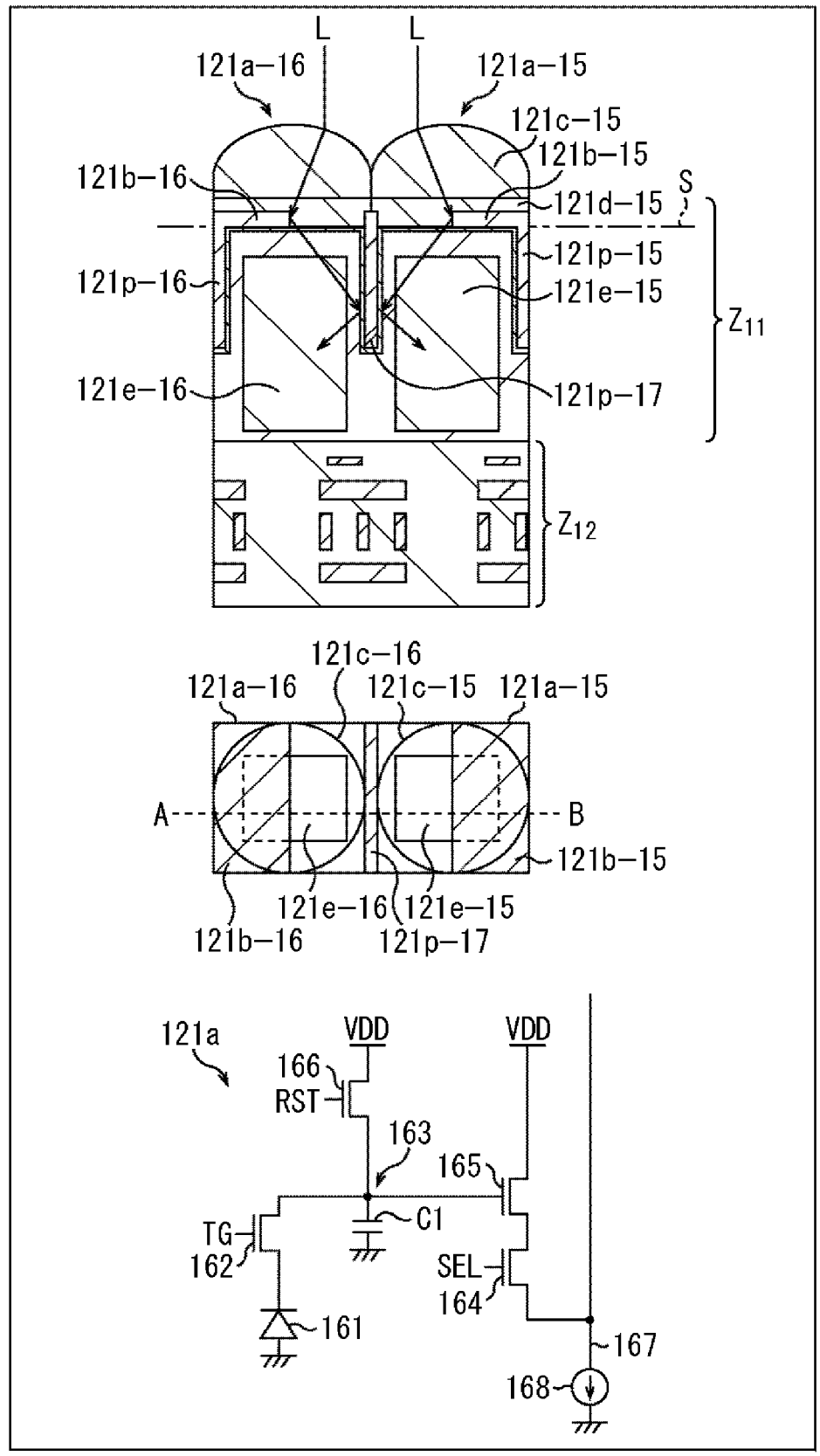
FIG. 4 is a diagram for describing the first configuration example of an imaging element.

A configuration example of the imaging element 121 in this case will be described with reference to FIG. 4. The upper part in FIG. 4 is a side-sectional view of the imaging element 121 and the middle part in FIG. 4 is a top view of the imaging element 121. Furthermore, the side-sectional view in the upper part in FIG. 4 is an AB cross section in the middle part in FIG. 4. Moreover, the lower part in FIG. 4 illustrates a circuit configuration example of the imaging element 121.

The imaging element 121 having the configuration illustrated in FIG. 4 includes a plurality of the pixel output units each configured to receive incident light incident without through both of an imaging lens and a pinhole, and output one detection signal indicating an output pixel value modulated according to the incident angle of the incident light. For example, the imaging element 121 has a configuration for making the incident angle directivities indicating directivities with respect to the incident angle of the incident light from the object different from each other, the incident angle directivities being of the output pixel values of at least two pixel output units among the plurality of pixel output units. Furthermore, the imaging element 121 in this case has a configuration in which the plurality of pixel output units is capable of independently setting, for each pixel output unit, the incident angle directivity indicating the directivity with respect to the incident angle of the incident light from the object.

In the imaging element 121 in the upper part in FIG. 4, the incident light is incident from an upper side to a lower side in FIG. 4. Adjacent pixels 121a-15 and 121a-16 are so-called back-illuminated-type pixels provided with a wiring layer Z12 in the lowermost layer and a photoelectric conversion layer Z11 on the wiring layer Z12 in FIG. 4.

Note that in a case where it is not necessary to distinguish the pixels 121a-15 and 121a-16, they are simply referred to as pixel(s) 121a, and other configurations are also similarly referred to. Furthermore, FIG. 4 is a side view and a top view of two pixels configuring the pixel array of the imaging element 121. It goes without saying that a larger number of pixels 121a are arranged but illustration is omitted.

Moreover, the pixels 121a-15 and 121a-16 respectively include photodiodes 121e-15 and 121e-16 in the photoelectric conversion layer Z11. Furthermore, on-chip lenses 121c-15 and 121c-16 and color filters 121d-15 and 121d-16 are respectively formed on the photodiodes 121e-15 and 121e-16 from above.

The on-chip lenses 121c-15 and 121c-16 focus the incident light on the photodiodes 121e-15 and 121e-16.

The color filters 121d-15 and 121d-16 are optical filters that transmit light having specific wavelengths such as red, green, blue, infrared, and white. Note that, in the case of white, the color filters 121d-15 and 121d-16 may be transparent filters or may be omitted.

Light-shielding films 121p-15 to 121p-17 are formed at boundaries between pixels in the photoelectric conversion layer Z11 of the pixels 121a-15 and 121a-16 and suppress crosstalk between adjacent pixels. Note that the light-shielding films 121p-15 to 121p-17 may be omitted.

Furthermore, light-shielding films 121b-15 and 121b-16, which are one of modulation elements, partially shield a light-receiving surface S, as illustrated in the upper and middle parts in FIG. 4. Since a part of the light-receiving surface S is shielded by the light-shielding film 121b, the incident light entering the pixel 121a is optically modulated according to the incident angle. Since the pixel 121a detects the optically modulated incident light, the pixel 121a has incident angle directivity. Different ranges are respectively shielded by the light-shielding films 121b-15 and 121b-16 on the light-receiving surface S of the photodiodes 121e-15 and 121e-16 in the pixels 121a-15 and 121a-16. Thereby, different incident angle directivity is set for each pixel. Note that it is not limited to the case where the shielded ranges are different among all the pixels 121a of the imaging element 121, and some pixels 121a having the same shielded range may exist.

With the configuration illustrated in the upper part in FIG. 4, a right end of the light-shielding film 121b-15 and an upper end of the light-shielding film 121b-15 are connected and a left end of the light-shielding film 121p-16 and an upper end of the light-shielding film 121p-16 are connected to form L shapes as viewed from the side.

Furthermore, the light-shielding films 121b-15 to 121b-17 and the light-shielding films 121p-15 to 121p-17 are formed using metal, and for example, formed using tungsten (W), aluminum (Al), or an alloy of Al and copper (Cu). Furthermore, the light-shielding films 121b-15 to 121b-17 and the light-shielding films 121p-15 to 121p-17 may be formed at the same time using the same metal as wiring in the same process as a process of forming the wiring in a semiconductor process. Note that the light-shielding films 121b-15 to 121b-17 and the light-shielding films 121p-15 to 121p-17 do not have to have the same thickness depending on positions.

Furthermore, as illustrated in the lower part in FIG. 4, the pixel 121a includes a photodiode 161 (corresponding to a photodiode 121e), a transfer transistor 162, a floating diffusion (FD) part 163, a selection transistor 164, an amplification transistor 165, and a reset transistor 166, and is connected to a current source 168 via a vertical signal line 167.

The photodiode 161 has a configuration in which an anode electrode is grounded and a cathode electrode is connected to a gate electrode of the amplification transistor 165 via the transfer transistor 162.

Each transfer transistor 162 is driven according to a transfer signal TG. For example, when the transfer signal TG supplied to a gate electrode of the transfer transistor 162 becomes a high level, the transfer transistor 162 is turned on. As a result, an electric charge accumulated in the photodiode 161 is transferred to the FD part 163 via the transfer transistor 162.

The amplification transistor 165 serves as an input unit of a source follower that is a readout circuit for reading a signal obtained by photoelectric conversion in the photodiode 161, and outputs a pixel signal of a level corresponding to the electric charge accumulated in the FD part 163 to a vertical signal line 23. That is, the amplification transistor 165 configures the source follower with the current source 168 connected to one end of the vertical signal line 167 as a drain terminal is connected to a power supply voltage VDD and a source terminal is connected to the vertical signal line 167 via the selection transistor 164.

The floating diffusion (FD) part 163 is a floating diffusion region having an electric charge capacitance C1 provided between the transfer transistor 162 and the amplification transistor 165, and temporarily accumulates the electric charge transferred from the photodiode 161 via the transfer transistor 162. The FD part 163 is a charge detection unit that converts the electric charge into a voltage, and the electric charge accumulated in the FD part 163 is converted into a voltage in the amplification transistor 165.

The selection transistor 164 is driven according to a selection signal SEL, and is turned on when the selection signal SEL supplied to a gate electrode becomes a high level and connects the amplification transistor 165 and the vertical signal line 167.

The reset transistor 166 is driven according to a reset signal RST. For example, the reset transistor 166 is turned on when the reset signal RST supplied to a gate electrode becomes a high level, and discharges the electric charge accumulated in the FD part 163 to the power supply voltage VDD to reset the FD part 163.

With the above circuit configuration, the pixel circuit illustrated in the lower part in FIG. 4 operates as follows.

That is, as a first operation, the reset transistor 166 and the transfer transistor 162 are turned on, and the electric charges accumulated in the FD part 163 are discharged to the power supply voltage VDD to reset the FD part 163.

As a second operation, the reset transistor 166 and the transfer transistor 162 are turned off, and an exposure period starts, and the photodiode 161 accumulates electric charges according to the amount of the incident light.

As a third operation, the reset transistor 166 is turned on, and the reset transistor 166 is turned off after the FD part 163 is reset. By the operation, the FD part 163 is reset and the reference potential is set.

As a fourth operation, the potential of the FD part 163 in the reset state is output from the amplification transistor 165 as a reference potential.

As a fifth operation, the transfer transistor 162 is turned on, and the electric charge accumulated in the photodiode 161 is transferred to the FD part 163.

As a sixth operation, the potential of the FD part 163 to which the electric charge of the photodiode has been transferred is output from the amplification transistor 165 as a signal potential.

By the above processing, the reference potential is subtracted from the signal potential, and the signal potential is output as a detection signal by correlated double sampling (CDS). The value of the detection signal (output pixel value) is modulated according to the incident angle of the incident light from the object, and the characteristic (directivity) differs (has an incident angle directivity) depending on the incident angle.

As described above, the pixel 121a in the case of FIG. 4 is provided with one photodiode 121e for each pixel, and a different range for each pixel 121a is shielded from light by the light-shielding film 121b, and one pixel 121a can express a detection signal of one pixel of a detection image having the incident angle directivity by optical modulation using the light-shielding film 121b.

<Other Configuration Examples of Imaging Element>

Furthermore, the incident angle directivity can be formed according to, for example, the position, size, shape, and the like of a light-receiving element (for example, a photodiode) in a pixel. Pixels having different parameters have different sensitivities with respect to the incident light having the same light intensity from the same direction. That is, by setting these parameters for each pixel, the incident angle directivity can be set for each pixel.

For example, a plurality of light-receiving elements (for example, photodiodes) may be provided in a pixel, and these light-receiving elements may be selectively used. By doing so, the incident angle directivity can be set for each pixel by selecting the light-receiving element.

Figure 5:
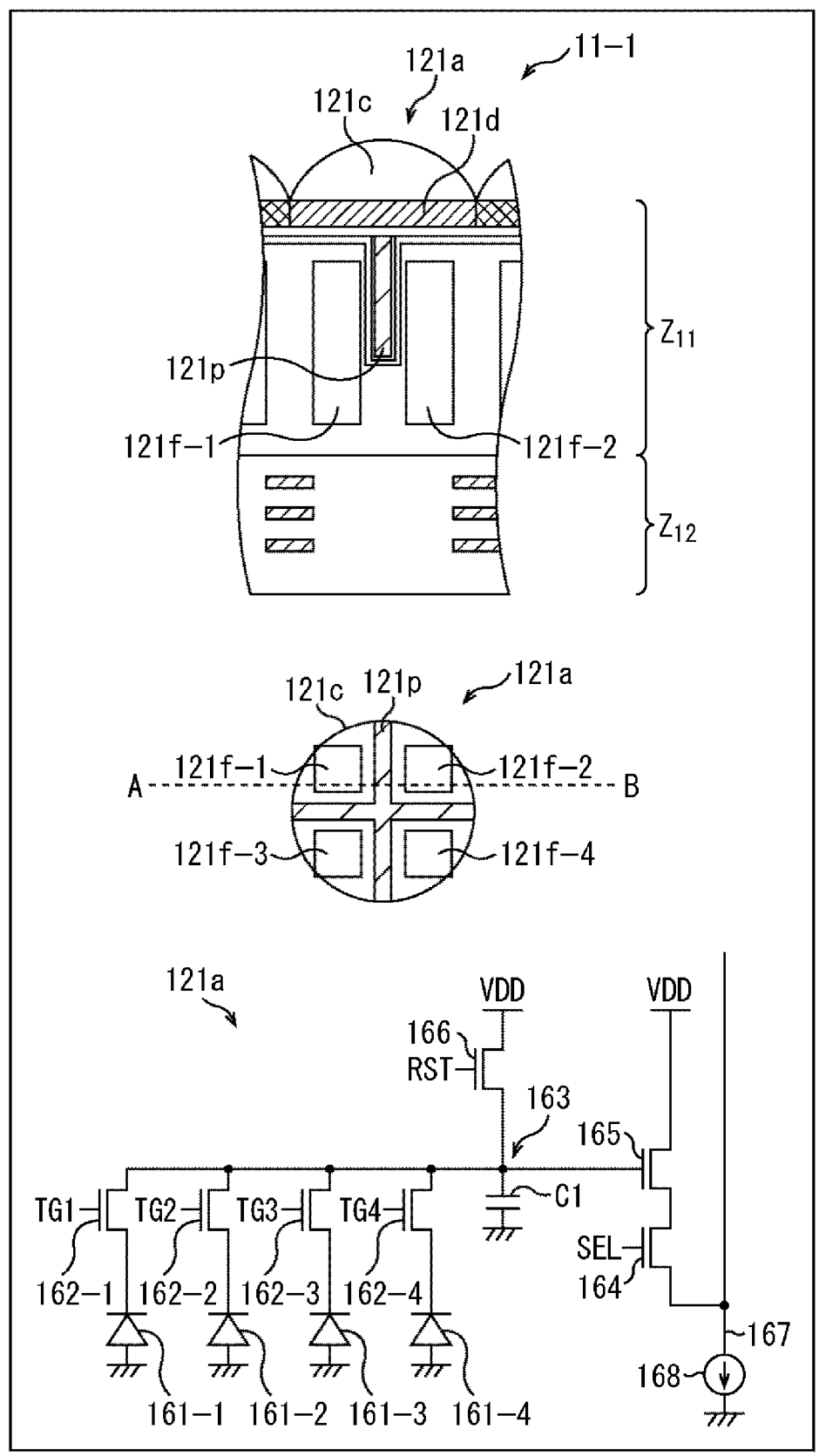
FIG. 5 is a diagram for describing principles of occurrence of incident angle directivity.

FIG. 5 is a diagram illustrating another configuration example of the imaging element 121. The upper part in FIG. 5 is a side-sectional view of the pixel 121a of the imaging element 121 and the middle part in FIG. 5 is a top view of the imaging element 121. Furthermore, the side-sectional view in the upper part in FIG. 5 is an AB cross section in the middle part in FIG. 5. Moreover, the lower part in FIG. 5 illustrates a circuit configuration example of the imaging element 121.

The imaging element 121 having the configuration illustrated in FIG. 5 includes a plurality of pixel output units each configured to receive incident light incident without through both of an imaging lens and a pinhole, and output one detection signal indicating an output pixel value modulated according to an incident angle of the incident light. For example, the imaging element 121 has a configuration for making the incident angle directivities indicating directivities with respect to the incident angle of the incident light from the object different from each other, the incident angle directivities being of the output pixel values of at least two pixel output units among the plurality of pixel output units. Furthermore, in the imaging element 121 in this case, the plurality of pixel output units makes the photodiodes (PDs) contributing to the output different from one another, so that the incident angle directivity indicating the directivity with respect to the incident angle of the incident light from the object, of the output pixel value, can be independently set for each pixel output unit.

As illustrated in FIG. 5, the imaging element 121 has a different configuration from the imaging element 121 in FIG. 4 in that four photodiodes 121f-1 to 121f-4 are formed in the pixel 121a, and the light-shielding film 121p is formed in a region for isolating the photodiodes 121f-1 to 121f-4. That is, in the imaging element 121 in FIG. 5, the light-shielding film 121p is formed in a "+" shape when viewed from above. Note that the common configurations are denoted by the same reference numerals and detailed description thereof will be omitted.

In the imaging element 121 configured as illustrated in FIG. 5, the light-shielding film 121p isolates the photodiodes 121f-1 to 121f-4, whereby electrical and optical crosstalk among the photodiodes 121f-1 to 121f-4 can be prevented. That is, the light-shielding film 121p in FIG. 5 is for preventing crosstalk similarly to the light-shielding film 121p of the imaging element 121 in FIG. 4 and is not for providing the incident angle directivity.

Although details will be described below, the photodiodes 121f-1 to 121f-4 have different incident angles at which the light-receiving sensitivity characteristic increases. That is, the output pixel value of the pixel 121a can have desired incident angle directivity depending on from which of the photodiodes 121f-1 to 121f-4 the electric charge is read. That is, the incident angle directivity of the output pixel value of the pixel 121a can be controlled.

In the configuration example of the imaging element 121 in FIG. 5, one FD part 163 is shared by the four photodiodes 121f-1 to 121f-4. The lower part of FIG. 5 shows a circuit configuration example in which one FD part 163 is shared by four photodiodes 121f-1 to 121f-4. Note that description of the same configuration in the lower part in FIG. 5 as that in the lower part in FIG. 4 is omitted.

The lower part in FIG. 5 differs from the circuit configuration in the lower part in FIG. 4 in that photodiodes 161-1 to 161-4 (the photodiodes 121f-1 to 121f-4 in the upper part in FIG. 5) and transfer transistors 162-1 to 162-4 are provided instead of the photodiode 161 and the transfer transistor 162, and the FD part 163 is shared.

In the circuit illustrated in the lower part in FIG. 5, the photodiodes 161-1 to 161-4 are referred to as photodiode(s) 161 in a case where it is not necessary to distinguish the photodiodes 161-1 to 161-4 from one another. Furthermore, the transfer transistors 162-1 to 162-4 are referred to as transfer transistor(s) 162 in a case where it is not necessary to distinguish the transfer transistors 162-1 to 162-4 from one another.

In the circuit illustrated in the lower part in FIG. 5, when any of the transfer transistors 162 is turned on, the electric charge of the photodiode 161 corresponding to the transfer transistor 162 is read and transferred to the common FD part 163. Then, a signal according to the level of the electric charge held in the FD part 163 is read as the detection signal of the pixel output unit. That is, the electric charges of the photodiodes 161 can be read independently of one another, and which electric charge is read from which photodiode 161 can be controlled according to which transfer transistor 162 is turned on. In other words, the degree of contribution by each photodiode 161 to the output pixel value can be controlled according to which transfer transistor 162 is turned on. For example, by making the photodiodes 161 that read the electric charges different between at least two pixels, the photodiodes 161 contributing to the output pixel value can be made different from each other. That is, the output pixel value of the pixel 121a can have desired incident angle directivity by selection of the photodiode 161 that reads the electric charge. That is, the detection signal output from each pixel 121a can be the value (output pixel value) modulated according to the incident angle of the incident light from the object.

For example, in FIG. 5, the electric charges of the photodiodes 121f-1 and 121f-3 are transferred to the FD part 163 and signals obtained by reading the electric charges are added, so that the output pixel value of the pixel 121a can have the incident angle directivity in the right-left direction in FIG. 5. Similarly, the electric charges of the photodiodes 121f-1 and 121f-2 are transferred to the FD part 163 and signals obtained by reading the electric charges are added, so that the output pixel value of the pixel 121a can have the incident angle directivity in the up-down direction in FIG. 5.

Note that the signals obtained on the basis of the respective electric charges of the photodiodes 121f of the pixel 121a in FIG. 5 may be added after read from the pixel or may be added in the pixel (for example, in the FD part 163).

Furthermore, the combination of the photodiodes 121f of which the electric charges (or the signals corresponding to the electric charges) are added is arbitrary and is not limited to the above-described examples. For example, the electric charges of three or more photodiodes 121f (or the signals corresponding to the electric charges) may be added. Furthermore, for example, the electric charge of one photodiode 121f may be read without performing the addition.

Note that (the detection sensitivity of) the pixel 121a can have desired incident angle directivity by resetting the detection value (electric charge) accumulated in the photodiode 161 (photodiode 121f) before reading the electric charge to the FD part 163, using an electric shutter function.

For example, in the case of using the electronic shutter function, the photodiode 121f can be set to a state of not contributing to the detection signal level of the pixel 121a by resetting the electric charge of the photodiode 121f immediately before reading the electric charge to the FD part 163, whereas the photodiode 121f can partially contribute to the detection signal level by setting a time between the resetting and the readout to the FD part 163.

As described above, the four photodiodes 121f are provided for one pixel 121a in FIG. 5, and no light-shielding film 121b is formed on the light-receiving surface. However, the light-receiving surface is divided into the plurality of regions by the light-shielding film 121p, and the four photodiodes 121f-1 to 121f-4 are formed, and represent the detection signal for one pixel of the detection image and having the incident angle directivity. In other words, for example, a range not contributing to the output, of the photodiodes 121f-1 to 121f-4, functions similarly to the shielded region and represents the detection signal for one pixel of the detection image and having the incident angle directivity. Note that in the case of expressing the detection signal for one pixel using the photodiodes 121f-1 to 121f-4, the detection signal is not a signal obtained by optical modulation because the light-shielding film 121b is not used.

Although an example in which four photodiodes are arranged in a pixel has been described, the number of photodiodes arranged in a pixel is arbitrary and is not limited to the above example. That is, the number of partial regions in which the photodiodes are arranged in the pixel is also arbitrary.

Furthermore, the description has been made such that the photodiodes are arranged in the four partial regions obtained by equally dividing the pixel into four. However, the partial regions may not be equally divided. That is, the sizes and shapes of the partial regions may not be all unified (partial regions having different sizes and shapes may be included). Alternatively, the position (the position in the partial region), size, shape, and the like of the photodiode arranged in each partial region may be different for each photodiode (for each partial region). At that time, the sizes and shapes of the partial regions may be all unified or may not be unified.

Moreover, these parameters do not have to be unified for all the pixels of the imaging element 121. That is, in one or more pixels of the imaging element 121, one or more of these parameters may be different from other pixels.

For example, a pixel in which a division position for forming the partial region where the photodiode is arranged in the pixel is different from other pixels may be included in the pixel group of the imaging element 121. That is, the imaging element 121 may include one or more pixels in which the size and shape of the partial region are different from other pixels. For example, by making this division position different for each pixel, even if only the upper left photodiode is used in a plurality of pixels, the incident angle directivities of the detection signals detected in the respective pixels of the plurality of pixels can be made different from one another.

Furthermore, for example, a pixel in which the positions, sizes, shapes, and the like of the plurality of photodiodes arranged in the pixel are different from other pixels may be included in the pixel group of the imaging element 121. That is, the imaging element 121 may include one or more pixels in which at least one of the positions, sizes, or shapes of the plurality of photodiodes to be arranged is different from other pixels. For example, by making the position, size, shape, and the like of the photodiode different for each pixel, even if only the upper left photodiode is used in a plurality of pixels, the incident angle directivities of the detection signals detected in the respective pixels of the plurality of pixels can be made different from one another.

Further, for example, one or more pixels in which both the parameters (size and shape) of the partial region and the parameters (position, size, and shape) of the photodiode are different from other pixels may be included.

Furthermore, for example, a pixel in which the number of divisions for forming the partial region where the photodiode is arranged in the pixel is different from other pixels may be included in the pixel group of the imaging element 121. That is, the imaging element 121 may include one or more pixels in which the number of photodiodes to be arranged is different from other pixels. For example, by making the number of divisions (the number of photodiodes) different for each pixel, the incident angle directivity can be more freely set.

Note that the pixel that forms the incident angle directivity using the light-shielding film, as in the example in FIG. 4, and the pixel that forms the incident angle directivity using the plurality of light-receiving elements may be mixed in one imaging element, as in the example in FIG. 5.

<Principle of Generating Incident Angle Directivity>

Figure 6:
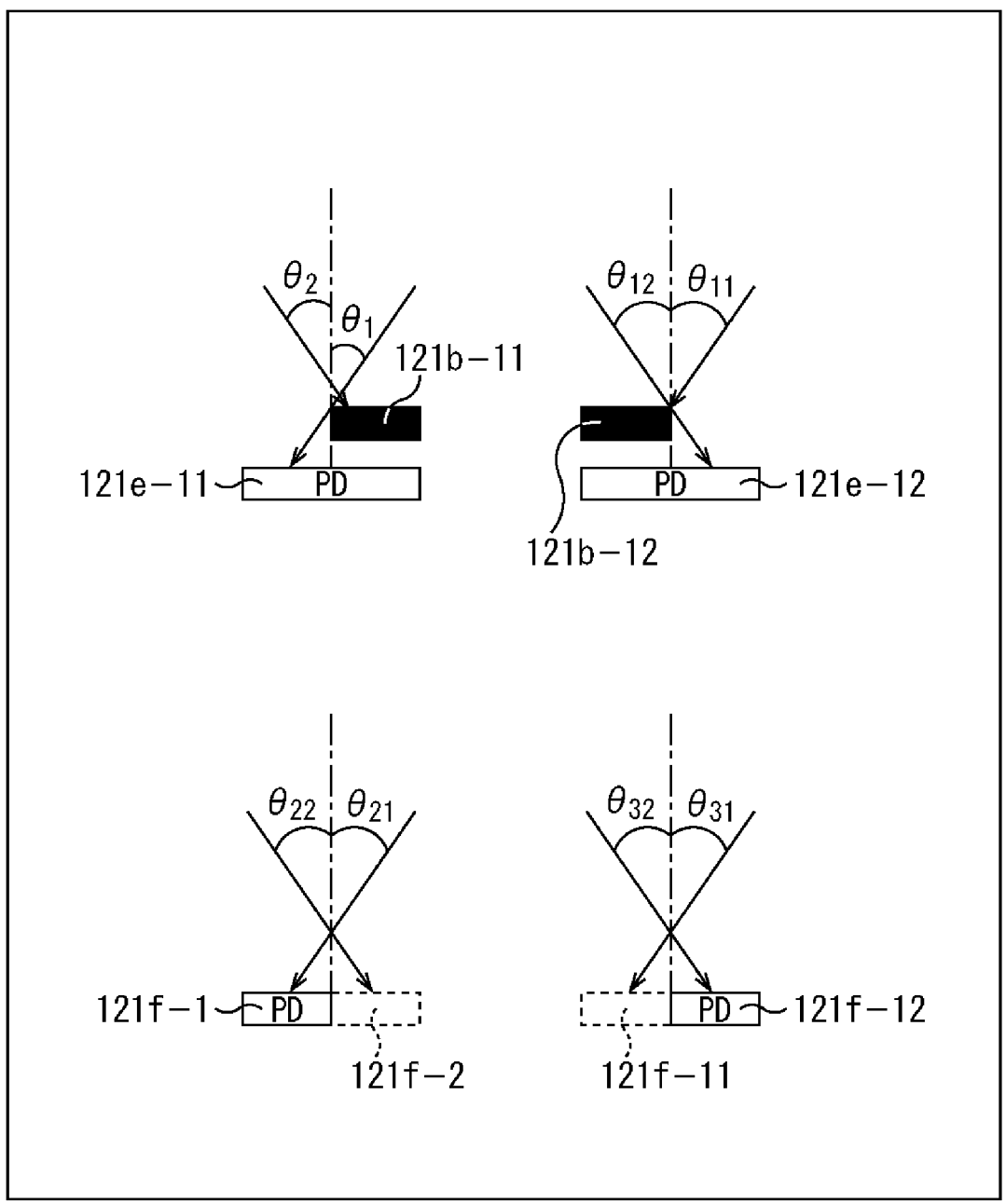
FIG. 6 is a diagram for describing changes in the incident angle directivity using an on-chip lens.

The incident angle directivity of each pixel in the imaging element 121 is generated according to, for example, the principles illustrated in FIG. 6. Note that the upper left part and upper right parts in FIG. 6 are diagrams for describing generation principles of the incident angle directivity in the imaging element 121 in FIG. 4, and the lower left and lower right part in FIG. 6 are diagrams for describing generation principles of the incident angle directivity in the imaging element 121 in FIG. 5.

Furthermore, one pixels in the upper left and upper right parts in FIG. 6 are each configured by one photodiode 121e. In contrast, one pixels in the lower left and lower right parts in FIG. 6 are each configured by two photodiode 121f. Note that, here, the example in which one pixel is configured by two photodiodes 121f has been described. However, this is for convenience of description. The number of photodiodes 121f configuring one pixel may be another number.

In the upper left part in FIG. 6, a light-shielding film 121b-11 is formed to shield a right half of a light-receiving surface of a photodiode 121e-11 when incident light is incident from above to below in FIG. 6. Furthermore, in the upper right part in FIG. 6, a light-shielding film 121b-12 is formed to shield a left half of a light-receiving surface of a photodiode 121e-12. Note that the alternate long and short dash line in FIG. 6 indicates a center position of the light-receiving surface of the photodiode 121e in the horizontal direction in FIG. 6 and a direction perpendicular to the light-receiving surface.

For example, in the case of the configuration in the upper left part in FIG. 6, the incident light from an upper right direction in FIG. 6, which is indicated by the arrow forming an incident angle θ1 with respect to the alternate long and short dash line in FIG. 6, is easily received in the left half range not shielded by the light-shielding film 121b-11 of the photodiode 121e-11, whereas the incident light from an upper left direction in FIG. 6, which is indicated by the arrow forming an incident angle θ2 with respect to the alternate long and short dash line in FIG. 6, is less easily received in the left half range not shielded by the light-shielding film 121b-11 of the photodiode 121e-11. Therefore, in the case of the configuration in the upper left part in FIG. 6, incident angle directivity that the light-receiving sensitivity characteristic is high with respect to the incident light from the upper right in FIG. 6, and the light-receiving sensitivity characteristic is low with respect to the incident light from the upper left is provided.

In contrast, for example, in the case of the configuration in the upper right part in FIG. 6, the incident light from the upper right direction in FIG. 6, which is indicated by the arrow forming an incident angle θ11 with respect to the alternate long and short dash line in FIG. 6, is less easily received in the left half range shielded by the light-shielding film 121b-12 of the photodiode 121e-12, whereas the incident light from the upper left direction in FIG. 6, which is indicated by the arrow forming an incident angle θ12 with respect to the alternate long and short dash line in FIG. 6, is easily received in the right half range not shielded by the light-shielding film 121b-12 of the photodiode 121e-12. Therefore, in the case of the configuration in the upper right part in FIG. 6, incident angle directivity that the light-receiving sensitivity characteristic is low with respect to the incident light from the upper right in FIG. 6, and the light-receiving sensitivity characteristic is high with respect to the incident light from the upper left is provided.

Furthermore, in the case of the lower left part in FIG. 6, the photodiodes 121f-1 and 121f-2 are provided side by side in FIG. 6, and either one of the detection signals is read, so that the incident angle directivity can be provided without providing the light-shielding film 121b.

That is, as illustrated in the lower left part in FIG. 6, in a case where the two photodiodes 121f-1 and 121f-2 are formed in the pixel 121a, the detection signal of the photodiode 121f-1 provided on the left side in FIG. 6 is caused to contribute to the detection signal level of the pixel 121a, so that incident angle directivity similar to that of the configuration in the upper left part in FIG. 6 can be provided. That is, the incident light from the upper right direction in FIG. 6, which is indicated by the arrow forming an incident angle θ21 with respect to the alternate long and short dash line in FIG. 6, is incident on and received by the photodiode 121f-1 and contributes to the detection signal level of the pixel 121a. In contrast, the incident light from the upper left direction in FIG. 6, which is indicated by the arrow forming an incident angle θ22 with respect to the alternate long and short dash line in FIG. 6, is incident on the photodiode 121f-2 but the detection signal is not read and does not contribute to the detection signal level of the pixel 121a.

Similarly, as illustrated in the lower right part in FIG. 6, in a case where the two photodiodes 121f-11 and 121f-12 are formed in the pixel 121a, the detection signal of the photodiode 121f-12 provided on the left side in FIG. 6 is caused to contribute to the detection signal level of the pixel 121a, so that incident angle directivity similar to that of the configuration in the upper right part in FIG. 6 can be provided. That is, the incident light from the upper right direction in FIG. 6, which is indicated by the arrow forming an incident angle θ31 with respect to the alternate long and short dash line in FIG. 6, is incident on the photodiode 121f-11 but the detection signal is not read and does not contribute to the detection signal level of the pixel 121a. In contrast, the incident light from the upper left direction in FIG. 6, which is indicated by the arrow forming an incident angle θ32 with respect to the alternate long and short dash line in FIG. 6, is incident on and received by the photodiode 121f-12 and contributes to the detection signal level of the pixel 121a.

Note that, in FIG. 6, an example in which the alternate long and short dash line in the vertical direction indicates the center position in the horizontal direction in FIG. 6 of the light-receiving surface of the photodiode 121e has been described. However, the example is for convenience of description and another position may be adopted. When the position of the light-shielding film 121b in the horizontal direction indicated by the alternate long and short dash line in the vertical direction is different, different incident angle directivity can be generated.

<Incident Angle Directivity in Configuration Including On-Chip Lens>

In the above, the generation principle of the incident angle directivity has been described. Here, the incident angle directivity in the configuration including the on-chip lens 121c will be described.

Figure 7:
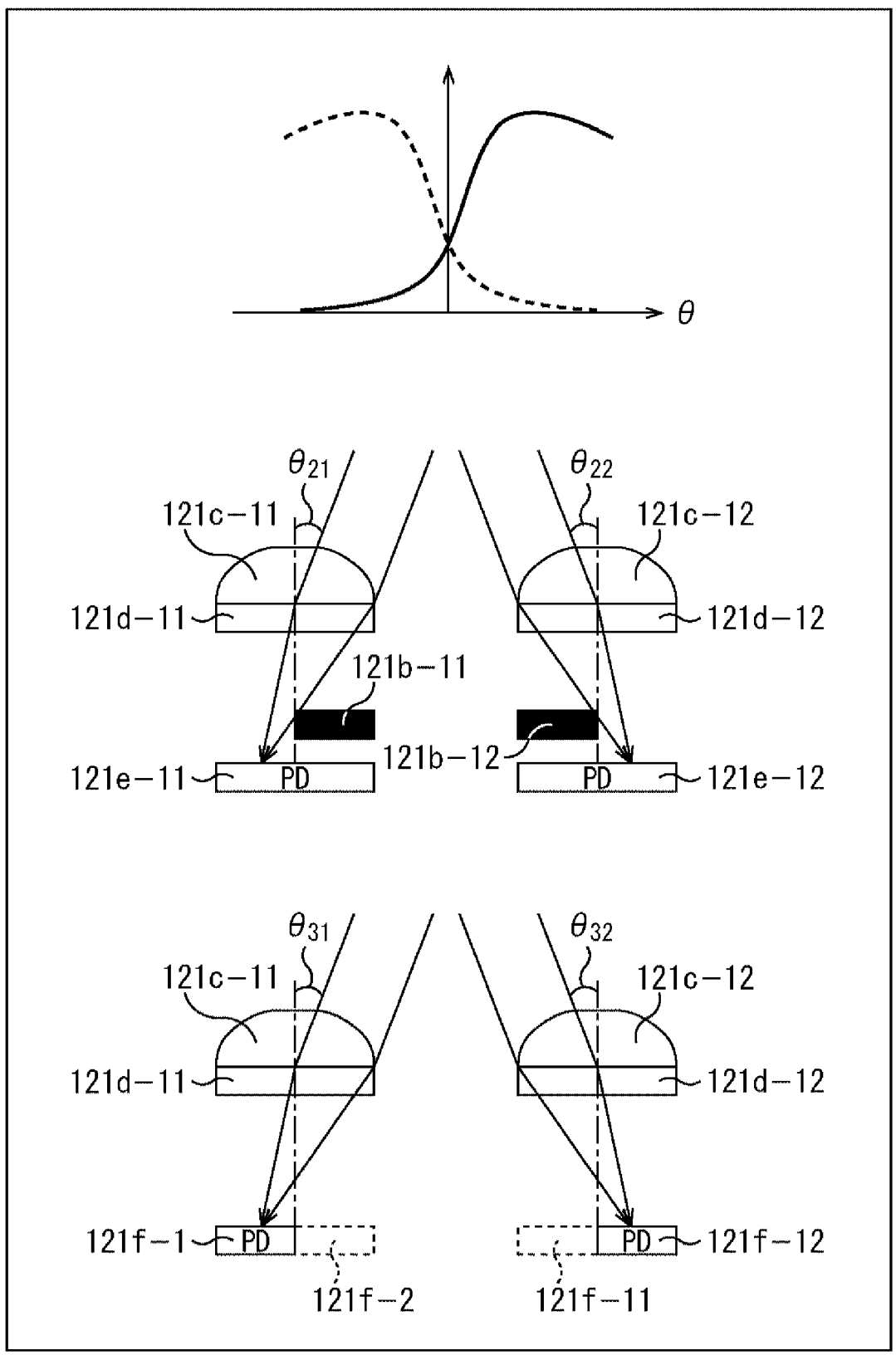
FIG. 7 is a diagram for describing design of the incident angle directivity.

That is, the incident angle directivity of each pixel in the imaging element 121 is set as illustrated in FIG. 7, for example, by using the on-chip lens 121c in addition to the above-described light-shielding film 121b. That is, in the middle left part in FIG. 7, an on-chip lens 121c-11 that focuses the incident light, a color filter 121d-11 that transmits light of a predetermined wavelength, and the photodiode 121e-11 that generates the pixel signal by photoelectric conversion are stacked in order from an upper incident direction in FIG. 7. In the middle right part in FIG. 7, an on-chip lens 121c-12, a color filter 121d-12, and the photodiode 121e-12 are stacked in order from the upper incident direction in FIG. 7.

Note that in a case where it is not necessary to distinguish the on-chip lenses 121c-11 and 121c-12, the color filters 121d-11 and 121d-12, and the photodiodes 121e-11 and 121e-12, they are simply referred to as on-chip lens(es) 121c, color filter(s) 121d, and photodiode(s) 121e.

In the imaging element 121, as illustrated in the middle left part and the middle right part in FIG. 7, the light-shielding films 121b-11 and 121b-12 that shield part of regions for receiving the incident light are further provided.

As illustrated in the middle left part in FIG. 7, in the case where the light-shielding film 121b-11 that shields the right-side half of the photodiode 121e-11 in FIG. 7 is provided, the detection signal level of the photodiode 121e-11 changes according to the incident angle θ of the incident light, as illustrated by the solid line waveform in the upper part in FIG. 7.

That is, when the incident angle θ, which is an angle made by the incident light, becomes large (when the incident angle θ becomes large in a positive direction (when the incident angle θ inclines rightward in FIG. 7)) with respect to the alternate long and short dash line indicating the center position of the photodiode 121e and the on-chip lens 121c and perpendicular to the photodiode 121e and the on-chip lens 121c, the light is focused to a range where the light-shielding film 121b-11 is not provided, so that the detection signal level of the photodiode 121e-11 becomes large. Conversely, the light is further focused to a range where the light-shielding film 121b-11 is provided as the incident angle θ becomes smaller (as the incident angle θ is larger in a negative direction (when the incident angle θ inclines leftward in FIG. 7)), so that the detection signal level of the photodiode 121e-11 becomes smaller.

Note that the incident angle θ here is 0 degrees in the case where the incident light direction coincides with the alternate long and short dash line, the incident angle θ on an incident angle θ21 side on the middle left side in FIG. 7 in which the incident light from the upper right in FIG. 7 is incident is a positive value, and the incident angle θ on an incident angle θ22 side on the middle right side in FIG. 7 is a negative value. Therefore, in FIG. 7, the incident light entering the on-chip lens 121c from the upper right becomes larger in the incident angle than the incident light incident from the upper left. That is, in FIG. 7, the incident angle θ becomes larger as a traveling direction of the incident light inclines more rightward (becomes larger in the positive direction), and becomes smaller as the traveling direction inclines more leftward (becomes larger in the negative direction).

Furthermore, as illustrated in the middle right part in FIG. 7, in the case where the light-shielding film 121b-12 that shields the left-side half of the photodiode 121e-12 in FIG. 7 is provided, the detection signal level of the photodiode 121e-12 changes according to the incident angle θ of the incident light, as illustrated by the dotted line waveform in the upper part in FIG. 7.

That is, as illustrated by the dotted line waveform in the upper part in FIG. 7, the light is further focused to a range where the light-shielding film 121b-12 is provided as the incident angle θ, which is an angle made by the incident light, becomes larger (when the incident angle θ becomes larger in the positive direction) with respect to the alternate long and short dash line indicating the center position of the photodiode 121e and the on-chip lens 121c and perpendicular to the photodiode 121e and the on-chip lens 121c, so that the detection signal level of the photodiode 121e-12 becomes small. Conversely, the light enters a range where the light-shielding film 121b-12 is not provided as the incident angle θ becomes smaller (as the incident angle θ is larger in the negative direction), so that the detection signal level of the photodiode 121e-12 becomes larger.

Note that, in the upper part in FIG. 7, the horizontal axis represents the incident angle θ, and the vertical axis represents the detection signal level in the photodiode 121e.

The waveforms illustrated by the solid line and the dotted line indicating the detection signal level corresponding to the incident angle θ illustrated in the upper part in FIG. 7 can be changed according to the range of the light-shielding film 121b. Thereby, the incident angle directivities different from each other can be provided (set) in units of pixels. Note that the solid line waveform in the upper part in FIG. 7 corresponds to the solid line arrows indicating the state where the incident light in the middle left part and in the lower left part in FIG. 7 is focused with a changed incident angle θ. Furthermore, the dotted line waveform in the upper part in FIG. 7 corresponds to the dotted line arrows indicating the state where the incident light in the middle right part and in the lower right part in FIG. 7 is focused with a changed incident angle θ.

The incident angle directivity referred to here is the characteristic (light-receiving sensitivity characteristic) of the detection signal level of each pixel according to the incident angle θ, but in the case of the examples in the middle part in FIG. 7, the incident angle directivity can be said to be a characteristic of a light-shielding value according to the incident angle θ. That is, the light-shielding film 121b shields the incident light in a specific direction at a high level but cannot sufficiently shield the incident light from a direction other than the specific direction. This change in the level of shielding light causes different detection signal levels depending on the incident angle θ as illustrated in the upper part in FIG. 7. Therefore, when the direction in which light can be shield at the highest level in each pixel is defined as a light-shielding direction of each pixel, having different incident angle directivities from one another in units of pixels means, in other words, having different light-shielding directions from one another in units of pixels.

Moreover, as illustrated in the lower left part in FIG. 7, a configuration in which the two photodiodes 121f-1 and 121f-2 are provided for one on-chip lens 121c-11 (the pixel output unit is configured by two photodiodes 121f-1 and 121f-2) is adopted, and the detection signal of only the photodiode 121f-1 in the left part in FIG. 7 is used, whereby the same detection signal level as the state where the right side of the photodiode 121e-11 is shielded in the middle left part in FIG. 7 can be obtained.

That is, when the incident angle θ, which is an angle made by the incident light, becomes large (when the incident angle θ becomes large in the positive direction) with respect to the alternate long and short dash line indicating the center position of the on-chip lens 121c and perpendicular to the on-chip lens 121c, the light is focused to the range of the photodiode 121f-1 where the detection signal is read, so that the detection signal level becomes large. Conversely, when the light is further focused to the range of the photodiode 121f-2 where the detection value is not read as the incident angle θ is smaller (the incident angle θ is larger in the negative direction), the detection signal level becomes smaller.

Furthermore, similarly, as illustrated in the lower right part in FIG. 7, a configuration in which the two photodiodes 121f-11 and 121f-12 are provided for one on-chip lens 121c-12 is adopted, and the detection signal of only the photodiode 121f-12 in the right part in FIG. 7 is used, whereby a detection signal of an output pixel unit at the same detection signal level as the state where the left side of the photodiode 121e-12 is shielded in the middle right part in FIG. 7 can be obtained.

That is, when the incident angle θ, which is an angle made by the incident light, becomes large (when the incident angle θ becomes large in the positive direction) with respect to the alternate long and short dash line indicating the center position of the on-chip lens 121c and perpendicular to the on-chip lens 121c, the light is focused to the range of the photodiode 121f-11 having the detection signal not contributing to the detection signal of the output pixel unit, the detection signal level of the detection signal of the output pixel unit becomes small. Conversely, the light is further focused to the range of the photodiode 121f-12 having the detection signal contributing to the detection signal of the output pixel unit as the incident angle θ is smaller (the incident angle θ is larger in the negative direction), so that the detection signal level of the detection signal of the output pixel unit becomes larger.

Note that the incident angle directivity having higher randomness is more desirable. For example, when adjacent pixels have the same incident angle directivity, there is a possibility that the above-described equations (1) to (3) or the equations (4) to (6) to be described below become the same equations, and the relationship between unknowns, which will be a solution of the simultaneous equations, and the number of equations cannot be satisfied, and a pixel value configuring a restored image cannot be obtained. Furthermore, in the configurations illustrated in the middle part in FIG. 7, one photodiode 121e-11 and one photodiode 121e-12 are formed in the pixel 121a. In contrast, in the configurations illustrated in the lower part in FIG. 7, the two photodiodes 121f-1 and 121f-2 and the two photodiodes 121f-11 and 121f-12 are formed in the pixel 121a. Therefore, for example, in the lower part in FIG. 7, one pixel is not configured by the photodiode 121f alone.

Furthermore, as illustrated in the lower part in FIG. 7, in the case where one pixel output unit is configured by the plurality of photodiodes 121f, the output pixel value of the pixel output unit can be regarded to be modulated according to the incident angle. Therefore, the characteristic (incident angle directivity) of the output pixel value can be made different for each pixel output unit, and the incident angle directivity is set for each pixel output unit. Moreover, in the case where one pixel output unit is configured by the plurality of photodiodes 121f, one on-chip lens 121c is an indispensable configuration for one pixel output unit to generate the incident angle directivity in one pixel output unit.

Furthermore, as illustrated in the upper part in FIG. 7, in the case where one photodiode 121e-11 or one photodiode 121e-12 configures one pixel output unit, the incident light to one photodiode 121e-11 or one photodiode 121e-12 configuring one pixel output unit is modulated according to the incident angle, and as a result, the output pixel value is modulated. Therefore, the characteristic (incident angle directivity) of the output pixel value can be made different, and the incident angle directivity is set for each pixel output unit. Moreover, in the case where one photodiode 121e-11 or one photodiode 121e-12 configures one pixel output unit, the incident angle directivity is independently set at the time of manufacturing by the light-shielding film 121b set for each pixel output unit.

Furthermore, as illustrated in the lower part in FIG. 7, in the case where the plurality of photodiodes 121f configures one pixel output unit, the number (the number of divisions for the photodiodes 121f configuring one pixel output unit) and positions of the plurality of photodiodes 121f for setting the incident angle directivity for each pixel output unit are independently set at the time of manufacturing for each pixel output unit. Moreover, which photodiode 121f among the photodiodes 121f is used to set the incident angle directivity can be switched at the time of capturing an image.

<Setting of Incident Angle Directivity>

Figure 8:
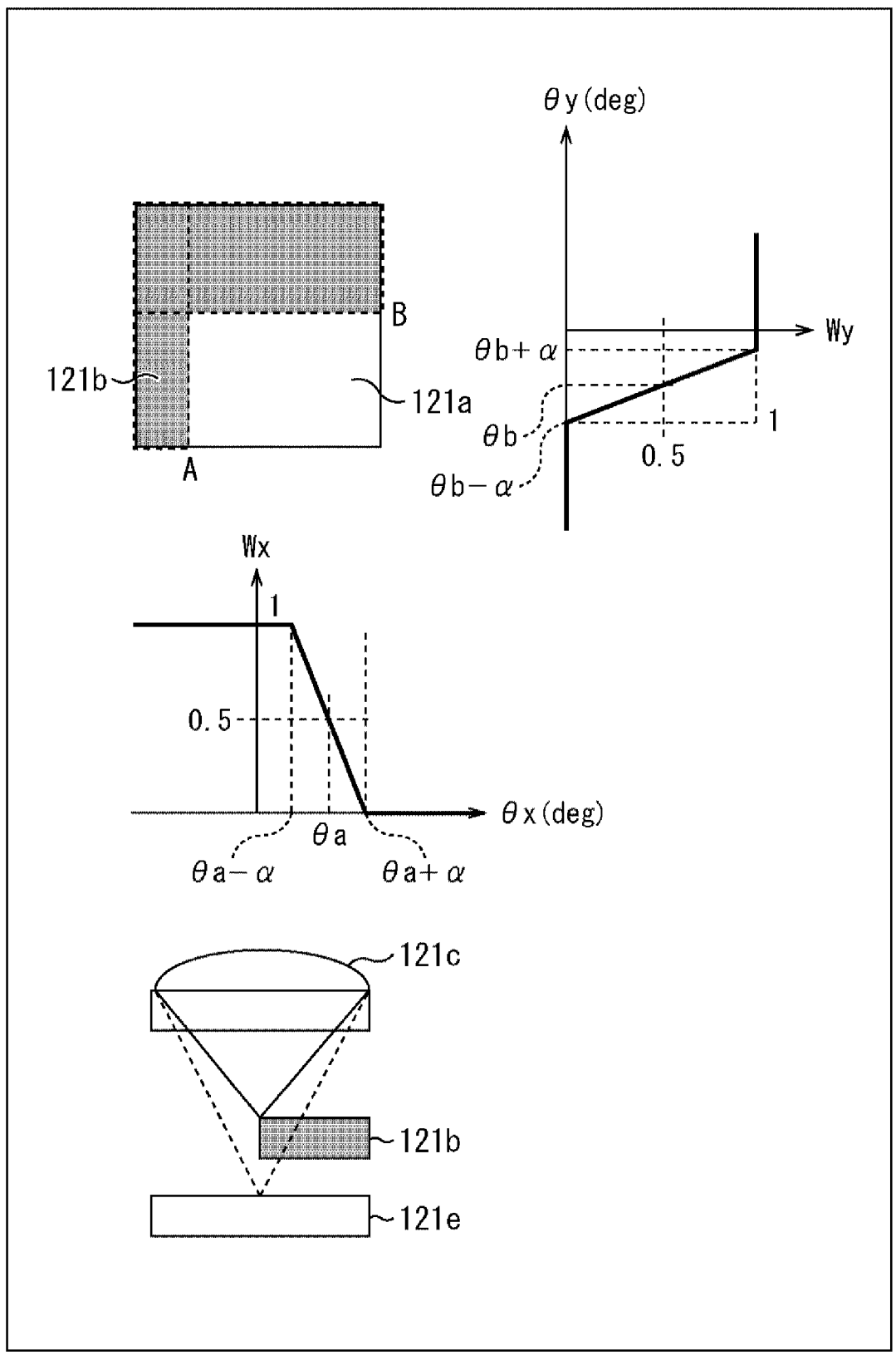
FIG. 8 is a diagram for describing a relationship between an object distance and a coefficient expressing the incident angle directivity.

For example, as illustrated in the upper part in FIG. 8, setting ranges of the light-shielding film 121b are a range from a left end to a position A in the horizontal direction in the pixel 121a and a range from an upper end to a position B in the vertical direction in the pixel 121a.

In this case, a weight Wx of 0 to 1 in the horizontal direction, which is an index of the incident angle directivity, is set according to an incident angle θx (deg) from a horizontal center position of each pixel. More specifically, in the case of assuming that the weight Wx becomes 0.5 at the incident angle θx=θa corresponding to the position A, a weight Wh is set such that Wx becomes 1 at the incident angle θx<θa−α, the weight Wx becomes $(-(\theta x-\theta a)/2\alpha+\frac{1}{2})$ when θa−α≤the incident angle θx≤θa+α, and the weight Wx becomes 0 at the incident angle θx>θa+α. Note that, here, examples in which the weight Wh is 0, 0.5, and 1 will be described. However, the weight Wh becomes 0, 0.5, and 1 when ideal conditions are satisfied.

Similarly, a weight Wy of 0 to 1 in the vertical direction, which is an index of the incident angle directivity, is set according to an incident angle θy (deg) from a vertical center position of each pixel. More specifically, in the case of assuming that a weight Wv becomes 0.5 at the incident angle θy=θb corresponding to the position B, the weight Wy is set such that the weight Wy becomes 0 at the incident angle θy<θb−α, the weight Wy becomes $((\theta y-\theta b)/2\alpha+\frac{1}{2})$ when θb−α≤the incident angle θy≤θb+α, and the weight Wy becomes 1 at the incident angle θy>θb+α.

Then, coefficients corresponding to the incident angle directivities of the pixel 121a, that is, corresponding to the light-receiving sensitivity characteristics (coefficient set) can be obtained by using the weights Wx and Wy thus obtained.

Furthermore, at this time, an inclination ($\frac{1}{2}\alpha$) indicating a change in the weight in a range where the horizontal weight Wx and the vertical weight Wy are around 0.5 can be set by using the on-chip lenses 121c having different focal lengths.

In other words, different focal lengths can be obtained by using the on-chip lenses 121c having different curvatures.

For example, the inclination (½α) becomes steep when the focal length is condensed to be on the light-shielding film 121b, as illustrated by the solid line in the lower part in FIG. 8, by using the on-chip lenses 121c having different curvatures. That is, the horizontal weight Wx and the vertical weight Wy in the upper part in FIG. 8 abruptly change to 0 or 1 near a boundary of the horizontal incident angle θx=θa and the vertical incident angle θy=θb, which are around 0.5.

Furthermore, for example, the inclination (½α) becomes gentle when the focal length is condensed to be on the photodiode 121e, as illustrated by the dotted line in the lower part in FIG. 8, by using the on-chip lenses 121c having different curvatures. That is, the horizontal weight Wx and the vertical weight Wy in the upper part in FIG. 8 gently change to 0 or 1 near the boundary of the horizontal incident angle θx=θa and the vertical incident angle θy=θb, which are around 0.5.

As described above, different incident angle directivities, that is, different light-receiving sensitivity characteristics can be obtained by having different focal lengths by using the on-chip lenses 121c having different curvatures.

Therefore, the incident angle directivity of the pixel 121a can be set to a different value by making the range in which the photodiode 121e is shielded from light by the light-shielding film 121b different from the curvature of the on-chip lens 121c. Note that the curvatures of the on-chip lenses may be the same in all the pixels in the imaging element 121 or may be different in some pixels.

<Difference Between On-Chip Lens and Imaging Lens>

As described above, the imaging element 121 does not require an imaging lens. Note that the on-chip lens 121c is at least necessary in the case of implementing the incident angle directivity using the plurality of photodiodes in the pixel, as described with reference to FIG. 5. The on-chip lens 121c and the imaging lens have different physical functions.

The imaging lens has a light condensing function for causing incident light incident from the same direction to enter a plurality of pixels adjacent to each other. In contrast, light passing through the on-chip lens 121c enters only the light-receiving surface of the photodiode 121e or 121f configuring one corresponding pixel. In other words, the on-chip lens 121c is provided for each pixel output unit and condenses the object light incident entering the on-chip lens 121c itself to only the corresponding pixel output unit. That is, the on-chip lens 121c does not have a light condensing function for causing the diffused light emitted from a virtual point light source to enter a plurality of pixels adjacent to each other.

<Distance Relationship Between Object Plane and Imaging Element>

Next, a distance relationship between the object plane and the imaging element 121 will be described with reference to FIG. 9.

Figure 9:
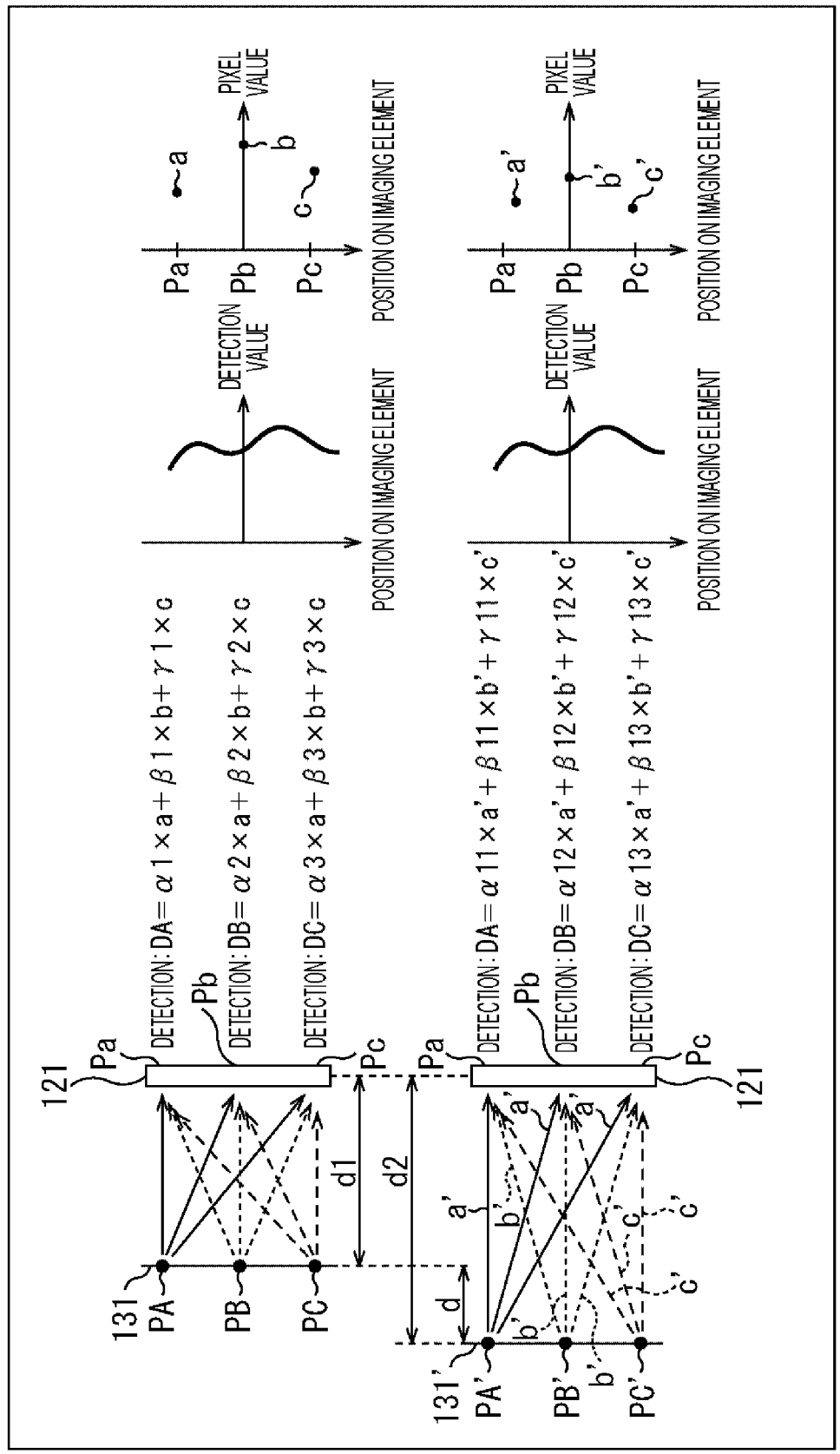
FIG. 9 is a diagram for describing a relationship between a narrow-angle-of-view pixel and a wide-angle-of-view pixel.

As illustrated in the upper left part in FIG. 9, in the case where an object distance between the imaging element 121 and the object plane 131 is a distance d1, it is assumed that the detection signal levels DA, DB, and DC at the positions Pa, Pb, and Pc on the corresponding imaging element 121 can be expressed by the same equations as the above-described equations (1) to (3) when setting the point light sources PA, PB, and PC on the object plane 131, for example.

$$DA = \alpha 1 \times a + \beta 1 \times b + \gamma 1 \times c \quad (1)$$

$$DB = \alpha 2 \times a + \beta 2 \times b + \gamma 2 \times c \quad (2)$$

$$DC = \alpha 3 \times a + \beta 3 \times b + \gamma 3 \times c \quad (3)$$

In contrast, in a case of an object plane 131' in which the object distance between the imaging element 121 and the object plane 131' is a distance d2 that is larger than the distance d1 by d, as illustrated in the lower left part in FIG. 9, that is, in a case of the object plane 131' at a deeper position than the object plane 131, as viewed from the imaging element 121, the detection signal levels DA, DB, and DC are all similar, as illustrated in the upper center part and a lower center part in FIG. 9.

However, in this case, light beams having light intensities a', b', and c' from point light sources PA' PB', and PC' on the object plane 131' are received by each pixel of the imaging element 121. At this time, since the incident angles of the light beams having the light intensities a', b', and c' received on the imaging element 121 are different (change), different coefficient sets are required, and the detection signal levels DA, DB, and DC at the respective positions Pa, Pb, and Pc are expressed by the following equations (4) to (6), for example.

[Math. 2]

$$DA = \alpha 11 \times a' + \beta 11 \times b' + \gamma 11 \times c' \quad (4)$$

$$DB = \alpha 12 \times a' + \beta 12 \times b' + \gamma 12 \times c' \quad (5)$$

$$DC = \alpha 13 \times a' + \beta 13 \times b' + \gamma 13 \times c' \quad (6)$$

Here, a coefficient set group including a coefficient set α11, β11, and γ11, a coefficient set α12, β12, and γ12, and a coefficient set α13, β13, and γ13 is a coefficient set group of the object plane 131' corresponding to a coefficient set α1, β1, and γ1, a coefficient set α2, β2, and γ2, and a coefficient set α3, β3, and γ3 on the object plane 131.

Therefore, by solving the equations (4) to (6) using the preset coefficient set group α11, β11, γ11, α12, β12, γ12, α13, β13, and γ13, the light intensities (a', b', and c') of the light beams from the point light sources PA', PB', and PC' can be obtained as illustrated in the lower right part in FIG. 9, and as a result, a restored image of the object on the object plane 131' can be obtained, by a similar technique to the technique of obtaining the light intensities (a, b, and c) of the light beams at the point light sources PA, PB, and PC in the case of the object plane 131 illustrated in the upper right part in FIG. 9.

That is, in the imaging device 100 in FIG. 1, the coefficient set group for each distance from the imaging element 121 to the object plane is stored in advance, the simultaneous equations are configured by switching the coefficient set group, and the configured simultaneous equations are solved, whereby restored images of the object planes at various object distances can be obtained on the basis of one detection image.

That is, by simply capturing a detection image once, a restored image at an arbitrary distance can be generated by switching the coefficient set group according to the distance to the object plane and obtaining the restored image in subsequent processing.

Furthermore, in a case of obtaining image recognition, a visible image, or characteristics of the object other than the visible image, machine learning such as deep learning is applied to the detection signal of the imaging element, and image recognition can be performed using the detection signal itself, without performing image recognition on the basis of the restored image after the restored image is obtained.

Furthermore, in a case where the object distance or an angle of view can be specified, the restored image may be generated using a detection image formed using a detection signal of a pixel having the incident angle directivity suitable for capturing an image of the object plane corresponding to the specified object distance or angle of view, without using all the pixels. By doing so, the restored image can be obtained using the detection signal of the pixel suitable for capturing an image of the object plane corresponding to the specified object distance or angle of view.

Figure 10:
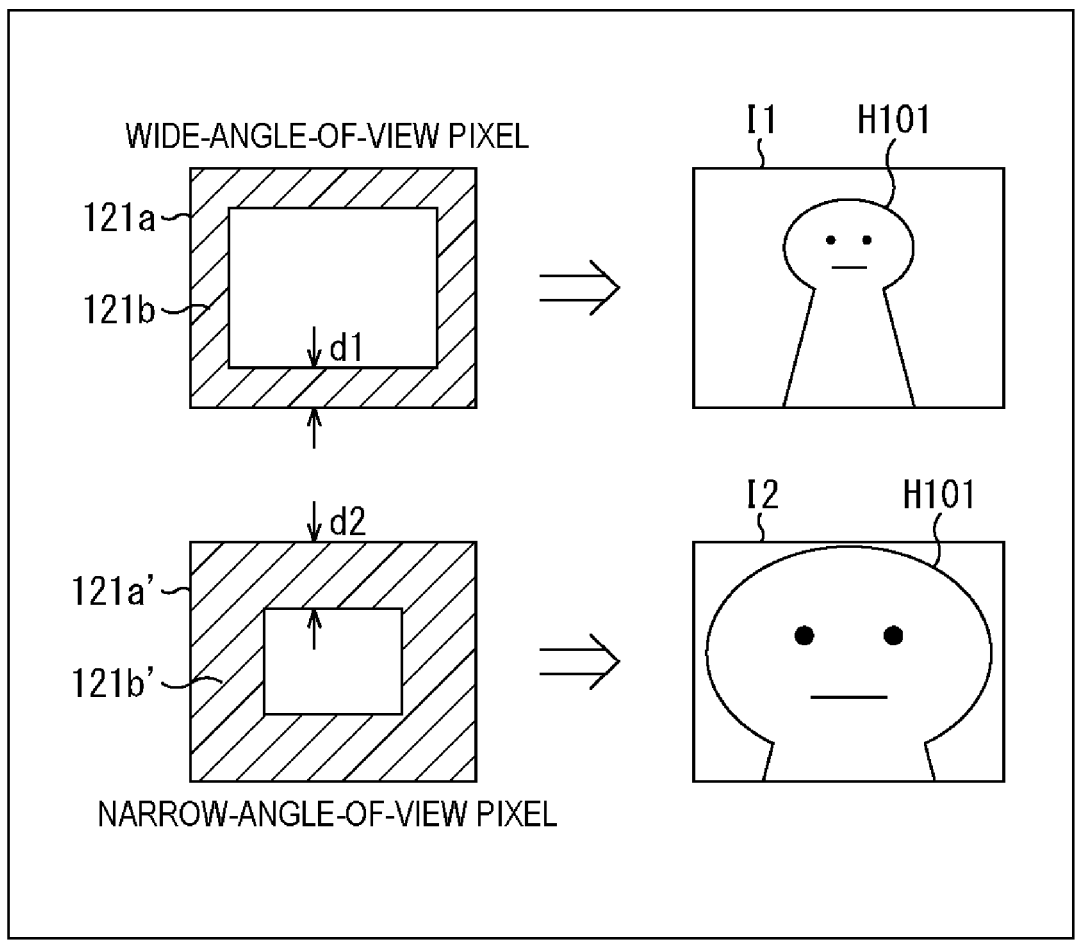
FIG. 10 is a diagram for describing a relationship between a narrow-angle-of-view pixel and a wide-angle-of-view pixel.

For example, consider the pixel 121a shielded by the light-shielding film 121b by a width d1 from respective ends of four sides, as illustrated in the upper part in FIG. 10, and a pixel 121a' shielded by the light-shielding film 121b by a width d2 (>d1) from respective ends of four sides, as illustrated in the lower part in FIG. 10.

Figure 11:
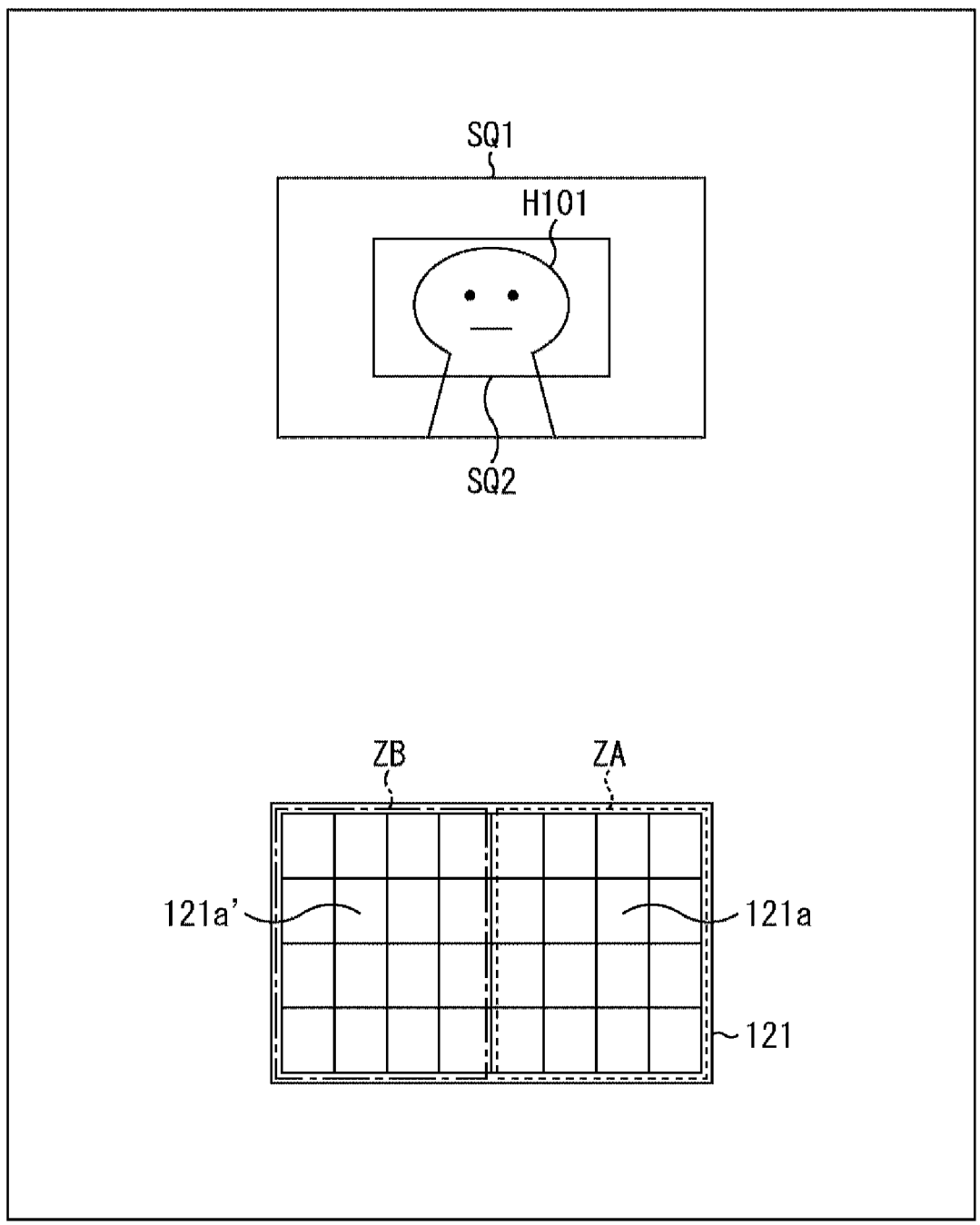
FIG. 11 is a diagram for describing a relationship between a narrow-angle-of-view pixel and a wide-angle-of-view pixel.

The pixel 121a is used for restoring an image I1 in FIG. 10 corresponding to an angle of view SQ1 including the entirety of a person H101 as an object, as illustrated in the upper part in FIG. 11, for example. In contrast, the pixel 121a' is used for restoring an image 12 in FIG. 10 corresponding to an angle of view SQ2 where the face and around the face of the person H101 as an object are zoomed up, as illustrated in the upper part in FIG. 11, for example.

Figure 12:
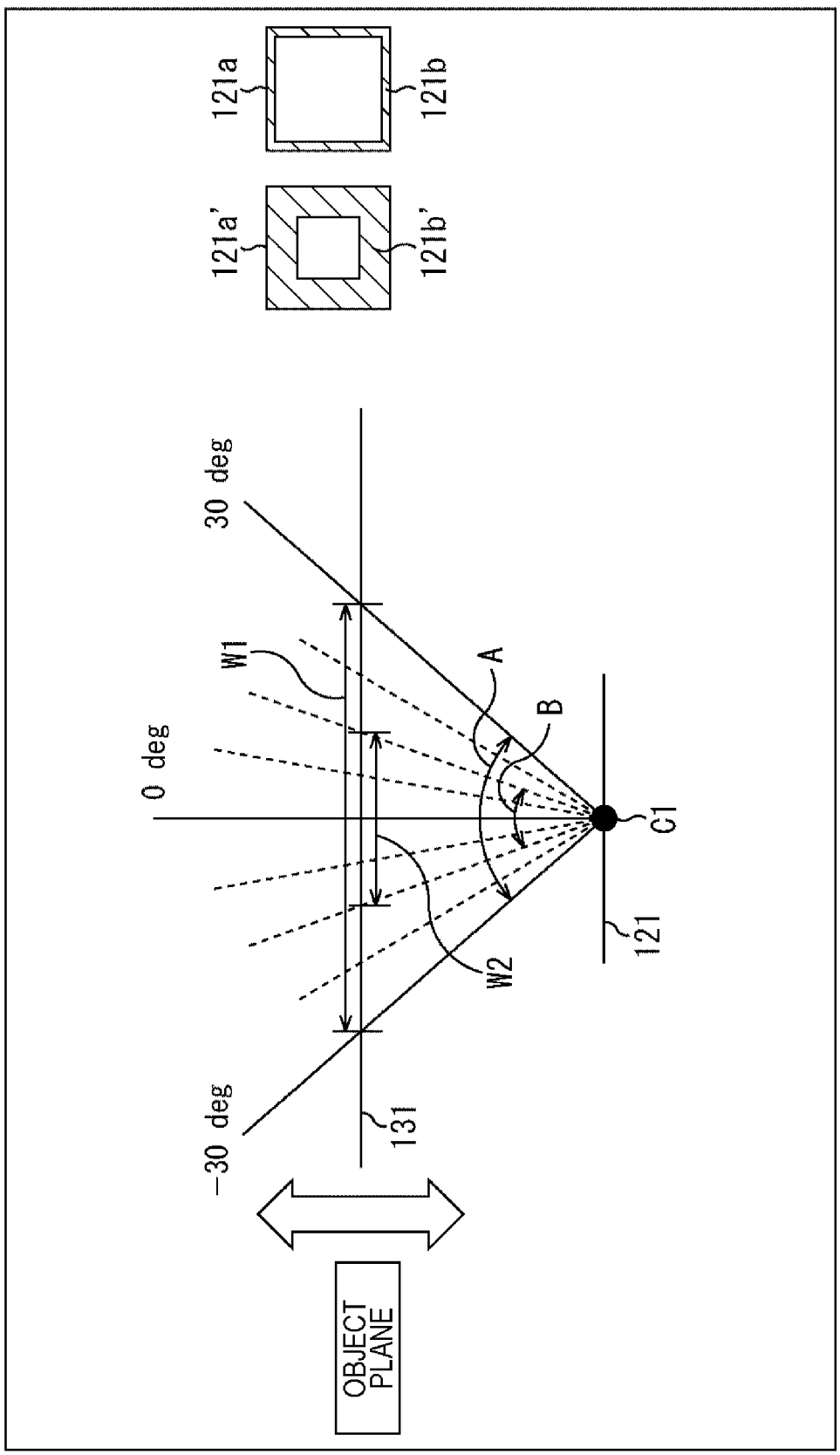
FIG. 12 is a diagram for describing a modification.

This is because the pixel 121a in FIG. 10 falls in an incidental angle range A of the incident light with respect to the imaging element 121, as illustrated in the left part in FIG. 12, and thus can receive the incident light for an object width W1 in the horizontal direction on the object plane 131.

In contrast, the pixel 121a' in FIG. 10 is shielded wider than the pixel 121a in FIG. 10 and thus falls in an incidental angle range B (<A) of the incident light with respect to the imaging element 121, as illustrated in the left part in FIG. 12. Therefore, the pixel 121a' can receive the incident light for an object width W2 (<W1) in the horizontal direction on the object plane 131.

That is, the pixel 121a in FIG. 10 having a narrow light-shielding range is a wide-angle-of-view pixel suitable for capturing an image of a wide range on the object plane 131, whereas the pixel 121a' in FIG. 10 having a wider light-shielding range is a narrow-angle-of-view pixel suitable for capturing an image of a narrow range on the object plane 131. Note that the wide-angle-of-view pixel and the narrow-angle-of-view pixel referred to here are expressions for comparing the pixels 121a and 121a' in FIG. 10, and expressions for comparing pixels of other angles of view are not limited thereto.

Note that FIG. 12 illustrates a relationship between a position on the object plane 131 with respect to a center position C1 of the imaging element 121 and the incident angle of the incident light from the position. Furthermore, FIG. 12 illustrates the relationship between a position on the object plane 131 and the incident angle of the incident light from each position on the object plane 131 in the horizontal direction, but the same applies to the vertical direction. Furthermore, the pixels 121a and 121a' in FIG. 10 are illustrated in the right part in FIG. 12.

With such a configuration, in a case of a configuration in which a predetermined number of the pixels 121a in FIG. 10 are arranged in a range ZA surrounded by the dotted line and a predetermined number of the pixels 121a' in FIG. 10 are arranged in a range ZB surrounded by the alternate long and short dash line in the imaging element 121, as illustrated in the lower part in FIG. 11, the pixels 121a in FIG. 10 for capturing an image with the angle of view SQ1 are used when restoring an image of the angle of view SQ1 corresponding to the object width W1, whereby the image of the object width W1 on the object plane 131 can be appropriately restored.

Similarly, when restoring an image of the angle of view SQ2 corresponding to the object width W2, the detection signal level of the pixel 121a' in FIG. 10 for capturing an image of the angle of view SQ2 is used, whereby the image of the object width W2 can be appropriately restored.

Note that the lower part in FIG. 11 illustrates the configuration in which the predetermined number of pixels 121a' are provided on the left side in FIG. 11 and the predetermined number of pixels 121a are provided on the right side. However, this is an example for simple description. The pixels 121a and the pixels 121a' are desirably randomly arranged in a mixed manner.

As described above, since the angle of view SQ2 is narrower than the angle of view SQ1, a restored image with higher image quality can be obtained when restoring the image of the angle of view SQ2 having a narrower angle of view than when restoring the image of the angle of view SQ1 in the case of restoring the images of the angle of view SQ2 and the angle of view SQ1 using the same predetermined number of pixels.

That is, when considering obtainment of a restored image using the same number of pixels, a restored image with higher image quality can be obtained when restoring an image of a narrower angle of view.

Note that, in the case of obtaining an image of a wide angle of view as the restored image, all of the wide-angle-of-view pixels may be used or some of the wide-angle-of-view pixels may be used. Furthermore, in the case of obtaining an image of a narrow angle of view as the restored image, all of the narrow-angle-of-view pixels may be used or some of the narrow-angle-of-view pixels may be used.

By using the imaging element 121 as described above, an imaging lens, an optical element including a diffraction grating, a pinhole, and the like are not necessary (because the imaging element 121 is an imaging lens-free imaging element), accordingly. Therefore, the degree of freedom in designing the device can be increased, the device can be downsized in the incident direction of incident light, and the manufacturing cost can be reduced. Furthermore, a lens corresponding to an imaging lens for forming an optical image, such as a focus lens, is not required.

Moreover, by using the imaging element 121, restored images of various object distances and angles of view can be generated by solving the simultaneous equations selectively using the coefficient set group according to the object distances and angles of view, after simply acquiring the detection image.

Moreover, the imaging element 121 can have the incident angle directivity in pixel units and thus can implement a multi-pixel configuration, as compared with an optical filter including a diffraction grating, a conventional imaging element, or the like. Furthermore, the imaging element 121 can obtain a restored image with high resolution and high angular resolution. Meanwhile, an imaging device including an optical filter and a conventional imaging element is affected by optical diffraction due to miniaturization of the optical filter even if pixels are miniaturized. Therefore, high resolution and the like of the restored image are difficult.

Furthermore, since the imaging element 121 does not require the optical filter including a diffraction grating and the like, a situation where use environment becomes hot and the optical filter is distorted due to heat does not happen. Therefore, by using such an imaging element 121, a device with high environmental resistance can be implemented.

<First Modification>

In the right part in FIG. 3, as the configuration of the light-shielding film 121b in each pixel 121a of the imaging element 121, an example in which the entire pixel 121a is shielded in the vertical direction and the light-shielding width and position are changed in the horizontal direction so as to obtain the difference in the incident angle directivity in the horizontal direction has been described. However, the configuration of the light-shielding film 121b is not limited to this example. For example, the entire pixel 121a may be shielded in the horizontal direction and the width (height) or position in the vertical direction may be changed to obtain the difference in the incident angle directivity in the vertical direction.

Note that, as in the example illustrated in the right part in FIG. 3, the light-shielding film 121b that shields the entire pixel 121a in the vertical direction and shields the pixel 121a with a predetermined width in the horizontal direction is referred to as a horizontal band-type light-shielding film 121b. In contrast, the light-shielding film 121b that shields the entire pixel 121a in the horizontal direction and shields the pixel 121a at a predetermined height in the vertical direction is referred to as a vertical band-type light-shielding film 121b.

Figure 13:
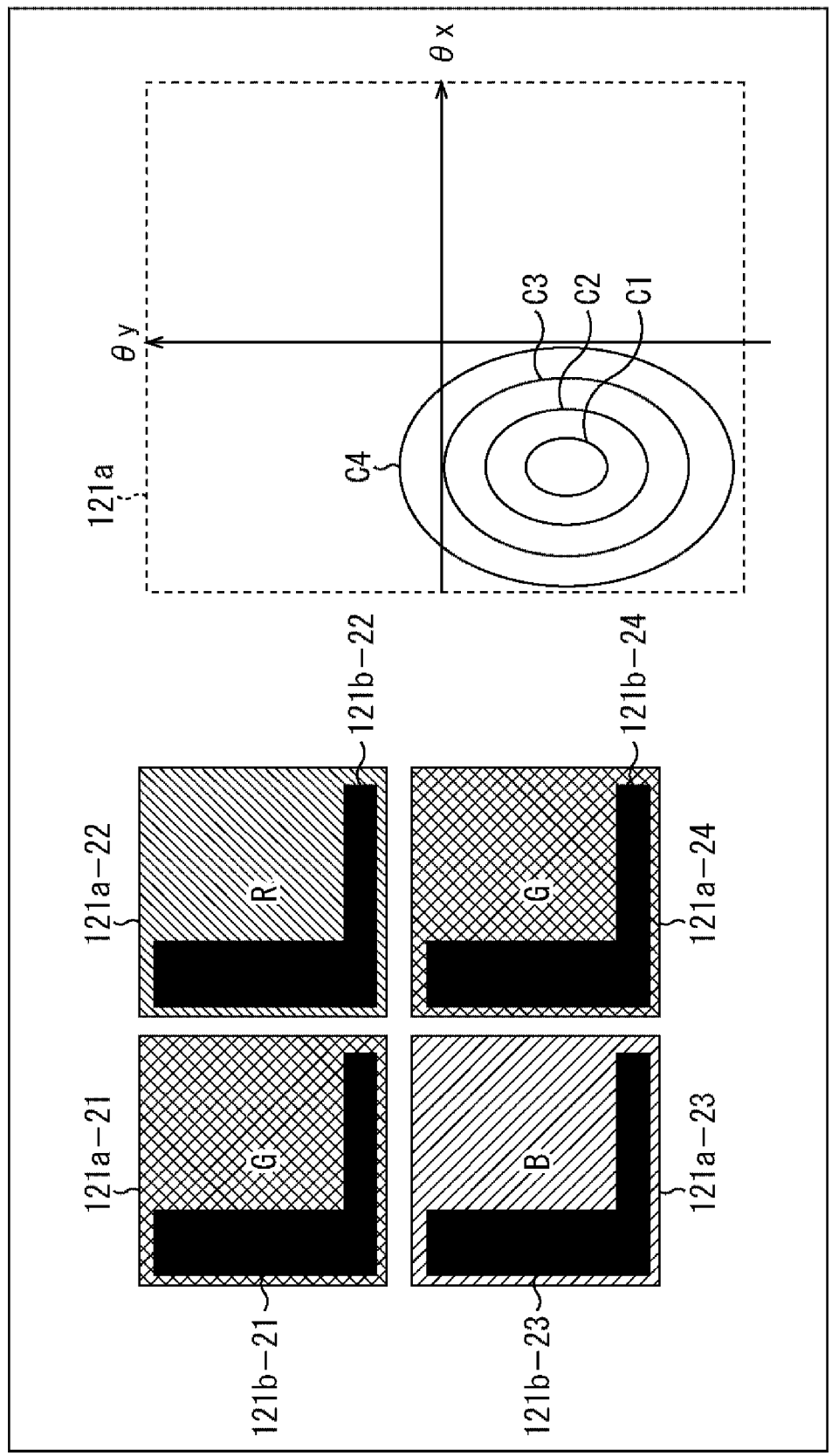
FIG. 13 is a diagram for describing a modification.

Furthermore, as in the examples illustrated in the left part in FIG. 13, the vertical band-type and the horizontal band-type light-shielding films 121b may be combined to provide an L-shaped-type light-shielding film 121b in the pixel 121a. In the left part in FIG. 13, the portions illustrated in black are the light-shielding films 121b. That is, light-shielding films 121b-21 to 121b-24 are the light-shielding films of pixels 121a-21 to 121a-24, respectively.

Each of these pixels (pixels 121a-21 to 121a-24) has the incident angle directivity as illustrated in the right part in FIG. 13. The graph in the right part in FIG. 13 illustrates the light-receiving sensitivity in each pixel. The horizontal axis represents the incident angle θx of the incident light in the horizontal direction (x direction), and the vertical axis represents the incident angle θy of the incident light in the vertical direction (y direction). Then, the light-receiving sensitivity within a range C4 is higher than that in the outside of the range C4, the light-receiving sensitivity within a range C3 is higher than that in the outside of the range C3, and the light-receiving sensitivity within a range C2 is higher than that in the outside of the range C2, and the light-receiving sensitivity within a range C1 is higher than that in the outside of the range C1.

Therefore, for each pixel, the detection signal level of the incident light that satisfies conditions of the incident angle θx in the horizontal direction (x direction) and the incident angle θy in the vertical direction (y direction) within the range C1 becomes the highest, and the detection signal level decreases in order of the conditions within the range C2, the range C3, the range C4, and the range outside the range C4. Such intensity of the light-receiving sensitivity is determined according to the range shielded by the light-shielding film 121b.

Furthermore, in the left part in FIG. 13, the alphabet in each pixel 121a represents a color of the color filter (which is illustrated for convenience of description and is not actually written). The pixel 121a-21 is a G pixel in which a green color filter is arranged, the pixel 121a-22 is an R pixel in which a red color filter is arranged, the pixel 121a-23 is a B pixel in which a blue color filter is arranged, and the pixel 121a-24 is a G pixel in which a green color filter is arranged. That is, these pixels form a Bayer array. Of course, this is an example, and the arrangement pattern of the color filters is arbitrary. The arrangement of the light-shielding film 121b and the color filter are irrelevant. For example, a filter other than a color filter may be provided in some or all of the pixels or no filter may be provided.

The left part in FIG. 13 illustrates an example in which the "L-shaped" light-shielding film 121b shields the left side and the lower side of the pixel 121a in FIG. 13. However, the direction of the "L-shaped" light-shielding film 121b is arbitrary and is not limited to the example in FIG. 13. For example, the "L-shaped" light-shielding film 121b may shield the lower side and the right side of the pixel 121a in FIG. 13, may shield the right side and the upper side of the pixel 121a in FIG. 13, or may shield the upper side and the left side of the pixel 121a in FIG. 13. Of course, the direction of the light-shielding film 121b can be independently set for each pixel. Note that the "L-shaped" light-shielding film 121b is also referred to as "L-shaped-type light-shielding film 121b".

Although the light-shielding film has been described above, the description of this example can also be applied to the case of obtaining the incident angle directivity by selectively using a plurality of photodiodes arranged in a pixel. That is, for example, by appropriately setting a division position (size and shape of each partial region), or the position, size, shape, and the like of each photodiode, or by appropriately selecting the photodiode, incident angle directivity equivalent to the incident angle directivity by the above-described L-shaped-type light-shielding film 121b can be implemented.

<Second Modification>

In the above modification, an example of arranging the horizontal band-type, vertical band-type, and L-shaped-type light-shielding films in each pixel such that the shielded range is randomly changed has been described. However, for example, in a case of providing a rectangular opening as illustrated in an imaging element 121' in FIG. 14, a light-shielding film 121b (the range illustrated in black in FIG. 14) for shielding a range other than a range near positions where light beams are received in an individual pixel may be configured.

That is, in the case of providing a rectangular opening, the pixel may be provided with the light-shielding film 121b having the incident angle directivity to receive only light beams transmitted through the rectangular opening and received, among the light beams emitted from a point light source configuring an object plane at a predetermined object distance.

Figure 14:
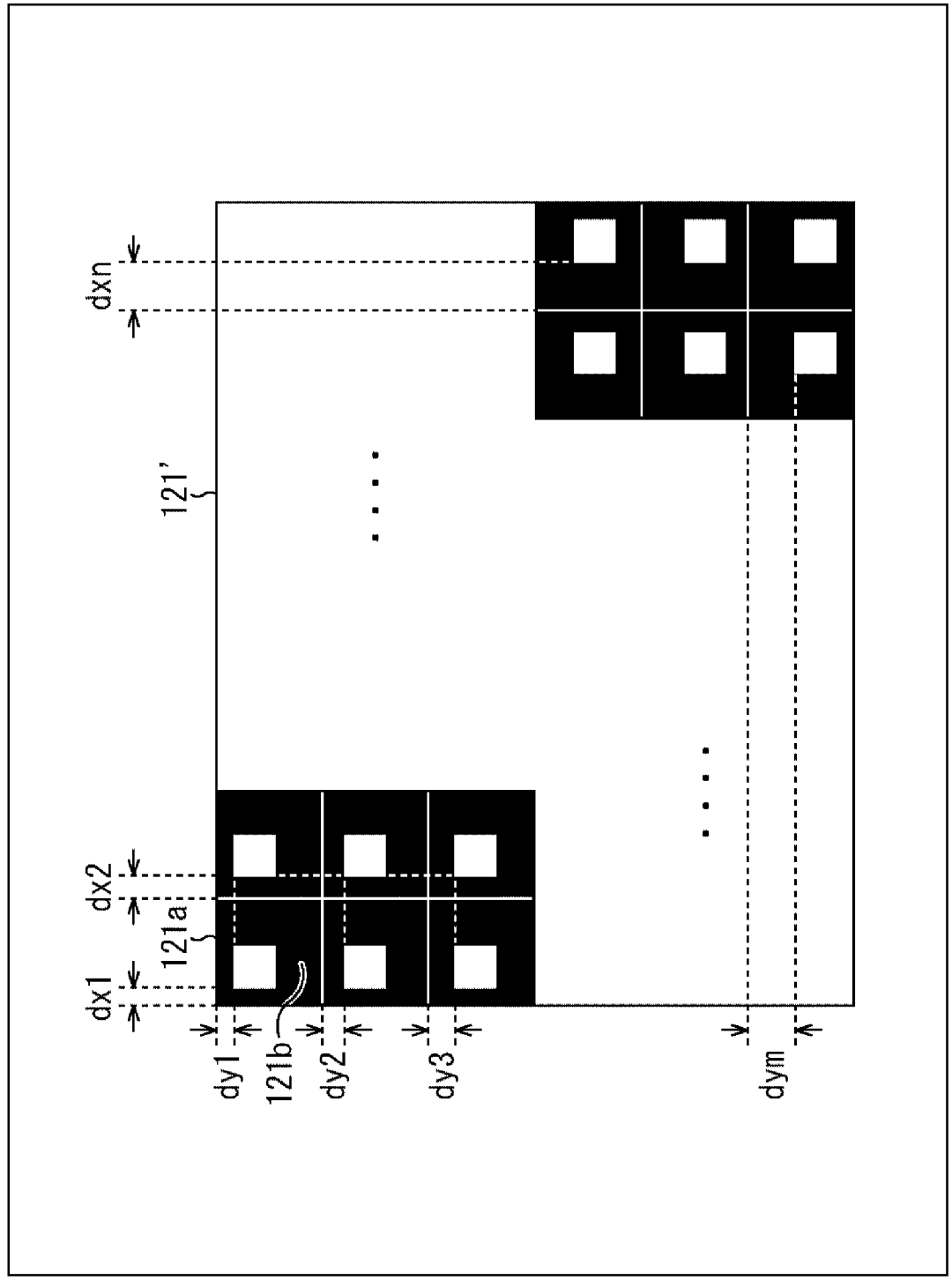
FIG. 14 is a diagram for describing a modification.

Note that in FIG. 14, the width in the horizontal direction of the light-shielding film 121b changes in such a manner as widths dx1, dx2, . . . , and dxn with respect to the pixel array in the horizontal direction, for example. The widths satisfy a relationship of dx1<dx2< . . . <dxn. Similarly, the height in the vertical direction of the light-shielding film 121b changes in such a manner as heights dy1, dy2, . . . , and dym with respect to the pixel array in the vertical direction, for example. The heights satisfy a relationship of dy1<dy2< . . . <dxm. Furthermore, the change intervals of the width in the horizontal direction and the width in the vertical direction of the light-shielding film 121b depend on the object resolution (angular resolution) to be restored.

In other words, it can be said that the configuration of each pixel 121a in the imaging element 121' in FIG. 14 has the incident angle directivity so as to change the shielding range corresponding to the pixel arrangement in the imaging element 121' in the horizontal direction and the vertical direction.

Figure 15:
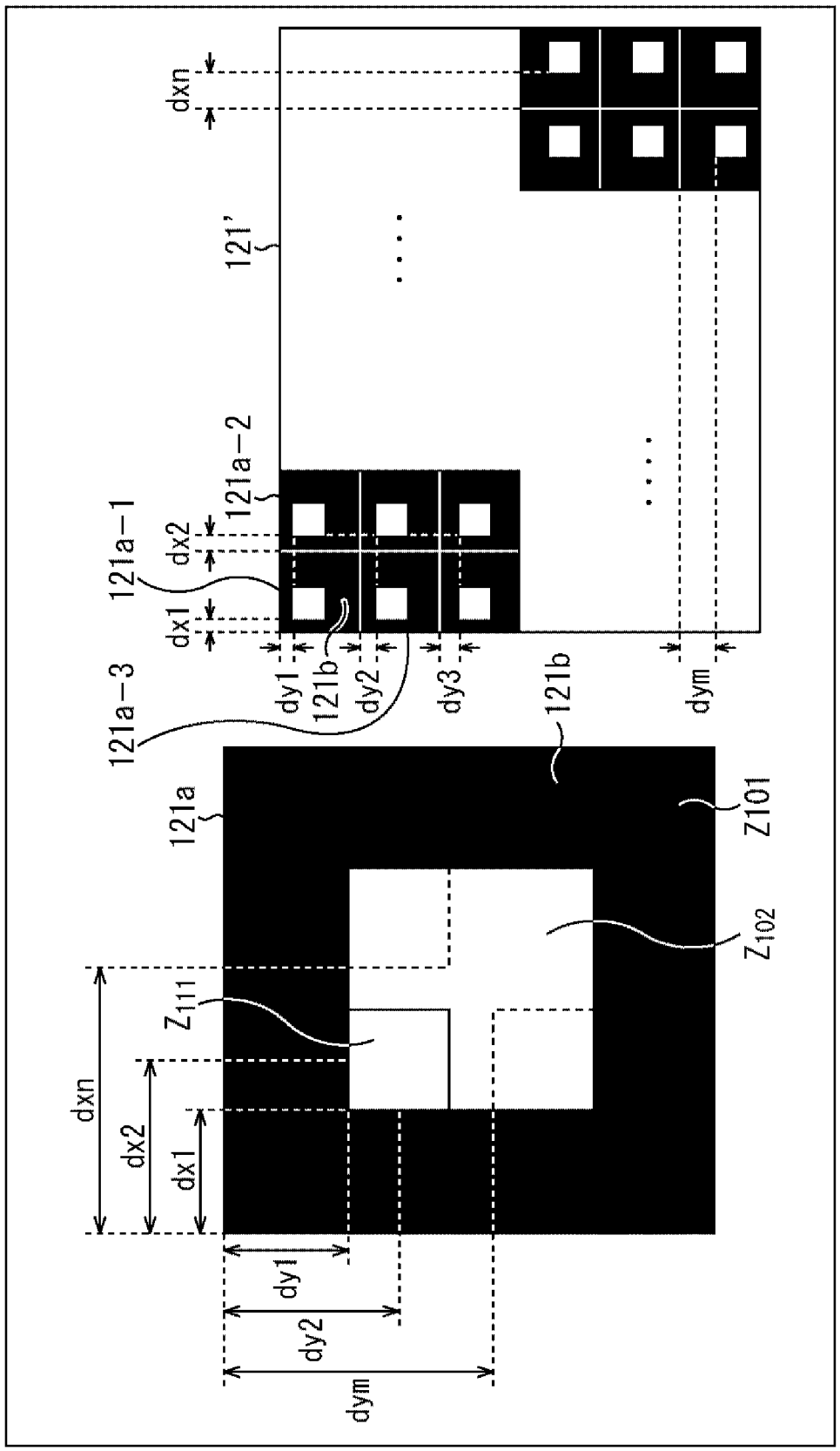
FIG. 15 is a diagram for describing an example of changing an angle of view by applying a modification.

More specifically, the light-shielding range of each pixel 121a in FIG. 14 is determined in accordance with a rule described using the pixel 121a illustrated in the left part in FIG. 15, for example.

Note that the right part in FIG. 15 illustrates a configuration of the same imaging element 121' as FIG. 14. Furthermore, the left part in FIG. 15 illustrates a configuration of the pixel 121a of the imaging element 121' in the right part in FIG. 15 (the same as FIG. 14).

As illustrated in the left part in FIG. 15, the pixel 121a is shielded by the light-shielding film 121b by the width dx1 from an upper side end and a lower side end of the pixel 121a toward the inside of the pixel 121a, and the pixel 121a is shielded by the light-shielding film 121b by the height dy1 from a left side end and a right side end toward the inside of the pixel 121a. Note that, in FIGS. 15 and 16, the light-shielding film 121b is the range illustrated in black.

In the left part in FIG. 15, the range shielded by the light-shielding film 121b thus formed will be hereinafter referred to as a main light-shielded portion Z101 of the pixel 121a (a black portion in the left part in FIG. 15), and the square range other than the black portion will be referred to as a range Z102.

It is assumed that a rectangular opening Z111 that is not shielded by the light-shielding film 121b is provided in the range Z102 in the pixel 121a. Therefore, in the range Z102, a range other than the rectangular opening Z111 is shielded by the light-shielding film 121b.

In the pixel array in the imaging element 121' in FIG. 14, a left-end and upper-end pixel 121a-1 has a configuration in which the left side of the rectangular opening Z111 is arranged at the width dx1 from the left side of the pixel 121a, and the upper side of the rectangular opening Z111 is arranged at the distance dy1 from the upper side of the pixel 121a, as illustrated in the right part in FIG. 15 (the same as FIG. 14).

Similarly, a pixel 121a-2 on the right of the pixel 121a-1 has a configuration in which the left side of the rectangular opening Z111 is arranged at the width dx2 from the left side of the pixel 121a, and the upper side of the rectangular opening Z111 is arranged at the height dy1 from the upper side of the pixel 121a, and shields the range other than the rectangular opening Z111 using the light-shielding film 121b.

Hereinafter, similarly, in the pixel 121a adjacent in the horizontal direction, the right side of the rectangular opening Z111 moves to the widths dx1, dx2, . . . , and dxn from the right side of the pixel 121a toward the right side of the arrangement in FIG. 15 (FIG. 14). Note that the dotted line square portion in the upper right part in the range Z102 in FIG. 15 illustrates a state of when the left side of the rectangular opening Z111 is arranged at the width dxn from the left side of the pixel 121a, and the upper side of the rectangular opening Z111 is arranged at the height dy1 from the upper side of the pixel 121a. Furthermore, each interval of the widths dx1, dx2, . . . , and dxn is a value obtained by subtracting the width of the rectangular opening Z111 from the width in the horizontal of the range Z102 and dividing the resultant width by the number of pixels n in the horizontal direction. That is, the interval of change in the horizontal direction is determined by dividing the width by the number of pixels n in the horizontal direction.

Furthermore, the position in the horizontal direction of the rectangular opening Z111 in the pixel 121a in the imaging element 121' is the same among the pixels 121a (pixels 121a in the same column) at the same position in the horizontal direction in the imaging element 121'.

Moreover, a pixel 121a-3 immediately below the pixel 121a-1 has a configuration in which the left side of the rectangular opening Z111 is arranged at the width dx1 from the left side of the pixel 121a, and the upper side of the rectangular opening Z111 is arranged at the height dy2 from the upper side of the pixel 121a, and shields the range other than the rectangular opening Z111 using the light-shielding film 121b.

Hereinafter, similarly, in the pixel 121a adjacent in the vertical direction, the upper side of the rectangular opening Z111 moves to the heights dy1, dy2, . . . , and dyn from the upper side of the pixel 121a toward the lower side of the arrangement in FIG. 15 (FIG. 14). Note that the dotted line square portion in the lower left part in the range Z102 in FIG. 15 illustrates a state of when the left side of the rectangular opening Z111 is arranged at the width dx1 from the left side of the pixel 121a, and the upper side of the rectangular opening Z111 is arranged at the height dym from the upper side of the pixel 121a. Furthermore, each interval of the heights dy1, dy2, . . . , and dym is a value obtained by subtracting the height of the rectangular opening Z111 from the height in the vertical direction of the range Z102 and dividing the resultant height by the number of pixels m in the vertical direction. That is, the interval of change in the vertical direction is determined by dividing the height by the number of pixels m in the vertical direction.

Furthermore, the position in the vertical direction of the rectangular opening Z111 in the pixel 121a in the imaging element 121' is the same among the pixels 121a (pixels 121a in the same row) at the same position in the vertical direction in the imaging element 121'.

Moreover, the angle of view can be changed by changing the main light-shielded portion Z101 and the rectangular opening Z111 of each pixel 121a configuring the imaging element 121' illustrated in FIG. 15 (FIG. 14).

Figure 16:
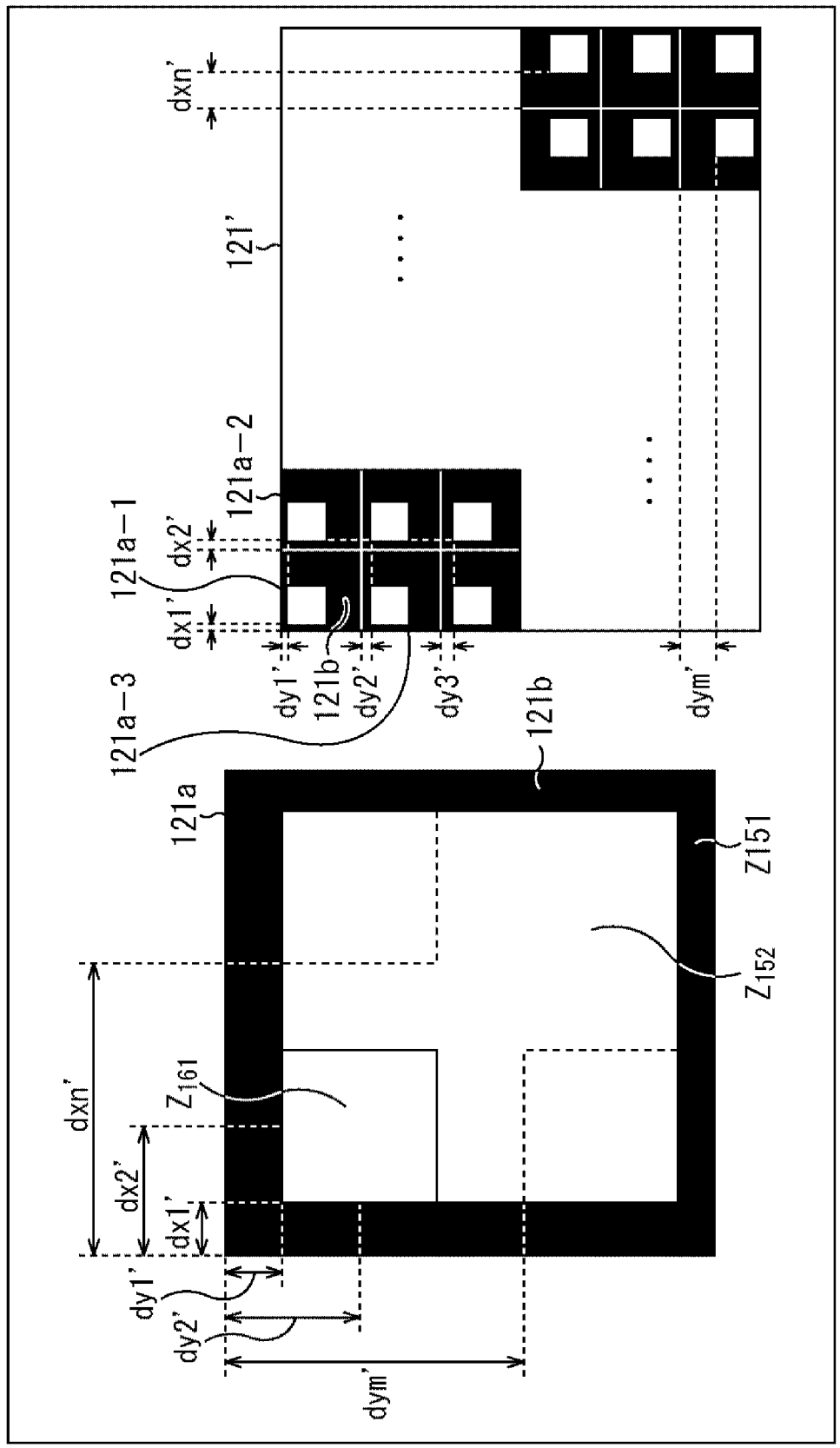
FIG. 16 is a diagram for describing an example of combining pixels of a plurality of angles of view when changing an angle of view by applying a modification.

The right part in FIG. 16 illustrates a configuration of the imaging element 121' in a case of making the angle of view wider than that of the imaging element 121' in FIG. 15 (FIG. 14). Furthermore, the left part in FIG. 16 illustrates a configuration of the pixel 121a of the imaging element 121' in the right part in FIG. 16.

That is, as illustrated in the left part in FIG. 16, a main light-shielded portion Z151 (the black portion in the left portion in FIG. 16) having a narrower light-shielding range than the main light-shielded portion Z101 in FIG. 15 is set in the pixel 121a, for example, and a range other than the main light-shielded portion Z151 is set as a range Z152. Moreover, a rectangular opening Z161 having a larger opening area than the rectangular opening Z111 is set in the range Z152.

More specifically, as illustrated in the left part in FIG. 16, the pixel 121a is shielded by the light-shielding film 121b by a width dx1' (<dx1) from an upper side end and a lower side end of the pixel 121a toward the inside of the pixel 121a, and the pixel 121a is shielded by the light-shielding film 121b by a height dy1' (<dy1) from a left side end and a right side end toward the inside of the pixel 121a, so that the rectangular opening Z161 is formed.

Here, as illustrated in the right part in FIG. 16, a left-end and upper-end pixel 121a-1 has a configuration in which the left side of the rectangular opening Z161 is arranged at the width dx1' from the left side of the pixel 121a, and the upper side of the rectangular opening Z161 is arranged at the height dy1' from the upper side of the pixel 121a, and shields the range other than the rectangular opening Z161 using the light-shielding film 121b.

Similarly, a pixel 121a-2 on the right of the pixel 121a-1 has a configuration in which the left side of the rectangular opening Z161 is arranged at the width dx2' from the left side of the pixel 121a, and the upper side of the rectangular opening Z161 is arranged at the height dy1' from the upper side of the pixel 121a, and shields the range other than the rectangular opening Z161 using the light-shielding film 121b.

Hereinafter, similarly, in the pixel 121a adjacent in the horizontal direction, the right side of the rectangular opening Z161 moves to the widths dx1', dx2', ..., and dxn' from the right side of the pixel 121a toward the right side of the arrangement in FIG. 16.

Here, each interval of the widths dx1', dx2', ..., and dxn' is a value obtained by subtracting the width in the horizontal direction of the rectangular opening Z161 from the width in the horizontal of the range Z152 and dividing the resultant width by the number of pixels n in the horizontal direction. That is, the interval of change in the vertical direction is determined by dividing the width by the number of pixels n in the horizontal direction. Therefore, the interval of change of the widths dx1', dx2', ..., and dxn' becomes larger than the interval of change of the widths dx1, dx2, ..., and dxn.

Furthermore, the position in the horizontal direction of the rectangular opening Z161 in the pixel 121a in the imaging element 121' in FIG. 16 is the same among the pixels 121a (pixels 121a in the same column) at the same position in the horizontal direction in the imaging element 121'.

Moreover, a pixel 121a-3 immediately below the pixel 121a-1 has a configuration in which the left side of the rectangular opening Z161 is arranged at the width dx1' from the left side of the pixel 121a, and the upper side of the rectangular opening Z161 is arranged at the height dy2' from the upper side of the pixel 121a, and shields the range other than the rectangular opening Z161 using the light-shielding film 121b.

Hereinafter, similarly, in the pixel 121a adjacent in the vertical direction, the upper side of the rectangular opening Z161 changes to the heights dy1', dy2', ..., and dym' from the upper side of the pixel 121a toward the lower side of the arrangement in FIG. 16. Here, the interval of change of the heights dy1', dy2', ..., and dym' is a value obtained by subtracting the height of the rectangular opening Z161 from the height in the vertical direction of the range Z152 and dividing the resultant height by the number of pixels m in the vertical direction. That is, the interval of change in the vertical direction is determined by dividing the height by the number of pixels m in the vertical direction. Therefore, the interval of change of the heights dy1', dy2', ..., and dym' becomes larger than the interval of change of the heights dy1, dy2, ..., and dym.

Furthermore, the position in the vertical direction of the rectangular opening Z161 in the pixel 121a in the imaging element 121' in FIG. 16 is the same among the pixels 121a (pixels 121a in the same row) at the same position in the vertical direction in the imaging element 121'.

As described above, by changing the combination of the light-shielding range of the main light-shielded portion and the opening range of the opening, the imaging element 121' including the pixels 121a having various angles of view (having various incident angle directivities) can be implemented.

Moreover, the imaging element 121 may be implemented by combining not only the pixels 121a having the same angle of view but also the pixels 121a having various angles of view.

Figure 17:
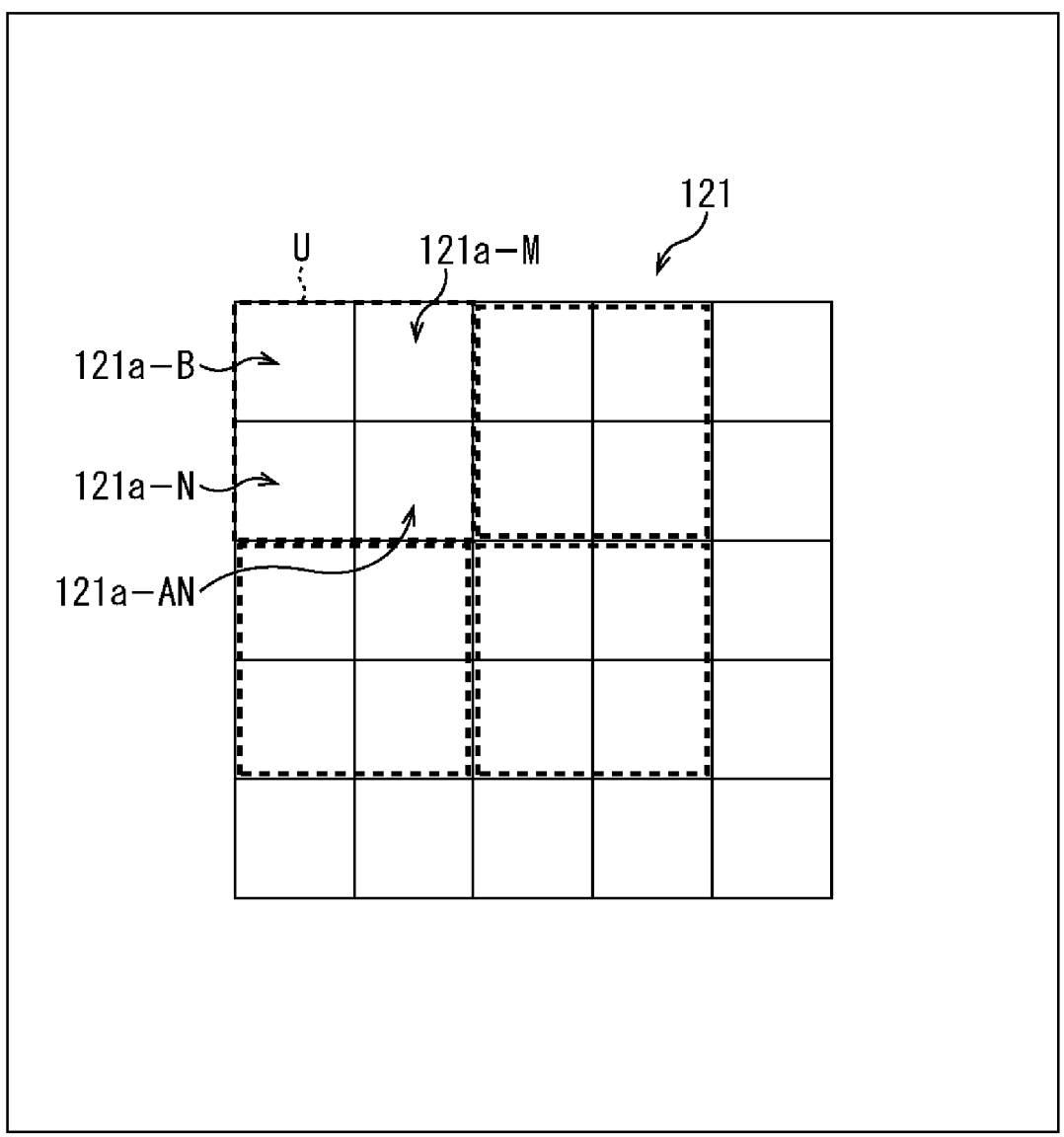
FIG. 17 is a diagram for describing a modification.

For example, as illustrated in FIG. 17, four pixels including two pixels×two pixels illustrated by the dotted line is set as one unit U, and each unit U is configured by four pixels of a pixel 121a-W of a wide angle of view, a pixel 121a-M of a middle angle of view, a pixel 121a-N of a narrow angle of view, and a pixel 121a-AN of an extremely narrow angle of view.

In a case where the number of pixels of all the pixels 121a is X, for example, a restored image can be restored using detection images of X/4 pixels for each of the four types of angles of view. At this time, four different types of coefficient sets are used for the respective angles of view, and restored images of different angles of view are restored by four different types of simultaneous equations.

Therefore, by restoring a restored image of an angle of view to be restored using detection images obtained from the pixels suitable for imaging the angle of view to be restored, appropriate restored images corresponding to the four types of angles of view can be restored.

Furthermore, images of middle angles of view of the four types of angles of view and images of angles of view around the middle angles of view may be interpolated from the images of the four types of angles of view, and a pseudo optical zoom may be implemented by seamlessly generating images of various angles of view.

Although the light-shielding film has been described above, the description of this example can also be applied to the case of obtaining the incident angle directivity by selectively using a plurality of photodiodes arranged in a pixel. That is, for example, by appropriately setting a division position (size and shape of each partial region), or the position, size, shape, and the like of each photodiode, or by appropriately selecting the photodiode, incident angle directivity equivalent to the incident angle directivity by the above-described light-shielding film 121b having the rectangular opening can be implemented. Of course, in this case, the imaging element 121 can be implemented by combining the pixels 121a of various angles of view. Furthermore, the image of the middle angle of view and images of angles of view around the middle angle of view may be interpolated from images of a plurality of types of angles of view, and a pseudo optical zoom may be implemented by seamlessly generating images of various angles of view.

<Third Modification>

By the way, in the case where the light-shielding range of the light-shielding film 121b of the pixel 121a in the imaging element 121 has randomness, the load of processing by the restoration unit 124 and the like becomes larger as the randomness of difference in the light-shielding range of the light-shielding film 121b is larger. Therefore, part of the difference in the light-shielding range of the light-shielding film 121b of the pixel 121a may be made regular to reduce the randomness of the difference, thereby reducing the processing load.

For example, an L-shaped-type light-shielding film 121b that is a combination of vertical band-type and the horizontal band-type light-shielding films is configured, and horizontal band-type light-shielding films 121b having the same width are combined for a predetermined column direction, and vertical band-type light-shielding films 121b having the same height are combined for a predetermined row direction. By doing so, the light-shielding range of the light-shielding film 121b of each pixel 121a is set to a randomly different value in pixel units while having regularity in the column direction and the row direction. As a result, the randomness of the difference in the light-shielding range of the light-shielding film 121b of each pixel 121a, that is, the difference of the incident angle directivity of each pixel is reduced, and the processing load outside the imaging element 121 such as the restoration unit 124 can be reduced.

Figure 18:
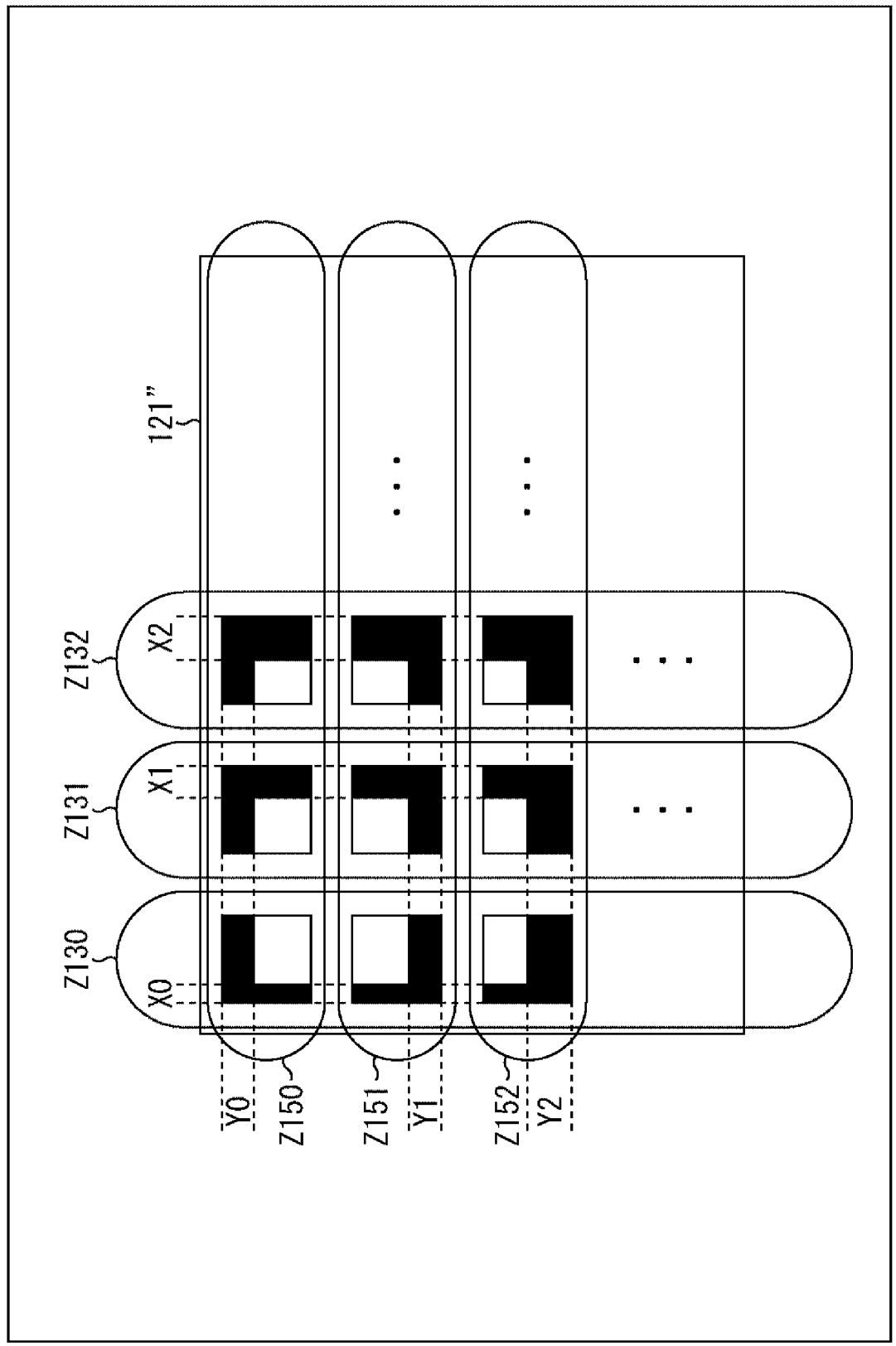
FIG. 18 is a diagram for describing a modification.

For example, in the case of an imaging element 121" in FIG. 18, horizontal band-type light-shielding films 121b having the same width X0 are used for all the pixels in the same column illustrated in a range Z130, and vertical band-type light-shielding films 121b having the same height Y0 are used for all the pixels in the same row illustrated in a range Z150. An L-shaped-type light-shielding film 121b in which the aforementioned horizontal band-type and vertical band-type light-shielding films 121b are combined is set for the pixel 121a specified by each matrix.

Similarly, horizontal band-type light-shielding films 121b having the same width X1 are used for all the pixels in the same column illustrated in a range Z131 adjacent to the range Z130, and vertical band-type light-shielding films 121b having the same height Y1 are used for all the pixels in the same row illustrated in a range Z151 adjacent to the range Z150. An L-shaped-type light-shielding film 121b in which the aforementioned horizontal band-type and vertical band-type light-shielding films 121b are combined is set for the pixel 121a specified by each matrix.

Moreover, horizontal band-type light-shielding films having the same width X2 are used for all the pixels in the same column illustrated in a range Z132 adjacent to the range Z131, and vertical band-type light-shielding films having the same height Y2 are used for all the pixels in the same row illustrated in a range Z152 adjacent to the range Z151. An L-shaped-type light-shielding film 121b in which the aforementioned horizontal band-type and vertical band-type light-shielding films are combined is set for the pixel 121a specified by each matrix.

In this manner, the range of the light-shielding film can be set to a different value in pixel units while the width and position in the horizontal direction and the height and position in the vertical direction of the light-shielding film 121b have regularity, whereby the randomness of the difference in the incident angle directivity can be suppressed. As a result, patterns of the coefficient sets can be reduced, and the processing load in arithmetic processing in a subsequent stage (for example, the restoration unit 124 or the like) can be reduced.

<Fourth Modification>

Variations in the shape of the light-shielding film 121b in pixel units are arbitrary and are not limited to the above examples. For example, different incident angle directivities may be obtained (set) by setting the light-shielding film 121b to have a triangular shape and making the range of the triangular shape different, or different incident angle directivities may be obtained by setting the light-shielding film 121b to have a circular shape and making the range of the circular shape different. Furthermore, for example, the light-shielding film 121b may be a diagonal linear light-shielding film.

Furthermore, a variation (pattern) of the light-shielding film 121b may be set in units of a plurality of pixels that configures a pattern unit including a predetermined number of multiple pixels. This one pattern unit may be configured by any type of pixels. For example, the imaging element 121 may include a color filter, and the pattern unit may be configured by pixels configuring a unit of a color array of the color filter. Furthermore, a pixel group in which pixels having different exposure times are combined may be set as a pattern unit. Note that it is more desirable that the patterns of the ranges shielded by the light-shielding films 121b of the pixels configuring the pattern unit are highly random, that is, the pixels configuring the pattern unit have different incident angle directivities.

Furthermore, an arrangement pattern of the light-shielding films 121b may be set between pattern units. For example, the width and position of the light-shielding film may be changed for each pattern unit. Moreover, the pattern of the range shielded by the light-shielding film 121b may be set in a pattern unit including a plurality of pixels classified by different categories or between pattern units.

Although the light-shielding film has been described above, the description of this example can also be applied to the case of obtaining the incident angle directivity by selectively using a plurality of photodiodes arranged in a pixel. That is, for example, by appropriately setting a division position (size and shape of each partial region), or the position, size, shape, and the like of each photodiode, or by appropriately selecting the photodiode, incident angle directivity equivalent to the incident angle directivity in the case where part of change in the range shielded by the light-shielding film 121b of the pixel 121a is made regular can be implemented. By doing so, the randomness in the incident angle directivity of each pixel can be reduced and the processing load outside the imaging element 121 such as the restoration unit 124 can be reduced.

Although the light-shielding film has been described above, the description of this example can also be applied to the case of obtaining the incident angle directivity by selectively using a plurality of photodiodes arranged in a pixel. That is, by appropriately setting a division position (size and shape of each partial region), or the position, size, shape, and the like of each photodiode, or by appropriately selecting the photodiode, incident angle directivity equivalent to the incident angle directivity by the light-shielding film having an arbitrary shape such as a triangular, circular, or diagonal linear shape can be implemented.

Furthermore, for example, the setting of the division position (size and shape of each partial region), setting of the position, size, shape, and the like of each photodiode, selecting of the photodiode, or the like may be set for each pattern unit, similarly to the case of the above-described light-shielding film 121b.

<Control of Photodiode>

In the case of selectively using a plurality of photodiodes arranged in a pixel as described with reference to FIG. 5, the incident angle directivity of the output pixel value of the pixel output unit may be variously changed by switching the presence or absence or the degree of contribution of each of the plurality of photodiodes 121f to the output pixel value of the pixel output unit.

Figure 19:
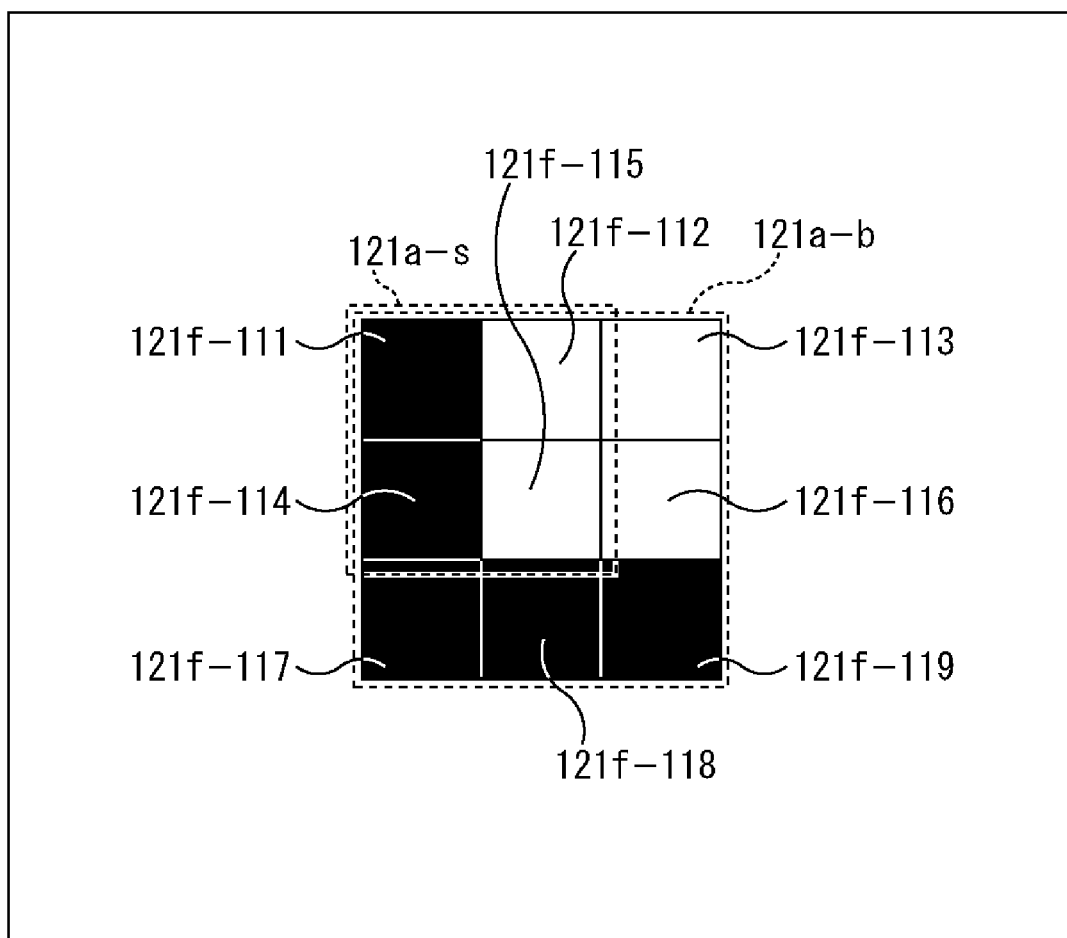
FIG. 19 is a diagram for describing a modification.

For example, as illustrated in FIG. 19, it is assumed that nine photodiodes 121f-111 to 121f-119 (vertically 3×horizontally 3) are arranged in the pixel 121a. In this case, the pixel 121a may be used as a pixel 121a-b having the photodiodes 121f-111 to 121f-119, or as a pixel 121a-s having the photodiodes 121f-111, 121f-112, 121f-114, and 121f-115.

For example, in the case where the pixel 121a is the pixel 121a-b, the incident angle directivity of the output pixel value is controlled by controlling the presence or absence or the degree of contribution of the photodiodes 121f-111 to 121f-119 to the output pixel value of the pixel 121a. In contrast, in the case where the pixel 121a is the pixel 121a-s, the incident angle directivity of the output pixel value is controlled by controlling the presence or absence or the degree of contribution of the photodiodes 121f-111, 121f-112, 121f-114, and 121f-115 to the output pixel value of the pixel 121*a*. In this case, the other photodiodes 121*f* (photodiodes 121*f*-113, 121*f*-116, and 121*f*-117 to 121*f*-119) are controlled not to contribute to the output pixel value.

That is, for example, in a case where the incident angle directivity of the output pixel value is different from each other between a plurality of the pixels 121*a*-*b*, the presence or absence or the degree of contribution of at least one of the photodiodes 121*f*-111 to 121*f*-119 to the output pixel value is different. In contrast, for example, in a case where the incident angle directivities of the output pixel values are different between a plurality of the pixels 121*a*-*s*, the presence or absence or the degree of contribution of at least one of the photodiodes 121*f*-111, 121*f*-112, 121*f*-114, and 121*f*-115 to the output pixel value is different, and the other photodiodes 121*f*-113, 121*f*-116, and 121*f*-117 to 121*f*-119 do not contribute to the output pixel value.

Note that whether the pixel 121*a* is the pixel 121*a*-*b* or the pixel 121*a*-*s* can be set for each pixel. Furthermore, this setting may be able to be performed for each pattern unit (for each plurality of pixels).

Figure 20:
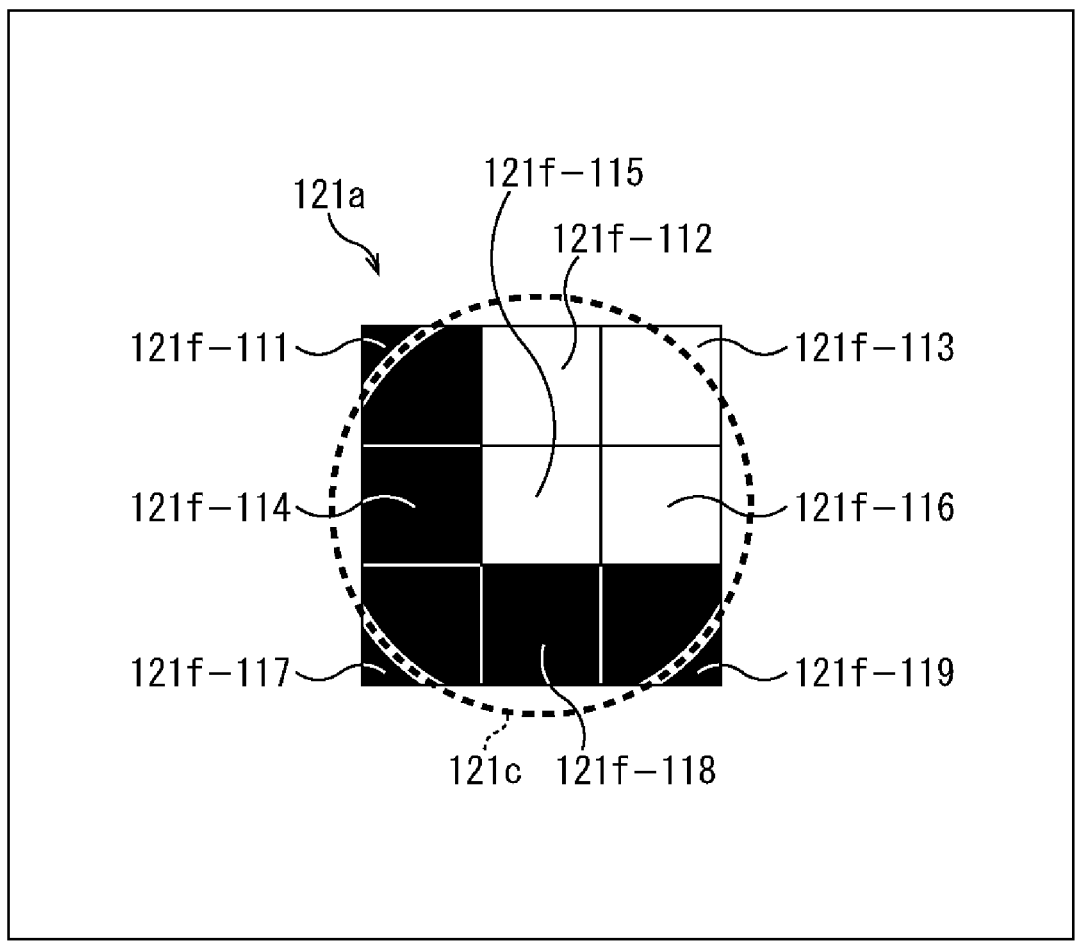
FIG. 20 is a diagram illustrating an example of a mask pattern by a light-shielding film.

Furthermore, as described above, one on-chip lens is formed for each pixel (each pixel output unit) of the imaging element 121. That is, in the case where the pixel 121*a* has a configuration as illustrated in FIG. 19, one on-chip lens 121*c* is provided for the photodiodes 121*f*-111 to 121*f*-119, as illustrated in FIG. 20. Therefore, in the case where the pixel 121*a* is the pixel 121*a*-*b* or the pixel 121*a*-*s*, as described with reference to FIG. 19, one pixel (one pixel output unit) and one on-chip lens 121*c* correspond on a one-to-one basis.

<Gap of Incident Angle Directivity>

As described with reference to FIG. 8, in the case of setting the incident angle directivity of the pixel using the light-shielding film, the angles (θx, θy) at which the weights (Wx, Wy) become a half value (0.5) are determined according to the position (setting range) of the light-shielding film.

Figure 21:
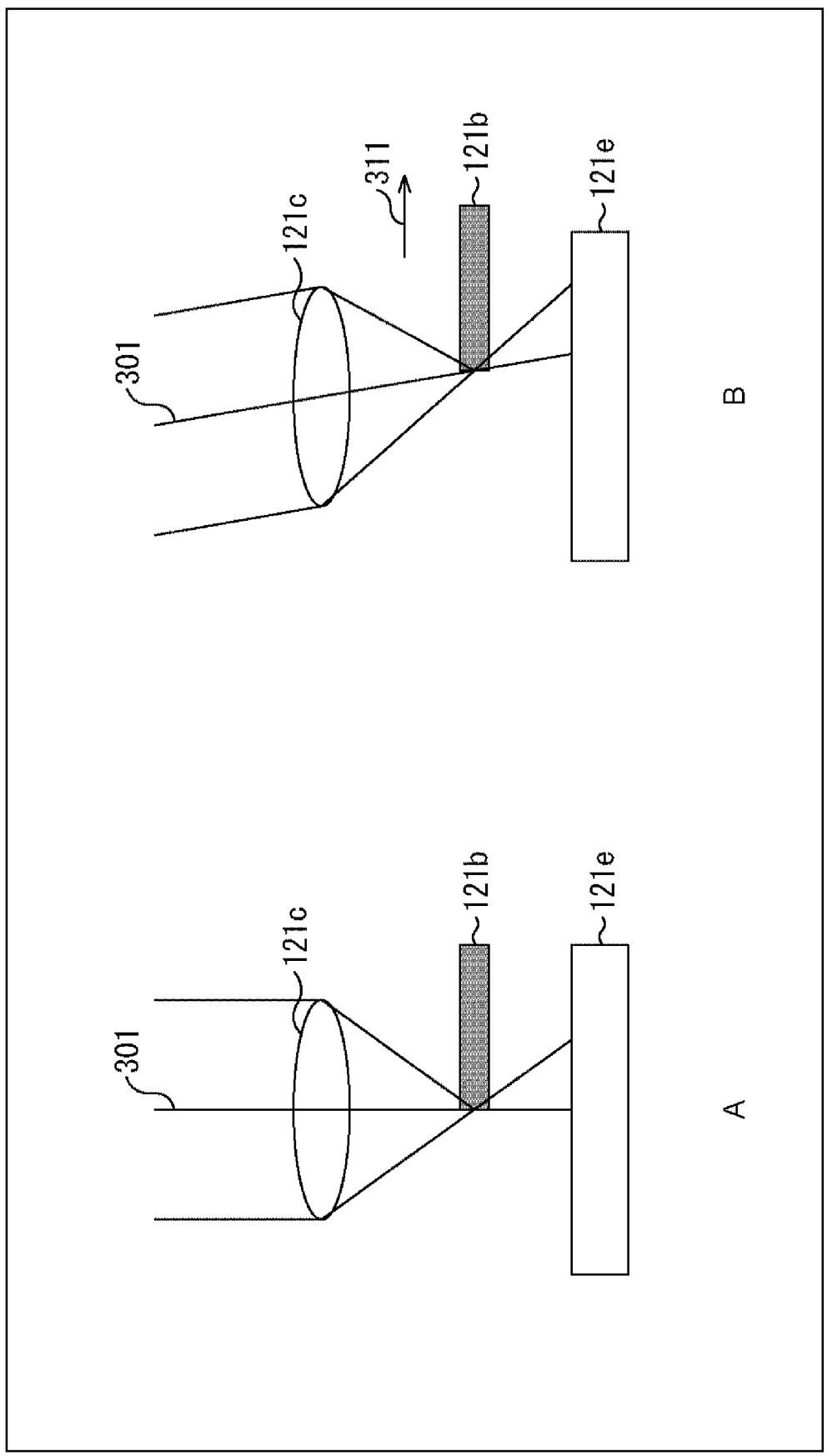
FIG. 21 is a diagram for describing an example of an error caused by a positional gap of the light-shielding film.

For example, as illustrated in A in FIG. 21, incident light 301 entering the pixel is focused by the on-chip lens 121*c*, light emitted to the light-shielding film 121*b* is shielded by the light-shielding film 121*b*, and the other light is received by the photodiode 121*e*.

When the incident angle (θx or θy) of the incident light 301 changes, the position of the focused incident light 301 (spot light) near the light-shielding film 121*b* (the position in a plane direction parallel to the photodiode 121*e*) changes. That is, since the amount of light received by the photodiode 121*e* changes, the weight (Wx or Wy) in FIG. 8 changes as illustrated in the graph.

For example, in the design value, it is assumed that the light-shielding film 121*b* shields half of the photodiode 121*e* as illustrated in A in FIG. 21. In this case, when the incident angle (θx or θy) of the incident light 301 is vertical, the amount of light received by the photodiode 121*e* is ½ of the amount of light when the incident light 301 is incident on the on-chip lens 121*c*. That is, the weight (Wx or Wy) becomes a half value (0.5).

For example, at the time of manufacturing, when the position of the light-shielding film 121*b* shifts as illustrated by the arrow 311 in B in FIG. 21, the incident angle (θx or θy) at which this weight (Wx or Wy) becomes a half value (0.5) changes from the vertical direction, and becomes a diagonal direction, as in the example in B in FIG. 21. That is, the graph of the weights (Wx, Wy) illustrated in FIG. 8 shifts in the angle (θx, θy) direction.

Furthermore, the slope of the graph of the weights (Wx, Wy) illustrated in FIG. 8 is determined according to the height of the on-chip lens 121*c* (the distance from the photodiode 121*e*).

Figure 22:
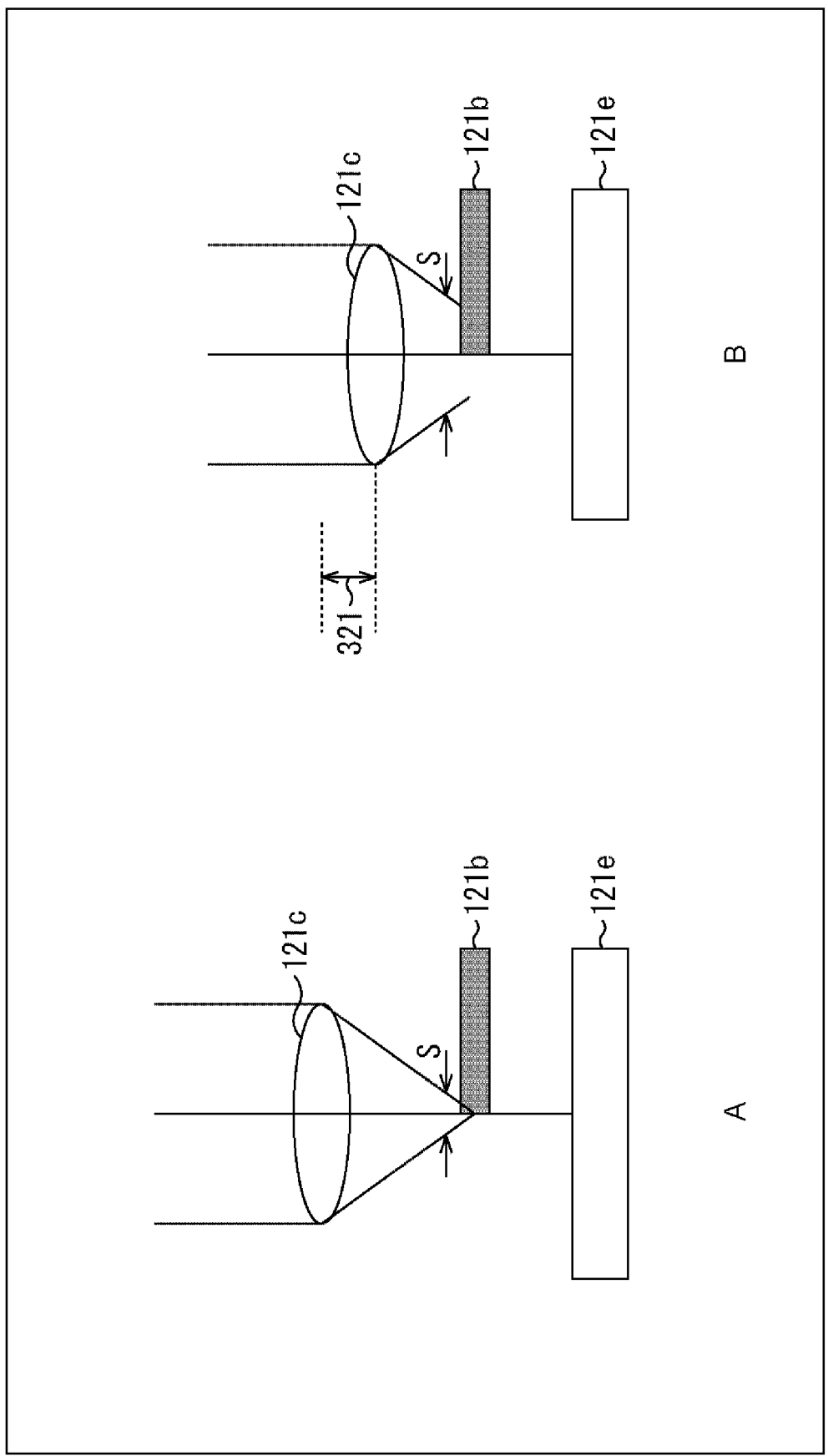
FIG. 22 is a diagram for describing an example of an error caused by a height gap of an on-chip lens.

For example, as illustrated in A in FIG. 22, a radius s of the spot light on the light-shielding film 121*b* becomes smaller as the distance between the on-chip lens 121*c* and the photodiode 121*e* (light-shielding film 121*b*) becomes longer. Conversely, for example, as illustrated in B in FIG. 22, the radius s of the spot light on the light-shielding film 121*b* becomes larger as the distance between the on-chip lens 121*c* and the photodiode 121*e* (light-shielding film 121*b*) becomes shorter (double-headed arrow 321).

Figure 23:
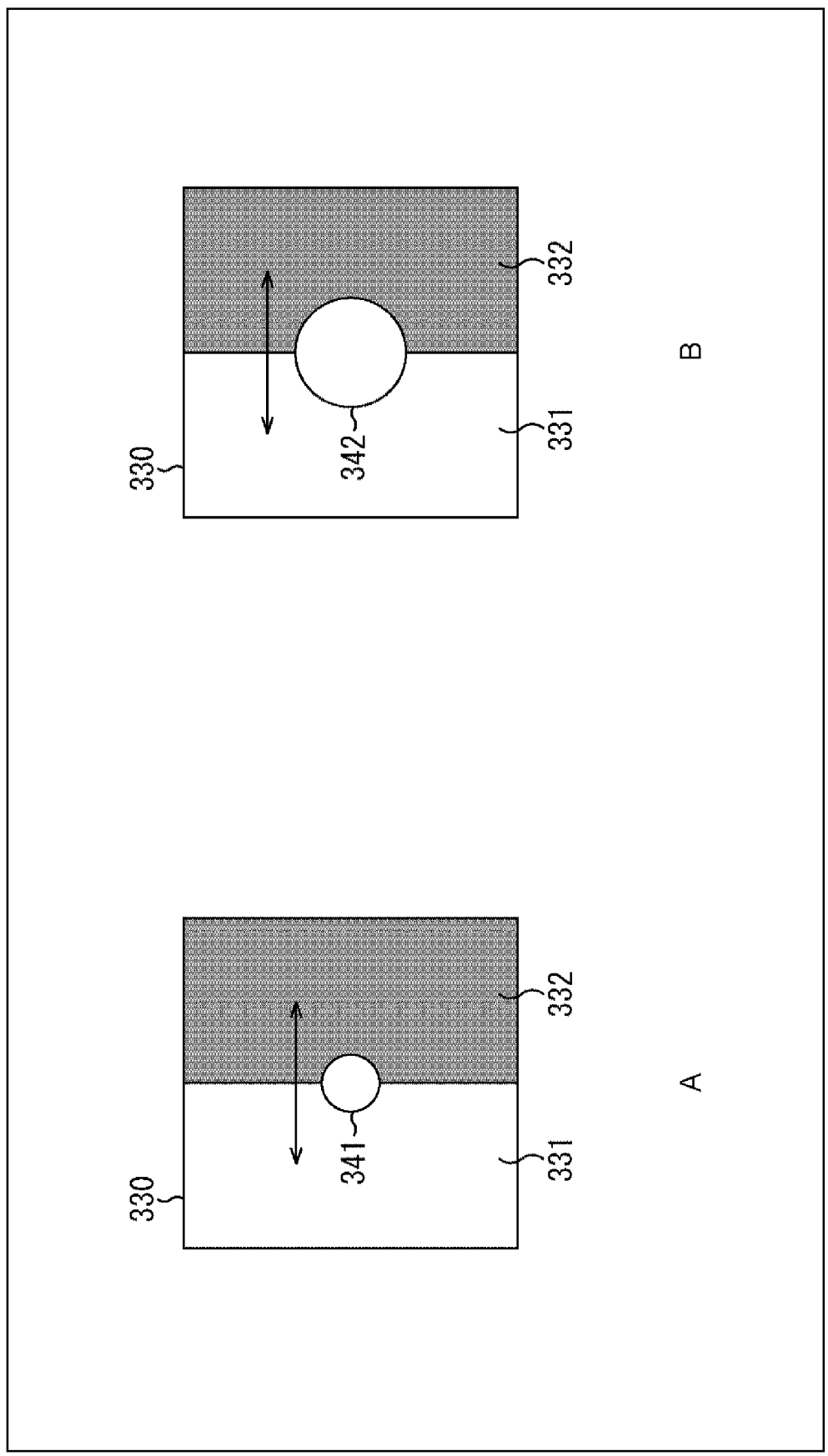
FIG. 23 is a diagram for describing an example of an error caused by a height gap of an on-chip lens.

In FIG. 23, a white region of a pixel 330 is an opening 331 not shielded by the light-shielding film 121*b*, and a gray region is a light-shielded portion 332 shielded by the light-shielding film 121*b*. For example, when spot light 341 in A in FIG. 23 (or spot light 342 in B in FIG. 23) moves in the direction of the double-headed arrow in FIG. 23, the entire incident light 301 reaches the photodiode 121*e*, part of the incident light 301 reaches the photodiode 121*e*, or no incident light 301 reaches the photodiode 121*e*.

At that time, since the radius s of the spot light 341 is smaller than that of the spot light 342, the entire spot light 341 moves from the opening 331 to the light-shielded portion 332 with a slight moving amount compared to the case of the spot light 342. That is, the change in the amount of light reaching the photodiode 121*e* with respect to the same moving amount is large. That is, the change in the sensitivity of the photodiode 121*e* with respect to the change in the incident angle (θx or θy) of the incident light 301 is large. That is, the slope of the graph of the weights (Wx, Wy) illustrated in FIG. 8 is large.

In contrast, since the spot light 342 has a larger spot diameter than the spot light 341, the moving amount of the entire spot light 342 to move from the opening 331 to the light-shielded portion 332 is larger than that of the case of the spot light 341.

That is, the slope of the graph of the weights (Wx, Wy) illustrated in FIG. 8 depends on the height of the on-chip lens 121*c*.

Therefore, for example, when the on-chip lens 121*c* having the height as illustrated in A in FIG. 22 as a design value shifts to the height in B in FIG. 22 at the time of manufacturing, the slope of the graph of the weights (Wx, Wy) changes (becomes gentle) by the amount of change in height (the double-headed arrow 321).

As described above, when the incident angle directivity changes as the position of the light-shielding film 121*b* or the height of the on-chip lens 121*c* changes from the design value, the value of the detection signal detected in the pixel changes with respect to the incident light having the same amount of light and at the same incident angle. That is, an error (individual difference) occurs in the detection signal (detection image).

The restored image is restored by performing a predetermined operation for the detection signal using the restoration matrix. The restoration matrix is set on the basis of known information such as the design value of the imaging element 121, and has a coefficient suitable for the characteristic (design value) of the imaging element 121. In other words, if the actual characteristic of the imaging element 121 is as designed, the characteristic of the detection signal obtained by the imaging element 121 and the characteristic of the restoration matrix match, and an accurate restored image can be restored.

However, when an error occurs in the detection signal due to the change in the incident angle directivity at the time of manufacturing or the like, the characteristic (for example, the design value) of the imaging element 121 corresponding to the restoration matrix and the characteristic (actual value) of the imaging element 121 corresponding to the detection signal do not match, and there is a possibility that the generated restored image becomes inaccurate.

Therefore, calibration of the incident angle directivity is conceivable. More specifically, it is conceivable to calibrate the characteristic of the restoration matrix to match (approximate) the actual characteristic of the imaging element 121. Note that the actual characteristic (that is, the detection signal (detection image)) of the imaging element 121 may be calibrated to match (or approximate) the characteristic of the restoration matrix.

Since the light-shielding for the pixel that generates the detection signal is performed both in the X direction and the Y direction, as illustrated in the example in FIG. 8, the graph of the weights (Wx, Wy) illustrated in FIG. 8 is formed both in the X direction and the Y direction. Note that the X direction and the Y direction indicate two directions perpendicular to each other and in a plane parallel to the light-receiving surface. That is, in the image restoration pixel output unit that is the pixel output unit that generates the detection signal, at least a part of the pixel output unit has the incident angle directivity both in the X direction and the Y direction orthogonal to each other and along the light-receiving surface (for example, both in the row direction and the column direction of the matrix of the pixel output units). In other words, the image restoration pixel output unit has the incident angle directivity in a plurality of directions (also referred to as plane direction or multi-directions) along the light-receiving surface. Therefore, calibration of the incident angle directivity of such an image restoration pixel output unit (also referred to as plane directional pixel output unit or multidirectional pixel output unit) needs to be performed in the X direction and in the Y direction.

Note that such a detection signal of the image restoration pixel output unit corresponds to the weight of the pixel, that is, a multiplication result of the weight in the X direction and the weight in the Y direction. Therefore, it is difficult to obtain the weight in the X direction and the weight in the Y direction from such a detection signal and it is difficult to calibrate the incident angle directivity.

<Use of Calibration Pixel>

Therefore, the imaging element 121 includes a plurality of pixel output units each having a configuration capable of independently setting incident angle directivity for incident light entering without passing through both of an imaging lens and a pinhole, and the plurality of pixel output units includes a plurality of image restoration pixel output units (multidirectional pixel output unit) arranged in a matrix, at least a part of the pixel output units having the incident angle directivity both in a row direction and in a column direction of the matrix, and a unidirectional pixel output unit (monodirectional pixel output unit) having the incident angle directivity only in the row direction of the matrix or only in the column direction of the matrix.

By using the imaging element 121 as described above, the restoration matrix can be more easily calibrated. That is, the characteristic of the restoration matrix can be calibrated to match (or approximate) the actual incident angle directivity of each pixel of the imaging element 121. Therefore, a more accurate restored image can be generated.

<Light-Receiving Unit>
<Configuration>

Figure 24:
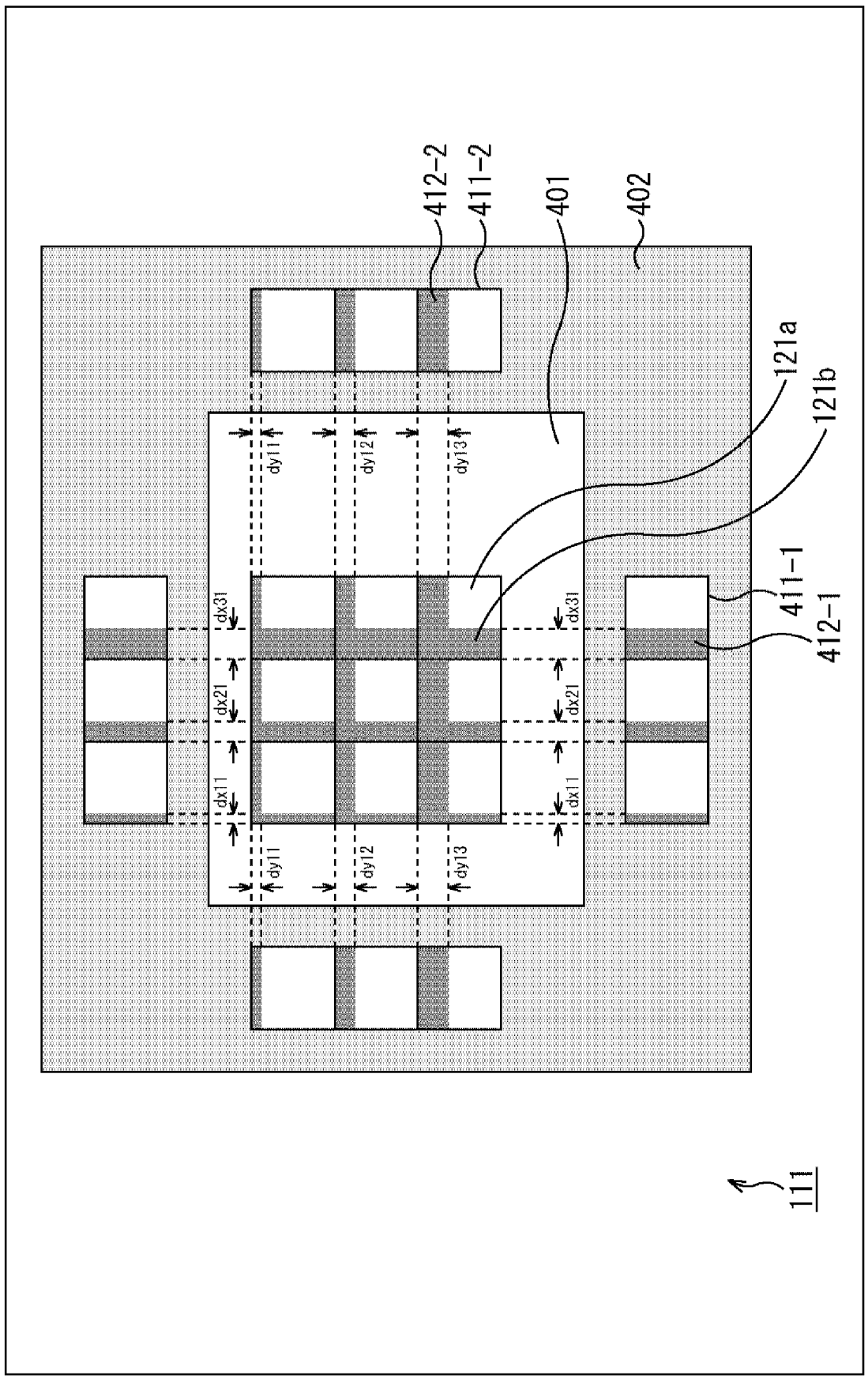
FIG. 24 is a diagram illustrating a main configuration example of a light-receiving unit.

FIG. 24 is a diagram illustrating a main configuration example of the light-receiving unit 111 of the imaging element 121. In FIG. 24, a white effective pixel region 401 of the light-receiving unit 111 is a region in which effective pixels (image restoration pixel output units) for generating the detection signal are arranged. The pixel 121a is a pixel (image restoration pixel output unit) formed in the effective pixel region 401 in the pixel matrix formed in the light-receiving unit 111. Note that, in FIG. 24, only one pixel 121a is denoted by the reference numeral and the other are omitted, but all the pixels in the effective pixel region 401 are the pixels 121a.

The pixels 121a are arranged in a matrix in the effective pixel region 401. Furthermore, the pixel 121a receives the incident light incident without through both an imaging lens and a pinhole. Moreover, the pixel 121a has the incident angle directivity, and outputs one detection signal indicating the output pixel value modulated according to the incident angle of the incident light. Furthermore, the pixel 121a has a configuration capable of independently setting the incident angle directivity for the incident light from the object, for each pixel output unit. In the case of the example in FIG. 24, the pixel 121a includes the light-shielding film as the configuration capable of independently setting the incident angle directivity for each pixel output unit.

The light-shielding film 121b is a light-shielding film formed in the pixel 121a. As illustrated in FIG. 24, the light-shielding film 121b is an L-shaped light-shielding film that shields part of the pixel 121a both in the X direction (in the row direction of the pixel matrix (that is, the horizontal direction in FIG. 24)) and in the Y direction (the column direction of the pixel matrix (that is, the vertical direction in FIG. 24)) orthogonal to each other and along the light-receiving surface. That is, the pixel 121a (image restoration pixel output unit) has the incident angle directivity both in the X direction and in the Y direction (the row direction and the column direction of the pixel matrix) (plane directional pixel output unit).

Furthermore, a gray calibration pixel region 402 of the light-receiving unit 111 is a region in which calibration pixels used for calibration are arranged.

A calibration pixel 411-1 is a pixel formed in the calibration pixel region 402 in the pixel matrix formed in the light-receiving unit 111, and is a pixel formed in the Y direction (the column direction of the pixel matrix (that is, the upper side and lower side in FIG. 24)) of a pixel 121a group. Note that, in FIG. 24, only one calibration pixel 411-1 is denoted by the reference numeral and the other are omitted, but all the pixels formed in the Y direction of the pixel 121a group of the calibration pixel region 402 are the calibration pixels 411-1.

The calibration pixel 411-2 is a pixel formed in the calibration pixel region 402 in the pixel matrix formed in the light-receiving unit 111, and is a pixel formed in the X direction (the row direction of the pixel matrix (that is, the right side and left side in FIG. 24)) of the pixel 121a group. Note that, in FIG. 24, only one calibration pixel 411-2 is denoted by the reference numeral and the other are omitted, but all the pixels formed in the X direction of the pixel 121a group of the calibration pixel region 402 are the calibration pixels 411-2.

The calibration pixels 411-1 and 411-2 are referred to as calibration pixel(s) 411 in a case where it is not necessary to distinguish the calibration pixels 411-1 and 411-2 from each another.

The calibration pixel 411-1 includes a horizontal band-type light-shielding film 412-1. That is, the calibration pixel 411-1 has the incident angle directivity only in the X direction (the row direction of the pixel matrix) (is a unidirectional pixel output unit). Furthermore, the calibration pixel 411-2 includes a vertical band-type light-shielding film 412-2. That is, the calibration pixel 411-2 has the incident angle directivity only in the Y direction (the column direction of the pixel matrix) (is a unidirectional pixel output unit). That is, the calibration pixel 411 has the incident angle directivity only in the row direction or only the column direction of the pixel matrix.

The light-shielding films 412-1 and 412-2 are referred to as light-shielding film(s) 412 in a case where it is not necessary to distinguish the light-shielding films 412-1 and 412-2 from each another.

As described above, the light-receiving unit 111 is provided with the pixel 121a (image restoration pixel output unit) having the incident angle directivity in a plurality of directions parallel to the light-receiving surface, and the calibration pixel 411 (unidirectional pixel output unit) having the incident angle directivity only in a single direction parallel to the light-receiving surface. By performing the calibration using such a calibration pixel 411, the incident angle directivity in the X direction and the incident angle directivity in the Y direction of the pixel 121a can be independently obtained. Therefore, the incident angle directivity of each pixel 121a of the imaging element 121 can be easily calibrated.

In the example in FIG. 1, the restoration matrix generation unit 102 generates (calibrates) a restoration matrix to match (approximate) the actual characteristic of the pixel 121a (image restoration pixel output unit) using the incident angle directivity in the X direction and the incident angle directivity in the Y direction of the pixel 121a derived using the calibration pixel 411 (unidirectional pixel output unit) (using the calibration information including information of the incident angle directivity). Therefore, the restoration matrix generation unit 102 can generate the restoration matrix that matches (approximates) the actual characteristic of the pixel 121a. The restoration matrix storage unit 103 stores the generated restoration matrix.

Furthermore, the restoration unit 104 reads the restoration matrix from the restoration matrix storage unit 103 and generates a restored image using the restoration matrix. Therefore, the restoration unit 104 can generate a more accurate restored image.

Furthermore, the association unit 105 reads the restoration matrix from the restoration matrix storage unit 103 and associates the restoration matrix with the detection image. Thereby, a processing unit or another device in a subsequent stage can generate a restored image using the restoration matrix. Therefore, the processing unit or another device in a subsequent stage can generate a more accurate restored image.

Note that the position of such a calibration pixel 411 (or the position of the calibration pixel region 402) is arbitrary. For example, the calibration pixel 411 can be formed in the effective pixel region 401. However, since the calibration pixel 411 has the incident angle directivity only in one direction, it is difficult to use the calibration pixel 411 as a pixel for generating the detection signal configuring the detection image. Therefore, if such a calibration pixel 411 is formed in the effective pixel region 401, the detection signal generated in the calibration pixel 411 needs to be removed and the detection image is generated, or it is necessary to prevent the detection signal from being used for the operation for restoring the restored image, and some idea for making the detection image and restored image rectangular is required.

Furthermore, it is inefficient to provide the calibration pixel 411 that is not used for capturing an image of the object on a center side of the pixel matrix where the amount of incident light tends to be larger than a peripheral portion of the pixel matrix.

As described above, the calibration pixel 411 (unidirectional pixel output unit) is formed in a region other than the effective pixel region 401 where the image restoration pixel output unit is formed, whereby the rectangular detection image and restored image can be easily obtained. Furthermore, the effective pixel region 401 can be more efficiently used. That is, the design and development of the imaging element 121 can be facilitated.

Furthermore, as illustrated in the example in FIG. 24, the calibration pixel region 402 where the calibration pixel 411 is formed is formed in an external region outside the effective pixel region 401, whereby the center side of the pixel matrix where the amount of incident light tends to be larger than a peripheral portion of the pixel matrix can be used as the effective pixel region, and reduction of the amount of incident light of the effective pixel region 401 can be suppressed.

Of course, the positions, sizes, shapes, and the like of the effective pixel region 401 and the calibration pixel region 402 are arbitrary and are not limited to the above example. For example, the calibration pixel region 402 may be provided inside the effective pixel region 401 (the effective pixel region 401 is provided as an external region outside the calibration pixel region 402), or the effective pixel region 401 and the calibration pixel region 402 may be arranged side by side in the X direction or the Y direction of the pixel matrix.

Furthermore, as illustrated in the example in FIG. 24, the calibration pixel 411-2 may be formed in the X direction of the pixel 121a group (the right side or left side, or both of the right side and left side in FIG. 24 of the effective pixel region 401). That is, the unidirectional pixel output unit (that is, the calibration pixel 411-2) having the incident angle directivity in the Y direction (the column direction of the pixel matrix) may be formed in an external region outside the effective pixel region 401 in the X direction (an external region outside the pixel matrix in the row direction).

Furthermore, as illustrated in the example in FIG. 24, the calibration pixel 411-1 may be formed in the Y direction of the pixel 121a group (the upper side or lower side, or both of the upper side and lower side in FIG. 24 of the effective pixel region 401). That is, the unidirectional pixel output unit (that is, the calibration pixel 411-1) having the incident angle directivity in the X direction (the row direction of the pixel matrix) may be formed in an external region outside the effective pixel region 401 in the Y direction (an external region outside the pixel matrix in the column direction).

<Incident Angle Directivity>

At least one of a plurality of the pixels 121a (image restoration pixel output units) formed in the effective pixel region may have the same incident angle directivity as at least one of a plurality of the calibration pixels 411 (unidirectional pixel output units) formed in the external regions in the row direction and in the column direction of the pixel matrix. For example, at least one calibration pixel 411-1 having the same incident angle directivity as at least one of the pixels 121a may be present with respect to the incident angle directivity in the X direction (the row direction of the pixel matrix). That is, at least one calibration pixel 411-1 having the same width in the X direction of the light-shielding film 121b as at least one of the pixels 121a may be present. Furthermore, for example, at least one calibration pixel 411-2 having the same incident angle directivity as at least one of the pixels 121a may be present with respect to the incident angle directivity in the Y direction (the column direction of the pixel matrix). That is, at least one calibration pixel 411-2 having the same width in the Y direction of the light-shielding film 121b as at least one of the pixels 121a may be present.

By doing so, the actual incident angle directivity obtained in the calibration pixel 411 can be easily applied to the incident angle directivity of the pixel 121a (image restoration pixel output unit). That is, the actual incident angle directivity of the pixel 121a, which is the plane directional pixel output unit, can be more easily obtained. Therefore, a more accurate restoration matrix (corresponding to the actual characteristic of the imaging element 121) can be more easily generated. That is, a restored image can be generated using the more accurate restoration matrix. Therefore, a more accurate restored image can be generated.

For example, as illustrated in the example in FIG. 24, the pixels in the same row of the pixel matrix may have the same incident angle directivity in the Y direction. In the case of the example in FIG. 24, the pixel 121a and the calibration pixel 411-2 belonging to the same row of the pixel matrix have the same incident angle directivity (for example, dy11, dy12, and dy13) in the Y direction.

That is, at least one of the pixels 121a (image restoration pixel output units) in each row of the pixel matrix has the same incident angle directivity in the column direction of the pixel matrix as at least one calibration pixel 411-2 (unidirectional pixel output unit) provided in the same row as the each row, of an external region. By doing so, the actual incident angle directivity in the Y direction obtained in the calibration pixel 411-2 can be easily applied to the incident angle directivity in the Y direction of the pixel 121a in the same row as the calibration pixel 411-2. That is, the actual incident angle directivity in the Y direction of the pixel 121a can be easily obtained.

For example, as illustrated in the example in FIG. 24, the pixels in the same column of the pixel matrix may have the same incident angle directivity in the X direction. In the case of the example in FIG. 24, the pixel 121a and the calibration pixel 411-1 belonging to the same column of the pixel matrix have the same incident angle directivity (for example, dx11, dx21, and dx31) in the X direction.

That is, at least one of the pixels 121a (image restoration pixel output units) in each column of the pixel matrix has the same incident angle directivity in the row direction of the pixel matrix as at least one calibration pixel 411-1 (unidirectional pixel output unit) provided in the same column as the each column, of an external region. By doing so, the actual incident angle directivity in the X direction obtained in the calibration pixel 411-1 can be easily applied to the incident angle directivity in the X direction of the pixel 121a in the same column as the calibration pixel 411-1. That is, the actual incident angle directivity in the X direction of the pixel 121a can be easily obtained.

In addition, in the case of the example illustrated in FIG. 24, the image restoration pixel output unit and the unidirectional pixel output unit in the same row in the matrix of a plurality of pixel output units have the same incident angle directivity in the column direction, and the image restoration pixel output unit and the unidirectional pixel output unit in the same column in the matrix have the same incident angle directivity in the row direction. Therefore, in this case, the actual incident angle directivity in the X direction obtained in the calibration pixel 411-1 in the same column can be applied to the incident angle directivity in the X direction of the pixel 121a, and the actual incident angle directivity in the X direction obtained in the calibration pixel 411-2 in the same column can be applied to the incident angle directivity in the Y direction of the pixel 121a. That is, the actual incident angle directivity in each direction of the pixel 121a can be easily obtained.

For example, as illustrated in the example in FIG. 24, a calibration pixel 411 group may have all patterns of the incident angle directivity in the X direction and all patterns of the incident angle directivity in the Y direction of the pixel 121a group. That is, all of the pixels 121a (image restoration pixel output units) formed in the effective pixel region 401 may have the same incident angle directivity as at least one of the plurality of calibration pixels 411 (unidirectional pixel output units) formed in the calibration pixel region 402 in the row direction and in the column direction of the pixel matrix. By doing so, the actual incident angle directivities in the X direction and the Y direction of all the pixels 121a can be obtained from any of the calibration pixels 411. That is, the actual incident angle directivity in each direction of the pixel 121a can be easily obtained.

Of course, the incident angle directivities that can be obtained from the calibration pixel 411 group may be only part of the incident angle directivities in the directions of all the pixels 121a. That is, some pixels 121a (image restoration pixel output units) in the plurality of pixels 121a (image restoration pixel output units) formed in the effective pixel region 401 may have the same incident angle directivity as at least one of the plurality of calibration pixels 411 (unidirectional pixel output units) formed in the calibration pixel region 402 in the row direction and in the column direction of the pixel matrix.

In that case, the incident angle directivity that cannot be directly obtained from the calibration pixel 411 group may be obtained by interpolation using the incident angle directivity of the calibration pixel 411 group. That is, the incident angle directivities in the row direction and the column direction of the pixel matrix, of other pixels 121a (image restoration pixel output units) other than the above-described some pixels 121a (image restoration pixel output units) formed in the effective pixel region 401 may be estimated on the basis of the incident angle directivity of the calibration pixel 411 (unidirectional pixel output unit) formed in the calibration pixel region 402. By doing so, an incident angle directivity pattern that the calibration pixel 411 group does not have can be obtained.

Of course, the arrangement pattern of the calibration pixels 411 and the pixels 121a is not limited to the example in FIG. 24. For example, the incident angle directivity in the X direction of the calibration pixel 411-1 (unidirectional pixel output unit) may be made different from the incident angle directivity in the X direction of the pixel 121a (image restoration pixel output unit) in the same column (the width in the X direction of the light-shielding film 412-1 may be made different from the width in the X direction of the light-shielding film 121b in the same column). For example, at least one of the pixels 121a (image restoration pixel output units) in each column of the pixel matrix may have the same incident angle directivity in the row direction of the pixel matrix as at least one calibration pixel 411-1 (unidirectional pixel output unit) provided in another column different from the each column of the calibration pixel region 402 (the width in the X direction of the light-shielding film 412-1 may be the same as the width in the X direction of the light-shielding film 121*b* in another column).

Furthermore, for example, the incident angle directivity in the Y direction of the calibration pixel 411-2 (unidirectional pixel output unit) may be made different from the incident angle directivity in the Y direction of the pixel 121*a* (image restoration pixel output unit) in the same row (the width in the Y direction of the light-shielding film 412-2 may be made different from the width in the Y direction of the light-shielding film 121*b* in the same row). For example, at least one of the pixels 121*a* (image restoration pixel output units) in each row of the pixel matrix may have the same incident angle directivity in the column direction of the pixel matrix as at least one calibration pixel 411-1 (unidirectional pixel output unit) provided in another row different from the each row of the calibration pixel region 402 (the width in the Y direction of the light-shielding film 412-2 may be the same as the width in the Y direction of the light-shielding film 121*b* in another row).

Furthermore, the incident angle directivities in the X direction of the pixels 121*a* (image restoration pixel output units) in the same column may be different from each other (the widths in the X direction of the light-shielding films 121*b* in the same column may be different from each other). Similarly, the incident angle directivities in the Y direction of the pixels 121*a* (image restoration pixel output units) in the same row may be different from each other (the widths in the Y direction of the light-shielding films 121*b* in the same row may be different from each other).

Moreover, the calibration pixel 411-1 may be formed in the X direction of the pixel 121*a* group (for example, on the right side or left side, or both of the right side and left side in FIG. 24 of the effective pixel region 401). Similarly, the calibration pixel 411-1 may be formed in the Y direction of the pixel 121*a* group (for example, on the upper side or lower side, or both of the upper side and lower side in FIG. 24 of the effective pixel region 401). Furthermore, the calibration pixel 411-1 and the calibration pixel 411-2 may be mixed in the X direction or Y direction, or both of the directions of the pixel 121*a* group.

Furthermore, at least one of the calibration pixels 411 and the pixels 121*a* may be arranged in an arrangement order having predetermined regularity on the basis of the pattern of the incident angle directivities (that is, the size of the width of the light-shielding film). That is, at least one of the unidirectional pixel output units or the image restoration pixel output units may be arranged in an arrangement order based on predetermined regularity of the incident angle directivities. For example, the calibration pixels 411 and the pixels 121*a* may be arranged such that the width of the light-shielding film gradually increases in the X direction (for example, from the right to left) or in the Y direction (for example, from the above to below). By arranging the pixels such that the pattern of the incident angle directivities has regularity in this manner, the operation such as interpolation of the incident angle directivity can be easily performed, for example.

Furthermore, the detection signal may be calibrated only for some pixels 121*a*.

<Flow of Generation Processing>

Figure 25:
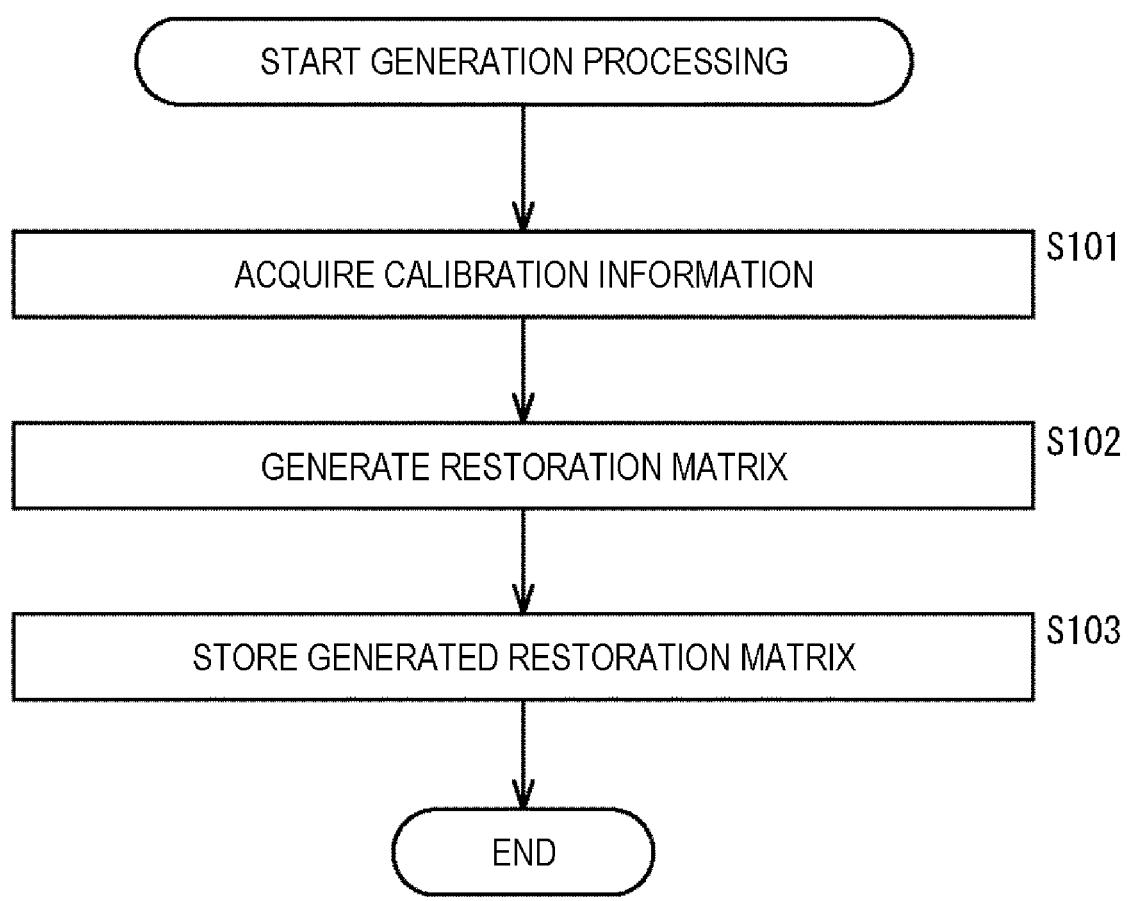
FIG. 25 is a flowchart for describing an example of a flow of generation processing.

The imaging element 121 (FIG. 1) including the light-receiving unit 111 having the above configuration executes generation processing to calibrate the incident angle directivity, that is, to generate the restoration matrix in accordance with (or further approximating) the actual characteristics of the imaging element 121. An example of a flow of the generation processing will be described with reference to the flowchart in FIG. 25.

When the generation processing is started, in step S101, the restoration matrix generation unit 102 of the imaging element 121 acquires the calibration information that is information generated using an output from the unidirectional pixel output unit of the imaging element 121, is information regarding calibration for the incident angle directivity of each pixel (image restoration pixel output unit) of the imaging element 121 (light-receiving unit 111), and including information directly or indirectly indicating a gap between the actual incident angle directivity of the imaging element 121 (light-receiving unit 111) and its design value. The calibration information is supplied from the outside of the imaging element 121, for example.

In step S102, the restoration matrix generation unit 102 generates the restoration matrix corresponding to the actual incident angle directivity of the imaging element 121 (light-receiving unit 111), using the calibration information acquired in step S101.

In step S103, the restoration matrix generation unit 102 supplies and stores the restoration matrix generated by the processing in step S102 to the restoration matrix storage unit 103.

When the processing in step S103 ends, the generation processing ends. By performing the generation processing in this manner, the imaging element 121 can more easily generate the restoration matrix corresponding to the actual incident angle directivity of the imaging element 121 (light-receiving unit 111).

<Flow of Imaging Processing>

Figure 26:
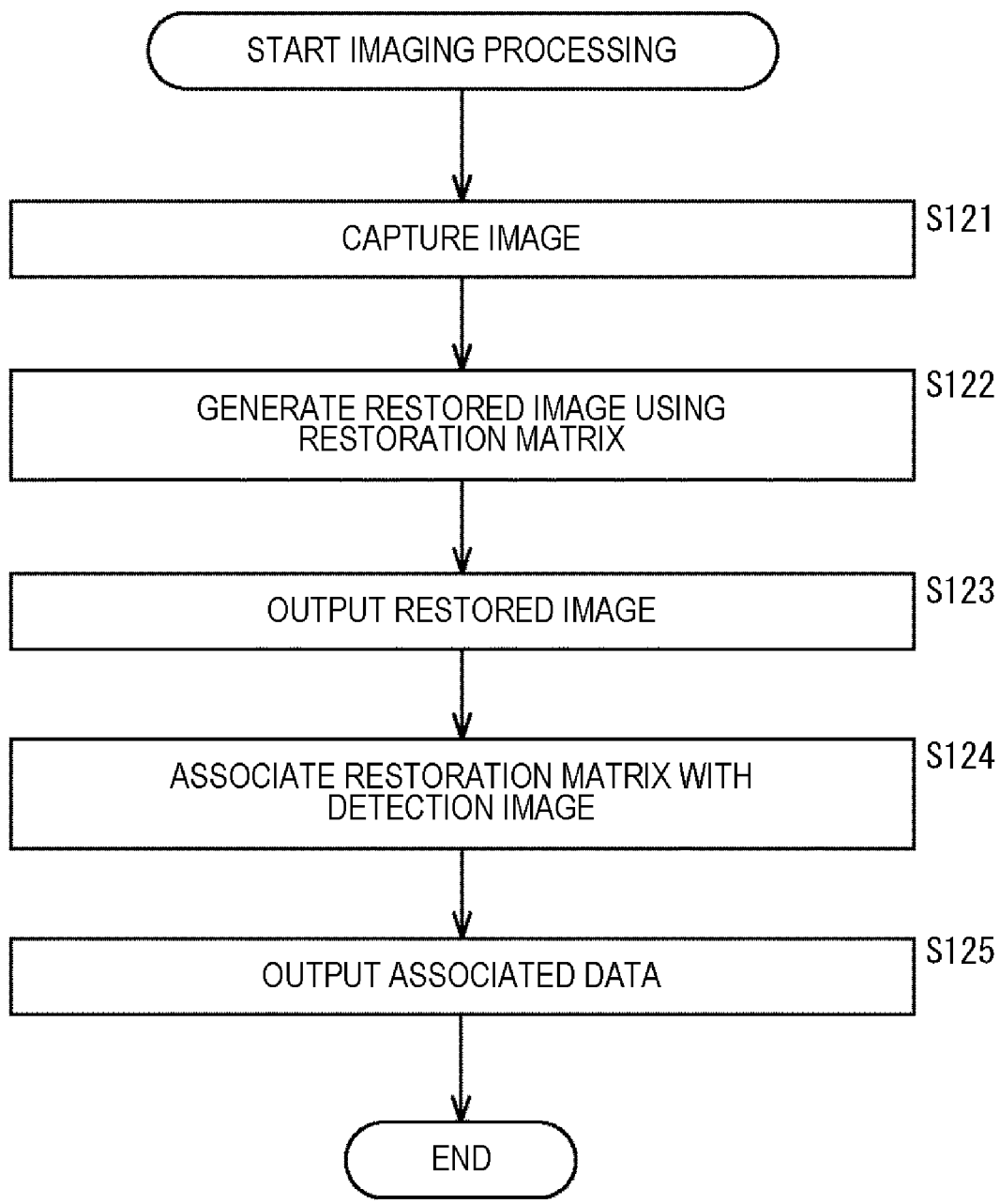
FIG. 26 is a flowchart for describing an example of a flow of imaging processing.

Furthermore, the imaging element 121 (FIG. 1) executes imaging processing to generate the restored image from the detection image, using the restoration matrix generated by the above-described generation processing. An example of a flow of the imaging processing will be described with reference to the flowchart in FIG. 26.

When the imaging processing is started, in step S121, the imaging element 121 captures an image of the object and generates the detection image. For example, the light-receiving unit 111 receives light from the object and outputs electric charge representing a received light amount as the detection signal (detection image). The A/D conversion unit 101 performs A/D conversion for the output detection signal (detection image) of the analog signal.

In step S122, the restoration unit 104 reads and obtains the restoration matrix from the restoration matrix storage unit 103. The restoration matrix is, for example, the restoration matrix generated by the generation processing and corresponding to the actual incident angle directivity of the imaging element 121 (light-receiving unit 111). Furthermore, the restoration unit 104 acquires the detection signal (detection image) of the digital data generated in step S121. The restoration unit 104 generates the restored image, using the obtained restoration matrix and detection image.

In step S123, the output unit 106 outputs the restored image generated in step S122 to the outside of the imaging element 121.

In step S124, the association unit 105 reads and acquires the restoration matrix from the restoration matrix storage unit 103. Furthermore, the association unit 105 associates the restoration matrix with the detection image generated in step S121.

In step S125, the output unit 106 outputs the associated data (detection image and restoration matrix) associated in step S124 to the outside of the imaging element 121.

When the processing in step S125 ends, the imaging processing ends. By performing the imaging processing in this manner, the imaging element 121 can generate a more accurate restored image.

Note that either one of the processing in steps S122 and S123 or the processing in steps S124 and S125 may be omitted. Furthermore, the processing order of the processing in steps S122 and S123 and the processing in steps S124 and S125 is arbitrary. For example, the processing in steps S124 and S125 may be performed first and then the processing in steps S122 and S123 may be performed, or the processing in steps S122 and S123 and the processing in steps S124 and S125 may be executed in parallel.

<Calibration Device>

Next, calibration of the imaging element 121 as described above will be described. In this calibration, a restoration matrix to be used when generating a restored image from a detection image that is an output of a plurality of image restoration pixel output units may be generated using calibration information generated using an output from a unidirectional pixel output unit, of an imaging element including a plurality of pixel output units each having a configuration capable of independently setting incident angle directivity for incident light incident without through both of an imaging lens and a pinhole, the plurality of pixel output units being arranged in a matrix, and at least some of the pixel output units including the plurality of image restoration pixel output units having the incident angle directivity both in a row direction and in a column direction of the matrix, and the unidirectional pixel output unit having the incident angle directivity only in the row direction of the matrix or only in the column direction of the matrix.

For example, an information processing device may include an imaging element including a plurality of pixel output units each having a configuration capable of independently setting incident angle directivity for incident light incident without through both of an imaging lens and a pinhole, the plurality of pixel output units being arranged in a matrix manner, and at least a part of the pixel output units including a plurality of image restoration pixel output units having the incident angle directivity both in a row direction and in a column direction of the matrix, and a unidirectional pixel output unit having the incident angle directivity only in the row direction of the matrix or only in the column direction of the matrix; and a generation unit configured to generate, using calibration information generated using an output of the unidirectional pixel output unit, a restoration matrix to be used when generating a restored image from a detection image that is an output of the plurality of image restoration pixel output units.

Figure 27:
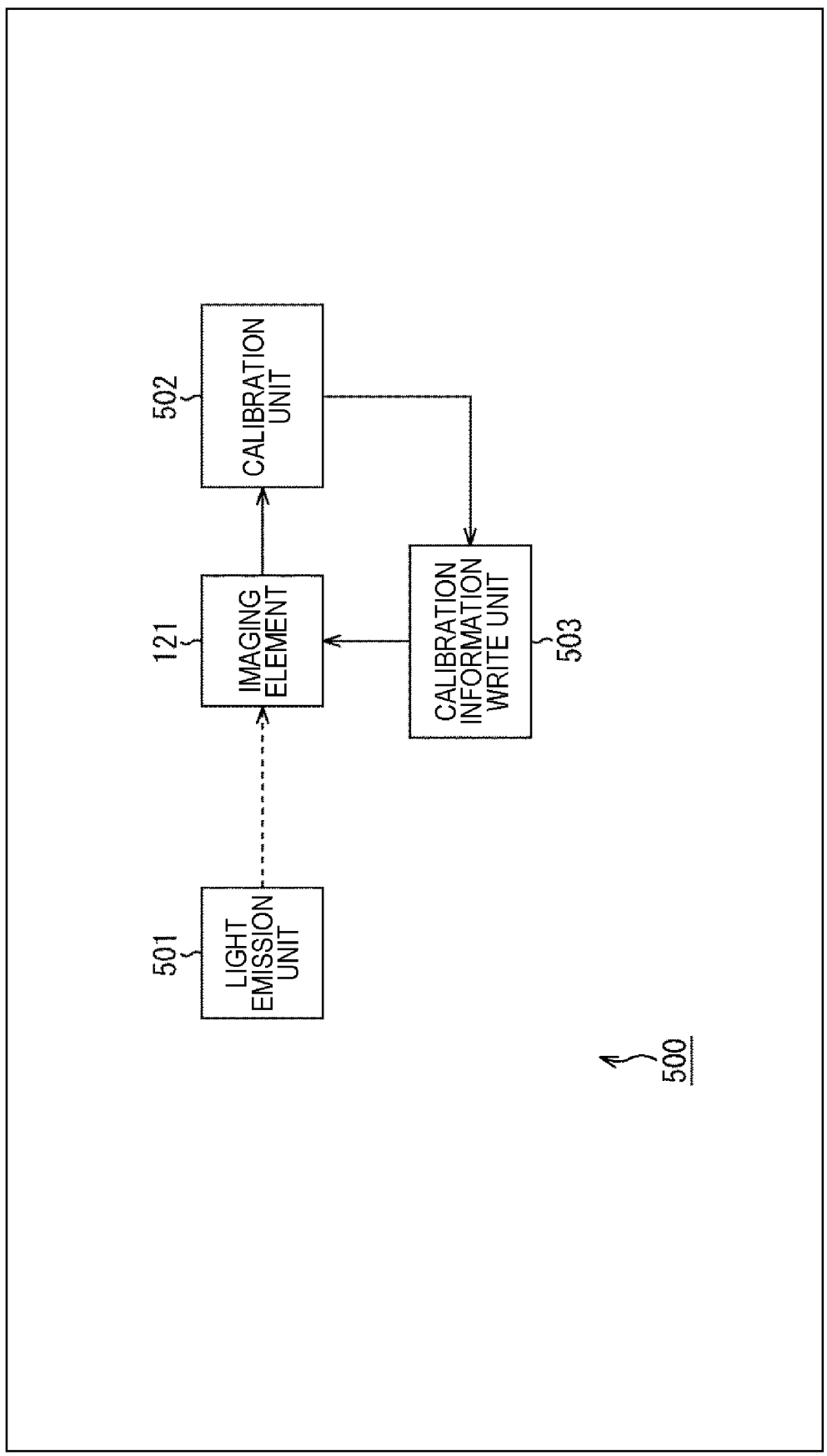
FIG. 27 is a diagram illustrating a main configuration example of a calibration device to which the technology of the present disclosure is applied.

FIG. 27 is a diagram illustrating a main configuration example of a calibration device as an embodiment of the information processing device to which the present technology is applied. A calibration device 500 illustrated in FIG. 27 is a device for calibrating the imaging element 121 installed at a predetermined position.

As illustrated in FIG. 27, the calibration device 500 includes a light emission unit 501, a calibration unit 502, and a calibration information write unit 503.

The light emission unit 501 emits light to the imaging element 121 installed at the predetermined position and causes the imaging element 121 to detect the light (dotted line arrow). The light emission unit 501 and the imaging element 121 are separated by a sufficient distance, and the light emitted from the light emission unit 501 and reaching the imaging element 121 becomes (can be regarded as) parallel light, as illustrated in A in FIG. 28.

Figure 28:
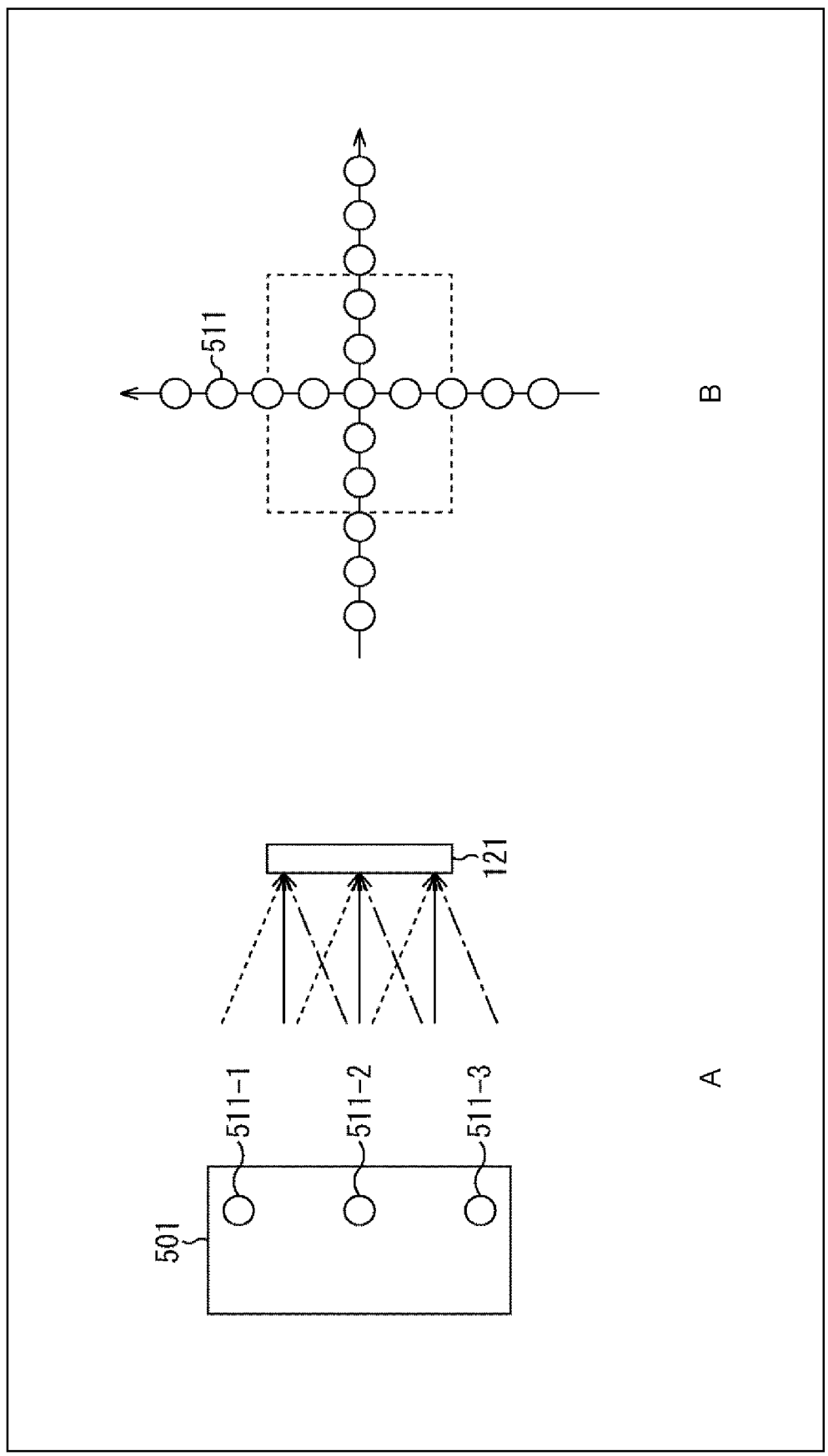
FIG. 28 is a diagram illustrating an example of a state of calibration.

Furthermore, as illustrated in A in FIG. 28, the light emission unit 501 includes a plurality of light sources 511 (light sources 511-1 to 511-3 in FIG. 28) at different positions. More specifically, for example, as illustrated in B in FIG. 28, the plurality of light sources 511 is arranged at predetermined intervals in two directions (X direction and Y direction) orthogonal to each other along a light emission surface of the light emission unit 501, for the imaging element 121.

When the light sources 511 are turned on, the lights reaching the imaging element 121 become parallel light, as described above, and thus have incident angles different from one another. That is, by sequentially turning on the light sources 511, the light emission unit 501 can emit lights to the imaging element 121 at incident angles different from one another. That is, in B in FIG. 28, the plurality of light sources 511 arranged in the horizontal direction (X direction) in FIG. 28 is a light source group for adjusting an angle (x angle) in the X direction. This X direction corresponds to the X direction in FIG. 8 (that is, the row direction of the pixel matrix in FIG. 24). The light emission unit 501 sequentially turns on the plurality of light sources 511 arranged in the X direction when generating the weight graph in the X direction in FIG. 8 (for generating the weight graph in the X direction in FIG. 8). Furthermore, in B in FIG. 28, the plurality of light sources 511 arranged in the vertical direction (Y direction) in FIG. 28 is a light source group for adjusting an angle (y angle) in the Y direction. This Y direction corresponds to the Y direction in FIG. 8 (that is, the column direction of the pixel matrix in FIG. 24). The light emission unit 501 sequentially turns on the plurality of light sources 511 arranged in the Y direction when generating the weight graph in the Y direction in FIG. 8 (for generating the weight graph in the Y direction in FIG. 8).

Note that the light emission unit 501 may include a movable light source and turn on (emit) while moving the movable light source to make the incident angle of the parallel light to the imaging element 121 variable. For example, the light emission unit 501 moves the movable light source in the horizontal direction (X direction) in B in FIG. 28 and turns on the light source at the position of each light source for adjusting the x angle illustrated in B in FIG. 28, thereby emitting, to the imaging element 121, the parallel light for generating the weight graph in the X direction in FIG. 8 Furthermore, for example, the light emission unit 501 moves the movable light source in the vertical direction (Y direction) in B in FIG. 28 and turns on the light source at the position of each light source for adjusting the y angle illustrated in B in FIG. 28, thereby emitting, to the imaging element 121, the parallel light for generating the weight graph in the Y direction in FIG. 8

The imaging element 121 detects the light emitted from each light source 511 in this manner, generates the detection signal in the calibration pixel 411, and supplies the detection signal to the calibration unit 502. For example, when generating the weight graph in the X direction in FIG. 8 (for generating the weight graph in the X direction in FIG. 8), each pixel (at least the calibration pixel 411-1) of the imaging element 121 detects the actual incident lights from the light sources 511 arranged in the X direction and sequentially turned on, and generates the detection signals. Similarly, when generating the weight graph in the Y direction in FIG. 8 (for generating the weight graph in the Y direction in FIG. 8), each pixel (at least the calibration pixel 411-2) of the imaging element 121 detects the actual incident lights from the light sources 511 arranged in the Y direction and sequentially turned on, and generates the detection signals.

The calibration unit 502 generates calibration information of the imaging element 121 on the basis of the detection signal generated by the calibration pixel 411. That is, since the detection signals for the incident lights having various incident angles are supplied from the imaging element 121, the calibration unit 502 plots signal values according to the incident angles in the X direction and in the Y direction, thereby generating the weight graph in FIG. 8. For example, the calibration unit 502 generates the weight graph in the X direction in FIG. 8 on the basis of the detection signals (actual measurement values) of the incident lights from the light sources 511 arranged in the X direction, the detection signals being generated in the calibration pixel 411-1 of the imaging element 121. Similarly, the calibration unit 502 generates the weight graph in the Y direction in FIG. 8 on the basis of the detection signals (actual measurement values) of the incident lights from the light sources 511 arranged in the Y direction, the detection signals being generated in the calibration pixel 411-2 of the imaging element 121. That is, the calibration unit 502 can generate the weight graph (actual measurement values) in the X direction in FIG. 8 and the weight graph (actual measurement values) in the Y direction in FIG. 8 independently of each other. Therefore, the calibration unit 502 can obtain the actual incident angle directivity of the calibration pixel 411.

The calibration unit 502 generates the calibration information that is information regarding calibration of the incident angle directivity (of the image restoration pixel output unit) of each pixel 121a in the effective pixel region 401 of the imaging element 121, using the actual incident angle directivity of the calibration pixel 411 thus obtained.

For example, the calibration unit 502 derives the actual incident angle directivity of the pixel 121a, using the actual incident angle directivity of the calibration pixel 411, and generates the calibration information including the actual incident angle directivity of the pixel 121a.

Furthermore, for example, the calibration unit 502 may derive the actual incident angle directivity of the pixel 121a using the actual incident angle directivity of the calibration pixel 411, obtain a gap between the derived actual incident angle directivity of the pixel 121a and a design value of the incident angle directivity of the pixel 121a stored in advance, and generate the calibration information indicating the gap. In this case, for example, the calibration unit 502 obtains a positional gap of the light-shielding film 121b of the pixel 121a and generates the calibration information including information including the positional gap. Furthermore, for example, the calibration unit 502 obtains a height gap of the on-chip lens 121c of the imaging element 121 and generates the calibration information including information including the height gap. Note that a calibration method using a gap from a design value is described in Patent Document 3 (FIG. 21 and its description, and the like). The calibration unit 502 is only required to generate the calibration information using this method, for example.

Note that, generally, a mask (light-shielding films) of the imaging element 121 has a pattern in the way of shifting because batch exposure is performed by a stepper, and often uniformly shifts in the entire light-receiving unit 111 and has a low possibility of independently shifting for each pixel.

Figure 29:
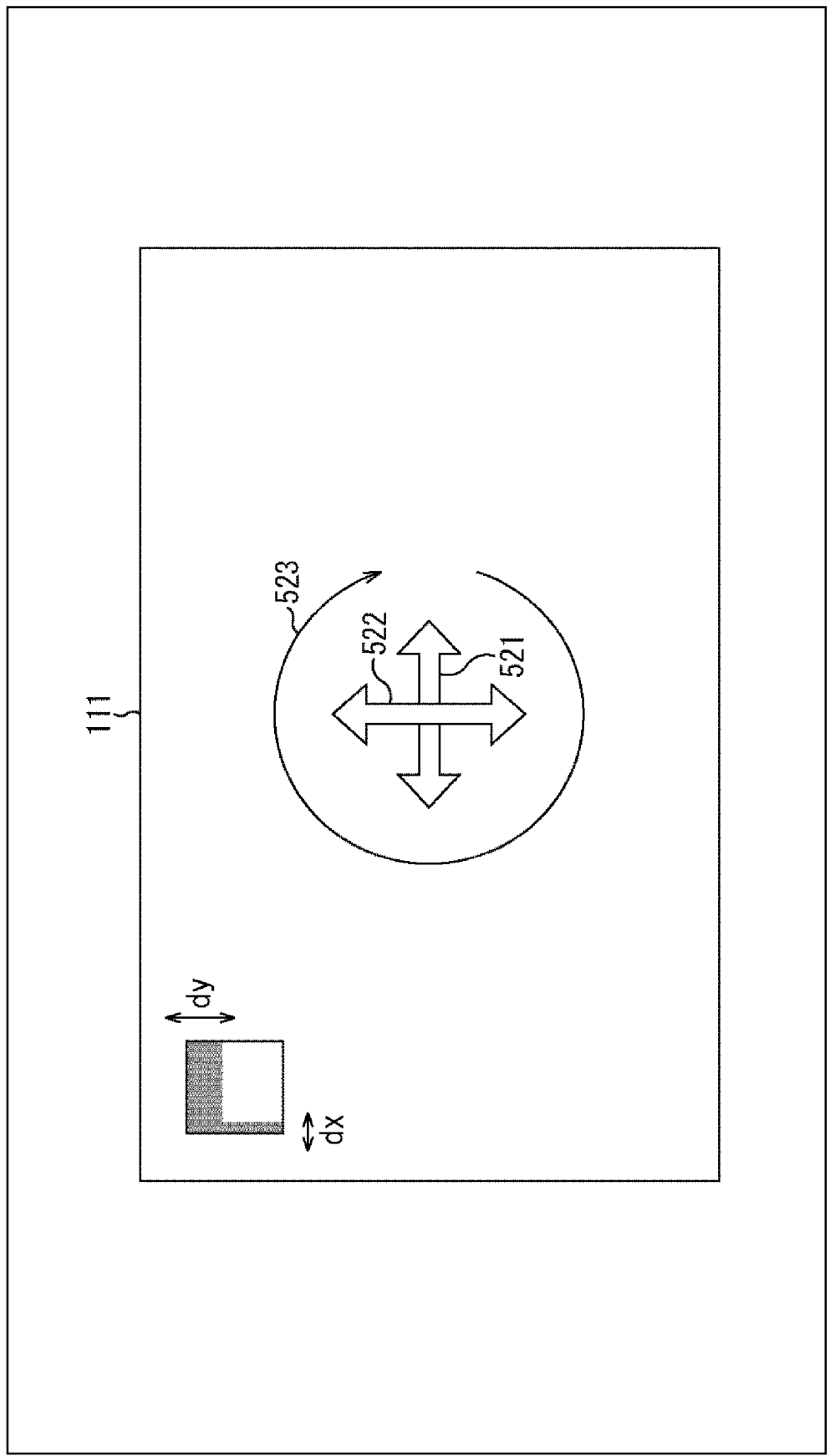
FIG. 29 is a diagram illustrating an example of a state of calibration.

That is, the way of shifting of the light-shielding film has mainly the following patterns, as illustrated in FIG. 29.

1: The light-shielding films of all the pixels of the pixel matrix formed in the light-receiving unit 111 shift in the X direction (arrow 521).

2: The light-shielding films of all the pixels of the pixel matrix formed in the light-receiving unit 111 shift in the Y direction (arrow 522).

3: The light-shielding films of all the pixels of the pixel matrix formed in the light-receiving unit 111 entirely shift in a rotation direction (arrow 523).

4: The height of the on-chip lens 121c shifts (entire screen).

Therefore, the calibration unit 502 may individually obtain the calibration information for each pixel 121a from the actual incident angle directivity of each calibration pixel 411, as described above. However, alternatively, the calibration unit 502 may detect such a gap of the entire light-receiving unit 111, using the actual incident angle directivity of each calibration pixel 411, and generate the calibration information on the basis of the gap.

Figure 30:
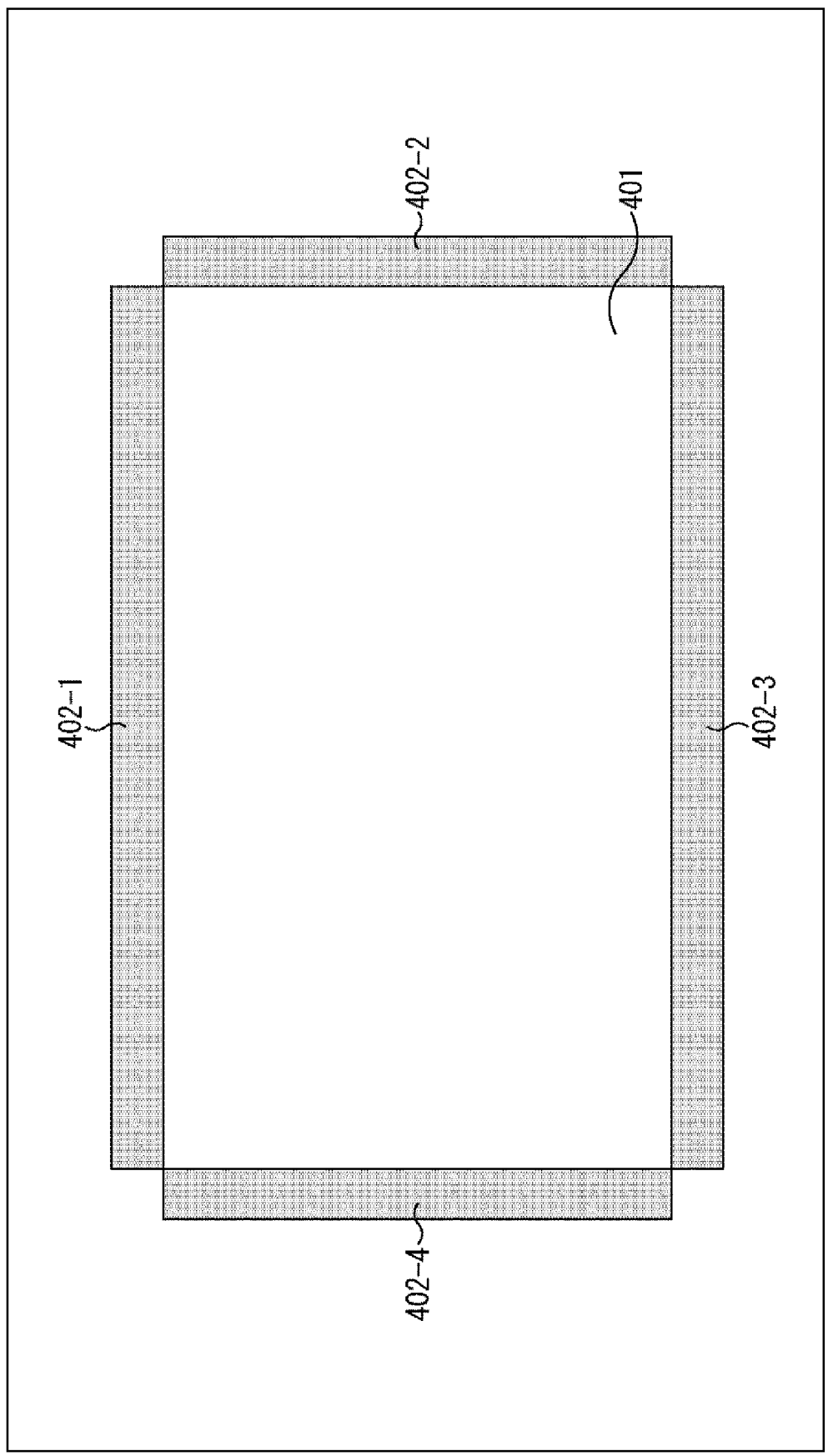
FIG. 30 is a diagram illustrating an example of a state of calibration.

For example, as illustrated in FIG. 30, the calibration pixel 411 is provided in the calibration pixel region 402 that is an external region in the X direction of the effective pixel region 401 (the row direction of the pixel matrix or the horizontal direction in the example in FIG. 30), in the Y direction of the effective pixel region 401 (the column direction of the pixel matrix or the vertical direction in the example in FIG. 30), or both in the X direction and in the Y direction, whereby the calibration unit 502 can easily detect such a gap of the entire light-receiving unit 111.

For example, regarding the calibration pixels 411-1 respectively provided in a calibration pixel region 402-1 and a calibration pixel region 402-3 that are the external regions in the Y direction (the vertical direction in FIG. 30) of the effective pixel region 401, in a case where directions of gaps of the weight graph in FIG. 8 derived from the actual detection signals (the incident angle directivities in the X direction (the horizontal direction in FIG. 30) of the effective pixel region 401) with respect to the design values are the same as each other, the calibration unit 502 can determine that the light-shielding films of the pixels shift in the X direction in the entire light-receiving unit 111. Regarding the calibration pixels 411-1 in both of the regions, in a case where directions of gaps of the weight graph in FIG. 8 derived from the actual detection signals (the incident angle directivities in the X direction (the horizontal direction in FIG. 30) of the effective pixel region 401) with respect to the design values are different from each other, the calibration unit 502 can determine that the light-shielding films of the pixels shift in the rotation direction along the light-receiving surface in the entire light-receiving unit 111.

Furthermore, for example, regarding the calibration pixels 411-2 respectively provided in a calibration pixel region 402-2 and a calibration pixel region 402-4 that are the external regions in the X direction (the horizontal direction in FIG. 30) of the effective pixel region 401, in a case where directions of gaps of the weight graph in FIG. 8 derived from the actual detection signals (the incident angle directivities in the Y direction (the vertical direction in FIG. 30) of the effective pixel region 401) with respect to the design values are the same as each other, the calibration unit 502 can determine that the light-shielding films of the pixels shift in the Y direction (the vertical direction in FIG. 30) in the entire light-receiving unit 111. Regarding the calibration pixels 411-2 in both of the regions, in a case where directions of gaps of the weight graph in FIG. 8 derived from the actual detection signals (the incident angle directivities in the Y direction (the vertical direction in FIG. 30) of the effective pixel region 401) with respect to the design values are different from each other, the calibration unit 502 can determine that the light-shielding films of the pixels shift in the rotation direction along the light-receiving surface in the entire light-receiving unit 111.

Moreover, for example, regarding the calibration pixels 411 respectively provided in the calibration pixel regions 402-1 to 402-4 surrounding the effective pixel region 401, in a case where all the slopes of the weight graph in FIG. 8 derived from the actual detection signals (the incident angle directivities in the X direction (the horizontal direction in FIG. 30) or the Y direction (the vertical direction in FIG. 30) of the effective pixel region 401) shift with respect to the design values, the calibration unit 502 can determine that the height of the on-chip lens 121c shifts.

The calibration unit 502 supplies the calibration information thus generated to the calibration information write unit 503.

The calibration information write unit 503 writes the supplied calibration information in (the restoration matrix generation unit 102 of) the imaging element 121. That is, the restoration matrix generation unit 102 of the imaging element 121 generates (or calibrates) the restoration matrix using the calibration information supplied from the calibration device 500. Therefore, the imaging element 121 can generate a more accurate restored image.

Calibration Method Example 1

A more specific example of the calibration method will be described. For example, the light emission unit 501 may emit light (parallel light) a plurality of times while changing the incident angle to the imaging element 121 and the calibration unit 502 may derive the weight graph in FIG. 8 (that is, the incident angle directivities) on the basis of the detection results (the signal levels of the detection signals of the respective times) and generate the calibration information including information of the incident angle directivities.

As described with reference to FIG. 28, the light emission unit 501 emits lights at incident angles different from one another to the imaging element 121 by sequentially turning on the plurality of light sources 511. The calibration unit 502 plots the relationship between the signal level of the detection signal of the calibration pixel 411 corresponding to the light at each incident angle and the incident angle into a graph (A in FIG. 31). By doing so, the weight graph in FIG. 8 is derived.

For example, the light emission unit 501 sequentially turns on the plurality of light sources 511 arranged in the horizontal direction in B in FIG. 28 corresponding to the X direction in FIG. 8 (the row direction of the pixel matrix in FIG. 24). In response, the calibration unit 502 detects the signal level of the detection signal of the calibration pixel 411-1 corresponding to each light and plots the relationship between the detection result and the incident angle into a graph, thereby deriving the weight graph in the X direction in FIG. 8 (that is, the incident angle directivity in the row direction of the pixel matrix in FIG. 24 of the pixel 121a (image restoration pixel output unit)).

Similarly, the light emission unit 501 sequentially turns on the plurality of light sources 511 arranged in the vertical direction in B in FIG. 28 corresponding to the Y direction in FIG. 8 (the column direction of the pixel matrix in FIG. 24). In response, the calibration unit 502 detects the signal level of the detection signal of the calibration pixel 411-2 corresponding to each light and plots the relationship between the detection result and the incident angle into a graph, thereby deriving the weight graph in the Y direction in FIG. 8 (that is, the incident angle directivity in the column direction of the pixel matrix in FIG. 24 of the pixel 121a (image restoration pixel output unit)).

The calibration unit 502 generates the calibration information including the incident angle directivity in the row direction and the incident angle directivity in the column direction of the pixel matrix in FIG. 24 of the pixel 121a (image restoration pixel output unit) derived as described above, and supplies the calibration information to the calibration information write unit 503. The calibration information write unit 503 supplies the calibration information to the imaging element 121.

By doing so, the calibration unit 502 derives the incident angle directivity in the row direction and the incident angle directivity in the column direction of the pixel matrix in FIG. 24 of the pixel 121a (image restoration pixel output unit), respectively, and can generate the calibration information including the derived information.

For example, assuming that, in FIG. 24, the pixel 121a in the effective pixel region 401 and the calibration pixel 411-1 in the calibration pixel region 402 in the same column have the same incident angle directivity in the row direction of the pixel matrix Similarly, assuming that, in FIG. 24, the pixel 121a in the effective pixel region 401 and the calibration pixel 411-2 in the calibration pixel region 402 in the same row have the same incident angle directivity in the column direction of the pixel matrix In this case, by obtaining the incident angle directivity in the row direction of the pixel matrix of the calibration pixel 411-1, the incident angle directivity in the row direction of the pixel matrix of the pixel 121a in the effective pixel region 401 in the same column as the calibration pixel 411-1 can be obtained. Similarly, by obtaining the incident angle directivity in the column direction of the pixel matrix of the calibration pixel 411-2, the incident angle directivity in the column direction of the pixel matrix of the pixel 121a in the same row in the effective pixel region 401 as the calibration pixel 411-2 can be obtained.

Note that, in the case of the example in FIG. 24, the calibration pixels 411-1 are present on the upper side and lower side in FIG. 24 in the effective pixel region 401. Therefore, a mean of the incident angle directivities in the row direction of the pixel matrix may be derived using the calibration pixel 411-1 on the upper side in FIG. 24 in the effective pixel region 401 and the calibration pixel 411-1 on the lower side in FIG. 24 in the effective pixel region 401, and the mean may be adopted as the incident angle directivity in the row direction of the pixel matrix of the pixel 121a in the same column as the calibration pixel 411-1. That is, in a case where a plurality of calibration pixels 411-1 corresponds to one pixel 121a, a statistical value (for example, a mean or a median) of the incident angle directivities in the row direction of the pixel matrix of the calibration pixels 411-1 may be adopted as the incident angle directivity in the row direction of the pixel matrix of the pixel 121a.

Similarly, the calibration pixels 411-2 are present on the right side and left side in FIG. 24 of the effective pixel region 401 in FIG. 24. Therefore, a mean of the incident angle directivities in the column direction of the pixel matrix may be derived using the calibration pixel 411-2 on the right side in FIG. 24 in the effective pixel region 401 and the calibration pixel 411-2 on the left side in FIG. 24 in the effective pixel region 401, and the mean may be adopted as the incident angle directivity in the column direction of the pixel matrix of the pixel 121a in the same row as the calibration pixel 411-2. That is, in a case where a plurality of calibration pixels 411-2 corresponds to one pixel 121*a*, a statistical value (for example, a mean or a median) of the incident angle directivities in the column direction of the pixel matrix of the calibration pixels 411-2 may be adopted as the incident angle directivity in the column direction of the pixel matrix of the pixel 121*a*.

In such cases, in deriving the incident angle directivity of the calibration pixel 411, the light emission unit 501 may emit the light a plurality of times while changing the incident angle to the imaging element 121, and the calibration unit 502 may derive the actual incident angle directivity (the actual weight graph in FIG. 8 of the pixel 121*a*) on the basis of the detection results (the signal levels of the detection signals of the respective times), as described above.

Calibration Method Example 2

Figure 31:
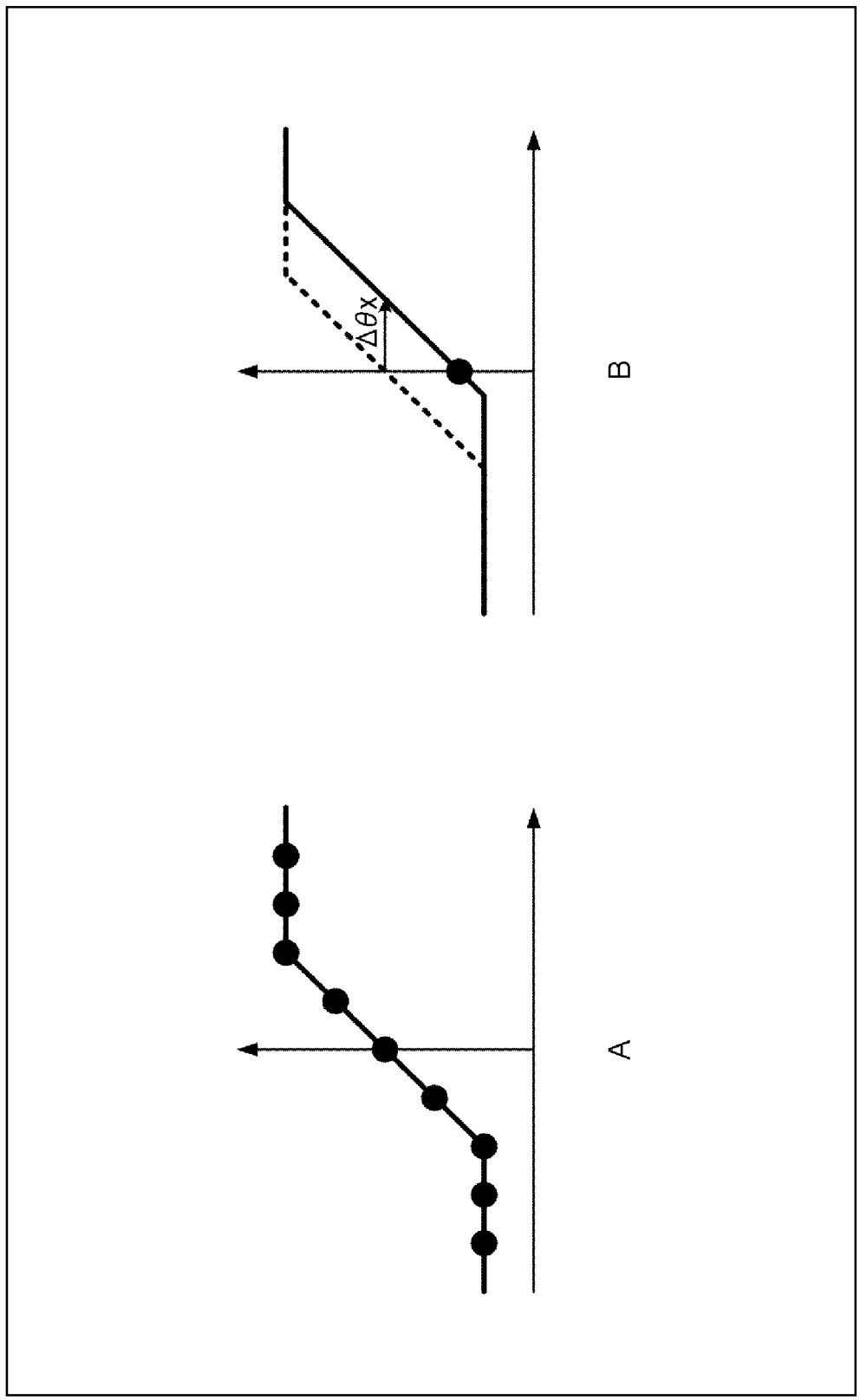
FIG. 31 is a diagram illustrating an example of a state of calibration.

Furthermore, for example, the light emission unit 501 may emit light (parallel light) once at a predetermined incident angle to the imaging element 121, and the calibration unit 502 may derive the actual incident angle directivity (the actual weight graph in FIG. 8 of the pixel 121*a*) on the basis of the detection result (the signal level of the detection signal) and the weight graph in FIG. 8 (that is, the incident angle directivity) derived from the design value of the imaging element 121, and generate the calibration information including the derived information (B in FIG. 31).

For example, the light emission unit 501 turns on a predetermined light source 511 to emit light at a predetermined incident angle to the imaging element 121. For example, the light emission unit 501 turns on the center light source 511 in B in FIG. 28 (the light source 511 belonging to both the light source 511 group arranged in the X direction and the light source 511 group arranged in the Y direction) to vertically emit light to the imaging element 121.

In response, the calibration unit 502 detects the signal level of the detection signal of the calibration pixel 411-1 corresponding to the light. Then, the calibration unit 502 derives a gap (difference) between the signal level and the weight graph in the X direction in FIG. 8 derived from the design value of the imaging element 121, and derives the actual incident angle directivity in the row direction of the pixel matrix in FIG. 24 of the pixel 121*a* (image restoration pixel output unit) on the basis of the gap.

Similarly, the calibration unit 502 detects the signal level of the detection signal of the calibration pixel 411-2 corresponding to the light. Then, the calibration unit 502 derives a gap (difference) between the signal level and the weight graph in the Y direction in FIG. 8 derived from the design value of the imaging element 121, and derives the actual incident angle directivity in the column direction of the pixel matrix in FIG. 24 of the pixel 121*a* (image restoration pixel output unit) on the basis of the gap.

The calibration unit 502 generates the calibration information including the incident angle directivity in the row direction and the incident angle directivity in the column direction of the pixel matrix in FIG. 24 of the pixel 121*a* (image restoration pixel output unit) derived as described above, and supplies the calibration information to the calibration information write unit 503. The calibration information write unit 503 supplies the calibration information to the imaging element 121.

By doing so, the number of times of light emission can be reduced as compared with the case of <Calibration Method Example 1>. That is, the calibration unit 502 can more easily (at a higher speed) derive the incident angle directivity in the row direction and the incident angle directivity in the column direction of the pixel matrix in FIG. 24 of the pixel 121*a* (image restoration pixel output unit), respectively, and generate the calibration information including the derived information.

A case of being applied to the case described in <Calibration Method Example 1> will be described. For example, assuming that, in FIG. 24, the pixel 121*a* in the effective pixel region 401 and the calibration pixel 411-1 in the calibration pixel region 402 in the same column have the same incident angle directivity in the row direction of the pixel matrix Similarly, assuming that, in FIG. 24, the pixel 121*a* in the effective pixel region 401 and the calibration pixel 411-2 in the calibration pixel region 402 in the same row have the same incident angle directivity in the column direction of the pixel matrix In this case, by obtaining the incident angle directivity in the row direction of the pixel matrix of the calibration pixel 411-1, the incident angle directivity in the row direction of the pixel matrix of the pixel 121*a* in the effective pixel region 401 in the same column as the calibration pixel 411-1 can be obtained. Similarly, by obtaining the incident angle directivity in the column direction of the pixel matrix of the calibration pixel 411-2, the incident angle directivity in the column direction of the pixel matrix of the pixel 121*a* in the same row in the effective pixel region 401 as the calibration pixel 411-2 can be obtained.

Note that, in a case where a plurality of calibration pixels 411-1 corresponds to one pixel 121*a*, a statistical value (for example, a mean or a median) of the incident angle directivities in the row direction of the pixel matrix of the calibration pixels 411-1 may be adopted as the incident angle directivity in the row direction of the pixel matrix of the pixel 121*a*. Similarly, in a case where a plurality of calibration pixels 411-2 corresponds to one pixel 121*a*, a statistical value (for example, a mean or a median) of the incident angle directivities in the column direction of the pixel matrix of the calibration pixels 411-2 may be adopted as the incident angle directivity in the column direction of the pixel matrix of the pixel 121*a*.

In such cases, in deriving the incident angle directivity of the calibration pixel 411, the light emission unit 501 may emit the light at a predetermined incident angle to the imaging element 121 once, and the calibration unit 502 may derive the actual incident angle directivity (the actual weight graph in FIG. 8 of the pixel 121*a*) on the basis of the detection result (the signal level of the detection signal), as described above.

Calibration Method Example 3

Furthermore, for example, the calibration unit 502 may derive the actual incident angle directivity of the pixel 121*a* (the actual weight graph in FIG. 8 of the pixel 121*a*) using a statistical value of parallel light detection results (signal levels of the detection signals) of a plurality of calibration pixels 411, and generate the calibration information including information of the derived incident angle directivity.

Figure 32:
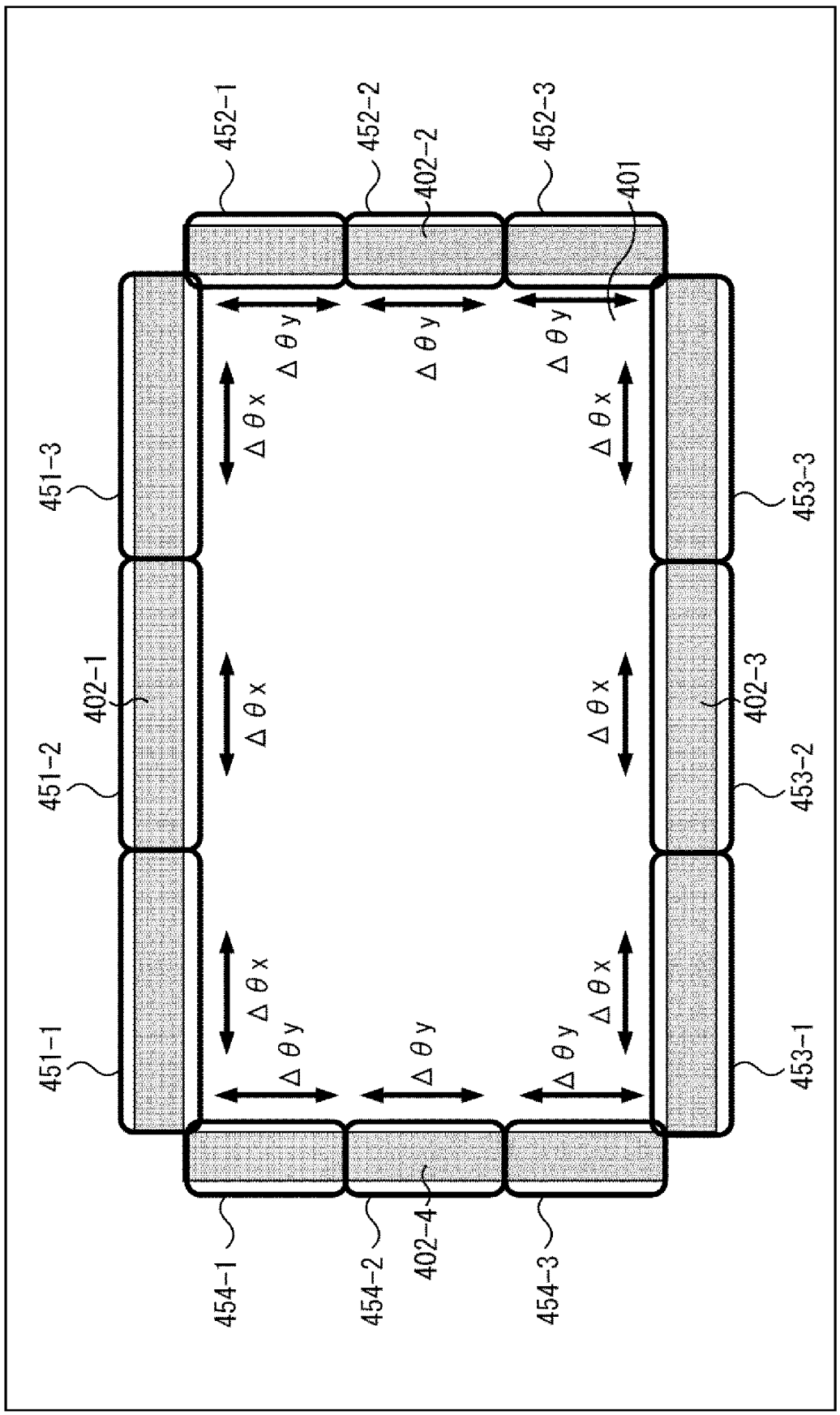
FIG. 32 is a diagram illustrating an example of a state of calibration.

For example, as illustrated in the example in FIG. 32, the calibration unit 502 may derive a statistical value of the parallel light detection results of the calibration pixels 411 for each predetermined small region obtained by dividing the calibration pixel region 402 (calibration pixel regions 402-1 to 402-4), and derive actual incident angle directivity of the pixel 121*a* using the statistical value.

In the case of the example in FIG. 32, the calibration pixel region 402-1 is divided into small regions 451-1 to 451-3, the calibration pixel region 402-2 is divided into small regions 452-1 to 452-3, the calibration pixel region 402-3 is divided into small regions 453-1 to 453-3, and the calibration pixel region 402-4 is divided into small regions 454-1 to 454-3. The number of divisions of the calibration pixel region 402, that is, the number of small regions is arbitrary and is not limited to the example in FIG. 32.

The calibration unit 502 derives the statistical value of the parallel light detection results of the calibration pixels 411 for each small region. The number of calibration pixels 411 included in each small region is arbitrary. The number of calibration pixels 411 included in each small region may or may not be uniform. Furthermore, the statistical value to be derived is arbitrary. For example, the statistical value may be a mean, a median, or any other value.

The calibration unit 502 specifies the way of shifting between the actual incident angle directivity and the design value of the pixel 121a, that is, the way of shifting of the light-shielding film (the magnitude, direction, and the like of the gap) for the entire light-receiving unit 111, using the derived statistical value of the parallel light detection results for each small region. As described with reference to FIG. 29, in general, the light-shielding film often uniformly shifts over the entire light-receiving unit 111. That is, the way of shifting of the light-shielding film has mainly the following patterns, as illustrated in FIG. 29.

1: The light-shielding films of all the pixels of the pixel matrix formed in the light-receiving unit 111 shift in the X direction (arrow 521).

2: The light-shielding films of all the pixels of the pixel matrix formed in the light-receiving unit 111 shift in the Y direction (arrow 522).

3: The light-shielding films of all the pixels of the pixel matrix formed in the light-receiving unit 111 entirely shift in a rotation direction (arrow 523).

4: The height of the on-chip lens 121c shifts (entire screen).

The calibration unit 502 specifies which of the above patterns the way of shifting of the light-shielding films is, using the derived statistical value of the parallel light detection results for each small region.

For example, in a case where all the incident angle directivities based on the statistical value of each small region shift in the same direction with respect to the design values, the calibration unit 502 estimates that the light-shielding films of all the pixels 121a shift in that direction (that is, the calibration unit 502 specifies the above-described pattern 1 or 2). Furthermore, for example, in a case where the incident angle directivity based on the statistical value of each small region in the calibration pixel region 402-1 shifts rightward in FIG. 32, the incident angle directivity based on the statistical value of each small area in the calibration pixel region 402-2 shifts downward in FIG. 32, the incident angle directivity based on the statistical value of each small region in the calibration pixel region 402-3 shifts leftward in FIG. 32, and the incident angle directivity based on the statistical value of each small region in the calibration pixel region 402-4 shifts upward in FIG. 32, the calibration unit 502 estimates that the light-shielding films of all the pixels 121a shift in the rotation direction (that is, the calibration unit 502 specifies the above-described pattern 3). Moreover, for example, in a case where inclinations of all the incident angle directivities based on the statistical value of each small region similarly shift with respect to the design values, the calibration unit 502 estimates that the height of the on-chip lens shifts (that is, the calibration unit 502 specifies the above-described pattern 4).

Then, the calibration unit 502 derives the total gap amount, the rotation angle, and the like on the basis of the gap amounts ($\Delta\theta x$ and $\Delta\theta y$).

By using the statistical value in this manner, the calibration unit 502 can suppress the influence of abnormal values and the like of the parallel light detection results that have occurred in some calibration pixels 411. Therefore, the calibration unit 502 can more accurately derive the actual incident angle directivity of the pixel 121a.

<Flow of Calibration Processing>

Figure 33:
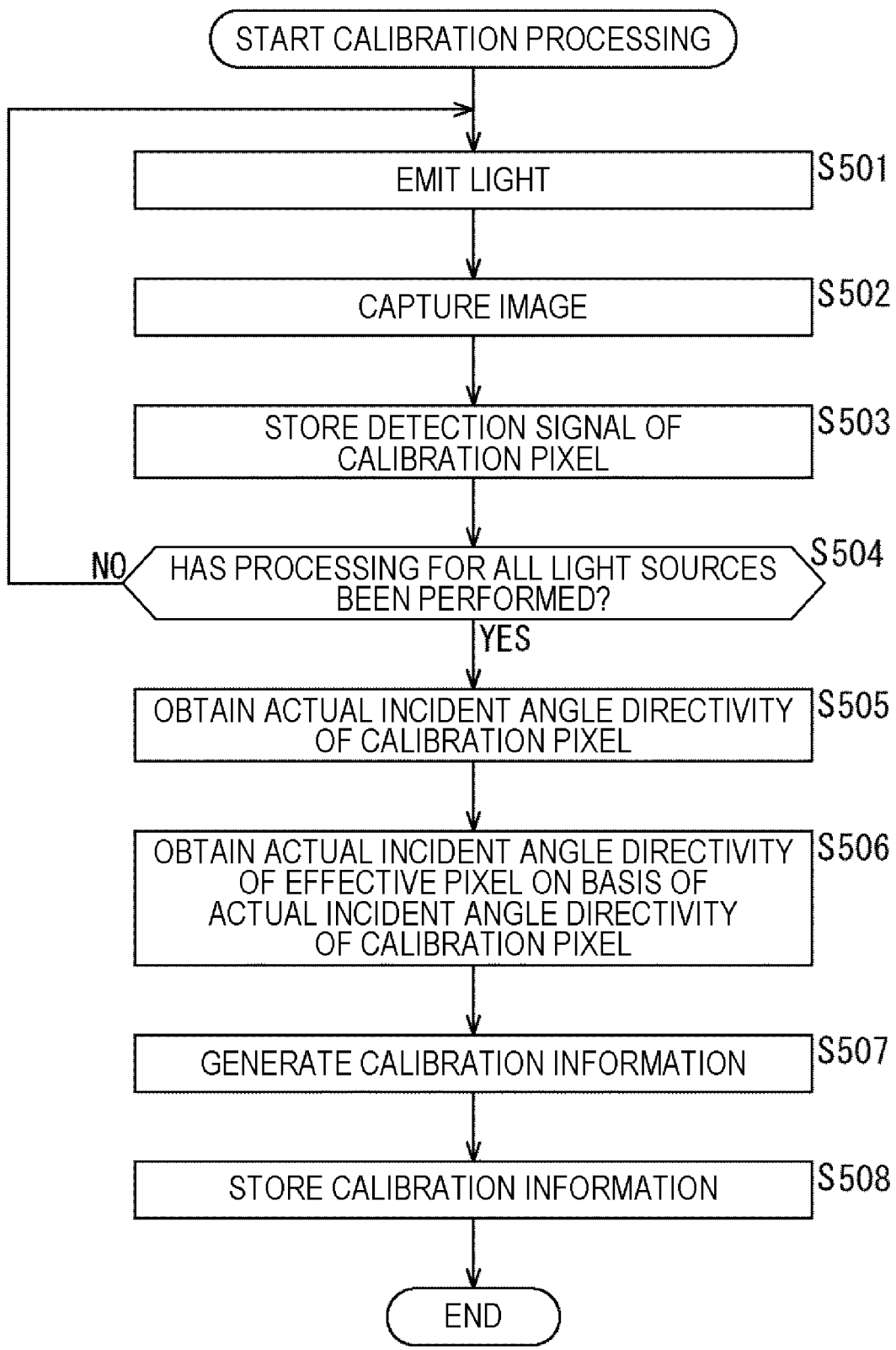
FIG. 33 is a flowchart for describing an example of a flow of calibration processing.

Next, an example of a flow of calibration processing executed in the calibration device 500 will be described with reference to the flowchart in FIG. 33.

When the calibration processing is started, in step S501, the light emission unit 501 of the calibration device 500 emits light from the light source 511 to be processed.

In step S502, the imaging element 121 captures an image with the light emitted (at a predetermined incident angle corresponding to the position of the light source 511), and generates the detection signal in the calibration pixel 411.

In step S503, the calibration unit 502 stores the detection signal of the calibration pixel 411 generated in step S501.

In step S504, the calibration unit 502 determines whether or not the processing has been performed for all of light sources. In the case where it is determined that there is an unprocessed light source 511, the processing returns to step S501.

That is, steps S501 to S504 are executed for each light source 511. Then, in step S504, when it is determined that the detection signals of the calibration pixel 411 have been obtained for all the light sources 511, the processing proceeds to step S505.

In step S505, the calibration unit 502 obtains the actual incident angle directivity of the calibration pixel 411 on the basis of the detection signals.

In step S506, the calibration unit 502 obtains the actual incident angle directivity of each pixel 121a in the effective pixel region 401 on the basis of the actual incident angle directivity of the calibration pixel 411.

In step S507, the calibration unit 502 generates the calibration information on the basis of the actual incident angle directivity of the pixel 121a obtained in step S506. For example, the calibration unit 502 generates the calibration information including the actual incident angle directivity of the pixel 121a. Furthermore, for example, the calibration unit 502 obtains the gap between the actual incident angle directivity of the pixel 121a and the design value of the incident angle directivity of the pixel 121a stored in advance, and generates the calibration information including information indicating the gap.

In step S508, the calibration information write unit 503 writes and stores the calibration information in the restoration matrix generation unit 102 of the imaging element 121.

When the processing in step S508 ends, the calibration processing ends.

By performing the calibration processing in this way, the calibration device 500 can more easily calibrate the imaging element 121. Furthermore, as a result, the imaging element 121 can generate a more accurate restored image.

3. Second Embodiment

<Imaging Device>

The present technology can be applied to devices other than an imaging element. For example, the present technology can be applied to an imaging device.

For example, an imaging device may include an imaging element including a plurality of pixel output units each having a configuration capable of independently setting incident angle directivity for incident light incident without through both of an imaging lens and a pinhole, the plurality of pixel output units including a plurality of image restoration pixel output units arranged in a matrix, at least some of the pixel output units having the incident angle directivity both in a row direction and in a column direction of the matrix, and a unidirectional pixel output unit having the incident angle directivity only in the row direction of the matrix or only in the column direction of the matrix; and a generation unit configured to generate, using an output of the unidirectional pixel output unit, a restoration matrix to be used when generating a restored image from a detection image that is an output of the plurality of image restoration pixel output units.

That is, a restoration matrix to be used when generating a restored image from a detection image that is an output of a plurality of image restoration pixel output units may be generated using an output from a unidirectional pixel output unit, of an imaging element including a plurality of pixel output units each having a configuration capable of independently setting incident angle directivity for incident light incident without through both of an imaging lens and a pinhole, the plurality of pixel output units being arranged in a matrix, and at least some of the pixel output units including the plurality of image restoration pixel output units having the incident angle directivity both in a row direction and in a column direction of the matrix, and the unidirectional pixel output unit having the incident angle directivity only in the row direction of the matrix or only in the column direction of the matrix.

By doing so, the imaging device can generate a more accurate restored image.

FIG. 30 is a diagram illustrating a main configuration example of an embodiment of an imaging device to which the present technology is applied. An imaging device 600 illustrated in FIG. 30 is a device that captures an image of an object and obtains electronic data regarding the captured image.

As illustrated in FIG. 30, the imaging device 600 includes a control unit 601, an input unit 611, an output unit 612, a storage unit 613, a communication unit 614, and a recording/reproduction unit 615. Furthermore, the imaging device 600 includes an imaging element 621, a restoration matrix generation unit 622, a restoration matrix storage unit 623, a restoration unit 624, an association unit 625, and a sensor unit 626. The processing units and the like are connected to one another via a bus 610, and can exchange information and commands with one another.

Note that the imaging element 621, the restoration matrix generation unit 622, the restoration matrix storage unit 623, the restoration unit 624, and the association unit 625 may be integrated into an imaging unit 620. The imaging unit 620 may be implemented by any physical configuration. For example, the imaging unit 620 may be implemented as a processor such as a system large scale integration (LSI). Furthermore, the imaging unit 620 may be implemented as a module using a plurality of processors and the like, a device unit using a plurality of modules and the like, or a set in which another function is further added to the device unit (that is, a partial configuration of a device). Furthermore, the imaging unit 620 may be implemented as a device.

The control unit 601 is configured to perform processing regarding control of each processing unit and the like in the imaging device 600. Furthermore, the control unit 601 includes, for example, a central processing unit (CPU), a read only memory (ROM), a random access memory (RAM), and the like, and performs the above-described processing by executing a program using the CPU and the like.

The input unit 611 is configured to perform processing regarding information input. For example, the input unit 611 includes input devices such as an operation button, a dial, a switch, a touch panel, a remote controller, and a sensor, and an external input terminal. For example, the input unit 611 receives an instruction (information corresponding to an input operation) from the outside such as a user by using these input devices. Furthermore, for example, the input unit 611 acquires arbitrary information (a program, a command, data, or the like) supplied from an external device via the external input terminal. Furthermore, for example, the input unit 611 supplies the received information (acquired information) to another processing unit or the like via the bus 610.

Note that the sensor included in the input unit 611 may be any sensor such as an acceleration sensor as long as the sensor can receive an instruction from the outside such as the user. Furthermore, the input device included in the input unit 611 is arbitrary, and the number thereof is also arbitrary. The input unit 611 may include a plurality of types of input devices. For example, the input unit 611 may include some or all of the above examples. Furthermore, the input unit 611 may include an input device other than the above-described examples. Moreover, for example, the input unit 611 may acquire control information of the input unit 611 itself (the input device or the like) supplied via the bus 610 and drive the input device on the basis of the control information.

The output unit 612 is configured to perform processing regarding output of information. For example, the output unit 612 includes an image display device such as a monitor, an image projection device such as a projector, an audio output device such as a speaker, and an external output terminal. For example, the output unit 612 outputs information supplied from another processing unit or the like via the bus 610, using those output devices or the like. For example, the output unit 612 displays the captured image (restored image) on a monitor, projects the captured image (restored image) from a projector, outputs sound (for example, sound corresponding to an input operation or a processing result), or outputs arbitrary information (a program, a command, data, or the like) to the outside (other devices).

Note that the output device or the like included in the output unit 612 is arbitrary, and the number thereof is also arbitrary. The output unit 612 may include a plurality of types of output devices or the like. For example, the output unit 612 may include some or all of the above-described examples. Furthermore, the output unit 612 may include an output device or the like other than the above-described examples. Moreover, for example, the output unit 612 may acquire control information of the output unit 612 itself (the output device or the like) supplied via the bus 610 and drive the output device on the basis of the control information.

The storage unit 613 is configured to perform processing regarding storage of information. For example, the storage unit 613 includes an arbitrary storage media such as a hard disk and a semiconductor memory. For example, the storage unit 613 stores information (a program, a command, data, or the like) supplied from another processing unit or the like via the bus 610 in the storage medium. Furthermore, the storage unit 613 may store arbitrary information (a program, a command, data, or the like) at the time of shipment. Furthermore, the storage unit 613 reads information stored in the storage medium at arbitrary timing or in response to a request from another processing unit or the like, and supplies the read information to the another processing unit or the like via the bus 610.

Note that the storage medium included in the storage unit 613 is arbitrary and the number thereof is also arbitrary. The storage unit 613 may include a plurality of types of storage media. For example, the storage unit 613 may include some or all of the above-described examples of the storage medium. Furthermore, the storage unit 613 may include a storage medium other than the above-described examples. Furthermore, for example, the storage unit 613 may acquire control information of the storage unit 613 itself supplied via the bus 610 and drive the storage unit on the basis of the control information.

The communication unit 614 is configured to perform processing regarding communication with other devices. For example, the communication unit 614 includes a communication device that performs communication to exchange information such as programs and data with an external device via a predetermined communication medium (for example, an arbitrary network such as the Internet). For example, the communication unit 614 communicates with another device and supplies information (a program, a command, data, or the like) supplied from another processing unit or the like via the bus 610 to the another device as a communication partner. Furthermore, for example, the communication unit 614 communicates with another device and acquires information supplied from the another device as a communication partner, and supplies the information to another processing unit or the like via the bus 610.

The communication device included in the communication unit 614 may be of any type. For example, the communication device may be a network interface. The communication method and communication standard are arbitrary. For example, the communication unit 614 may be able to perform wired communication, wireless communication, or both of the wired and wireless communication. Furthermore, for example, the communication unit 614 may acquire control information of the communication unit 614 itself (the communication device or the like) supplied via the bus 610 and drive the communication device on the basis of the control information.

The recording/reproduction unit 615 is configured to perform processing regarding recording and reproduction of information using a recording medium 616 attached thereto. For example, the recording/reproduction unit 615 reads information (a program, a command, data, or the like) recorded in the recording medium 616 attached thereto, and supplies the information to another processing unit or the like via the bus 610. Furthermore, for example, the recording/reproduction unit 615 acquires information supplied from another processing unit or the like via the bus 610, and writes (records) the information in the recording medium 616 attached thereto. Note that, for example, the recording/reproduction unit 615 may acquire control information of the recording/reproduction unit 615 itself supplied via the bus 610 and may be driven on the basis of the control information.

Note that the recording medium 616 may be of any type. For example, the recording medium 616 may be a magnetic disk, an optical disk, a magneto-optical disk, a semiconductor memory, or the like. Furthermore, the recording medium 616 may be a (removable) recording medium attachable to/detachable from the recording/reproduction unit 615 or may be a recording medium built in the imaging device 600 and fixedly connected to the recording/reproduction unit 615.

The imaging element 621 captures an image of an object, generates a detection signal in each pixel, outputs a detection image formed using the detection signal, and supplies the detection image to the restoration unit 624 and the association unit 625.

The restoration matrix generation unit 622 is a processing unit similar to the above-described restoration matrix generation unit 102, and has a similar configuration and performs similar processing. For example, the restoration matrix generation unit 622 generates a restoration matrix corresponding to actual incident angle directivity of a pixel 121*a*, using calibration information that is information generated using an output of a unidirectional pixel output unit supplied from the outside of the imaging device 600, for example, and is regarding calibration of the incident angle directivity of each pixel (image restoration pixel output unit) of the imaging element 621. The restoration matrix generation unit 622 supplies the generated restoration matrix to the restoration matrix storage unit 623.

The restoration matrix storage unit 623 is a processing unit similar to the above-described restoration matrix storage unit 103, and has a similar configuration and performs similar processing. For example, the restoration matrix storage unit 623 acquires the restoration matrix supplied from the restoration matrix generation unit 622 and stores (retains) the restoration matrix in the storage medium. The restoration matrix storage unit 623 reads the restoration matrix stored in the storage medium as necessary (for example, at predetermined timing or in response to a request), and supplies the read restoration matrix to the restoration unit 624 or the association unit 625, or both of the restoration unit 624 and the association unit 625.

The restoration unit 624 is a processing unit similar to the above-described restoration unit 104, and has a similar configuration and performs similar processing. For example, the restoration unit 624 performs a predetermined operation for the detection image (detection signal) supplied from the imaging element 621, using the restoration matrix (the restoration matrix corresponding to the actual incident angle directivity of the pixel 121*a*) supplied from the restoration matrix storage unit 623, thereby generating a restored image. The restoration unit 624 supplies generated output data (restored image or the like) to any one or more of the output unit 612 to the recording/reproduction unit 615. Note that the restoration unit 624 may apply arbitrary image processing such as gamma correction (γ correction) and white balance control to the restored image. Furthermore, the restoration unit 624 may convert a format of data of the restored image or compress the data of the restored image by a predetermined compression method such as the Joint Photographic Experts Group (JPEG), Tagged Image File Format (TIFF), or Graphics Interchange Format (GIF).

The association unit 625 is a processing unit similar to the above-described association unit 105, and has a similar configuration and performs similar processing. For example, the association unit 625 associates the restoration matrix (the restoration matrix corresponding to the actual incident angle directivity of the pixel 121*a*) supplied from the restoration matrix storage unit 623 with the detection image (detection signal) supplied from the imaging element 621. The association unit 625 supplies the associated data to any one or more of the output unit 612 to the recording/reproduction unit 615 as output data. Note that the association between the detection image and the restoration matrix may be performed by another processing unit such as the recording/reproduction unit 615. In that case, the recording/reproduction unit 615 or the like can be regarded as an association unit, and the association unit 625 can be omitted.

The sensor unit 626 is configured to perform processing regarding detection. For example, the sensor unit 626 has an arbitrary sensor and detects a predetermined parameter. For example, the sensor unit 626 detects a parameter related to a state around the imaging device 600, a parameter related to a state of the imaging device 600, and the like. For example, the sensor unit 626 detects a parameter related to a state of the imaging element 121. Furthermore, for example, the sensor unit 626 supplies the detected information to another processing unit or the like via the bus 610.

As described above, the imaging device 600 can generate the restoration matrix using the calibration information of the imaging element 621 and generate the restored image using the restoration matrix (the restoration matrix corresponding to the actual incident angle directivity of the pixel 121a). Therefore, the imaging device 600 can generate a more accurate restored image. Furthermore, the imaging device 600 can supply the restoration matrix (the restoration matrix corresponding to the actual incident angle directivity of the pixel 121a) in association with the detection image to another device. Therefore, the another device can generate a more accurate restored image. Note that the imaging element 121, and the restoration matrix generation unit 622 to the sensor unit 626 may acquire its own control information supplied via the bus 610 and may be driven on the basis of the control information.

Furthermore, as described above, the imaging element 621 performs the processing such as generation of the restoration matrix at the outside the imaging element 621. That is, the processing such as generation of the restoration matrix to which the present technology is applied can be performed (either one of) inside or outside the imaging element.

<Imaging Element>

Figure 35:
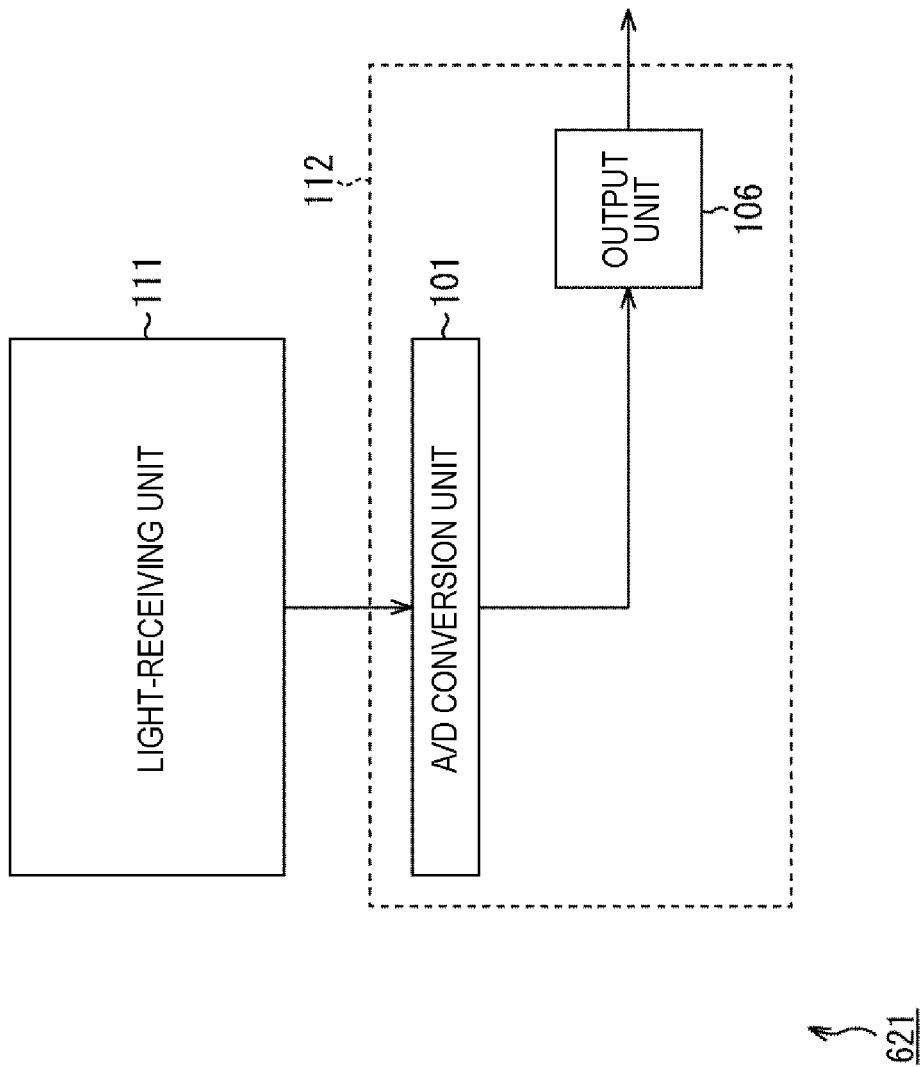
FIG. 35 is a block diagram illustrating a main configuration example of an imaging element.

FIG. 35 is a block diagram illustrating a main configuration example of the imaging element 621. As illustrated in FIG. 35, the imaging element 621 includes a light-receiving unit 111 and the other processing unit 112 (an A/D conversion unit 101 and an output unit 106). That is, the imaging element 621 can omit the restoration matrix generation unit 102 to the association unit 105 as compared with the imaging element 121 (FIG. 1).

4. Third Embodiment

<Calibration of Imaging Element in Imaging Device>

Figure 36:
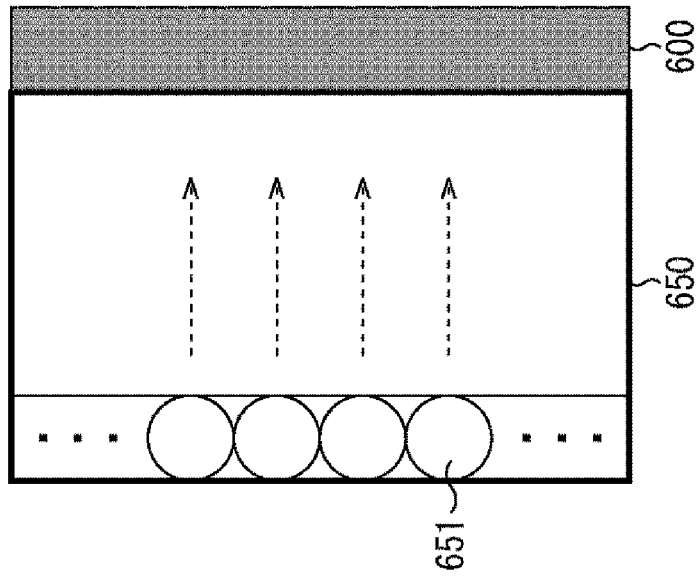
FIG. 36 is a diagram illustrating an example of an attachment.

Furthermore, an imaging device 600 may be able to calibrate an imaging element 621. For example, as illustrated in FIG. 36, an attachment 650 may be attached to the imaging device 600, a light source 651 provided in the attachment 650 may emit light, and the imaging device 600 (imaging element 121) may capture an image of the light and calibrate the imaging element 621 using a detection image.

In this case, the light source 651 of the attachment 650 has a similar configuration to the light source 511 of the light emission unit 501 of the calibration device 500 and can be similarly turned on. That is, the light from each light source 651 enters the imaging element 121 at an incident angle according to the position of the light source 651 as parallel light.

<Imaging Device>

Figure 34:
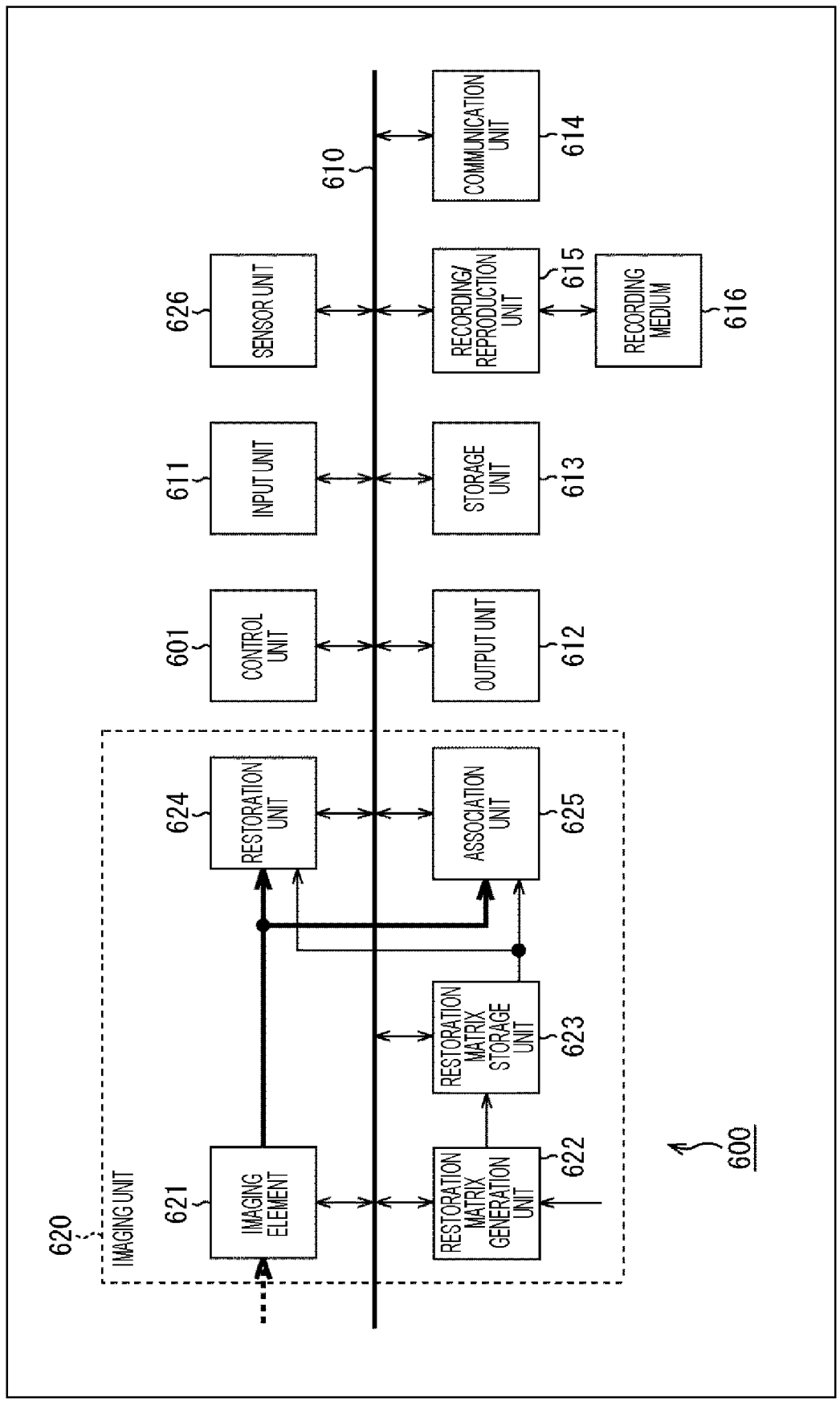
FIG. 34 is a diagram illustrating a main configuration example of an imaging device to which the technology of the present disclosure is applied.
Figure 37:
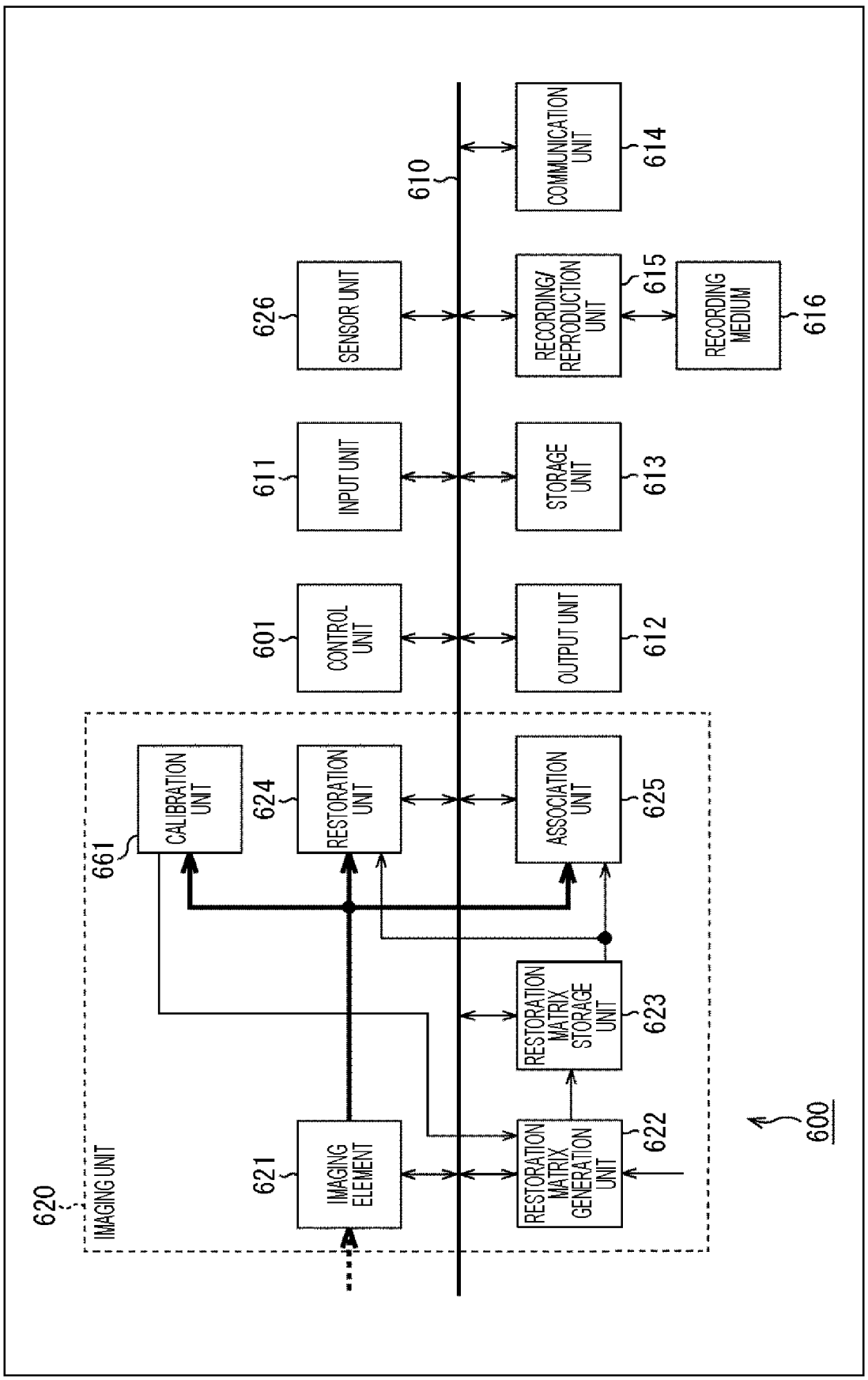
FIG. 37 is a diagram illustrating a main configuration example of an imaging device to which the technology of the present disclosure is applied.

FIG. 37 illustrates a main configuration example of the imaging device 600 in this case. As illustrated in FIG. 37, the imaging device 600 in this case also basically has a similar configuration to the case in FIG. 34 but the imaging device 600 further includes a calibration unit 661 in addition to the configuration.

Basically, the calibration unit 661 has a similar configuration and performs similar processing to the calibration unit 502 of the calibration device 500. For example, the calibration unit 661 acquires a detection signal of a calibration pixel 411 captured and generated by the imaging element 621 in a state where the light being emitted from the attachment 650 as described above, and generates calibration information on the basis of the detection signal. The method of generating the calibration information is similar to the case of the calibration unit 502. The calibration unit 661 supplies the generated calibration information to a restoration matrix generation unit 622.

The restoration matrix generation unit 622 generates a restoration matrix (that is, a restoration matrix corresponding to actual incident angle directivity of a pixel 121a of the imaging element 621) using the calibration information thus supplied.

Therefore, even in this case, the imaging device 600 can generate a more accurate restored image.

5. Fourth Embodiment

<Calibration System>

Note that a plurality of patterns of calibration information is prepared in advance, a restoration matrix is generated using each calibration information, and calibration information by which a more accurate restored image (with a smaller S/N ratio) is obtained may be selected. Moreover, the calibration information may be selected outside an imaging device or an imaging element (for example, by a server or the like).

Figure 38:
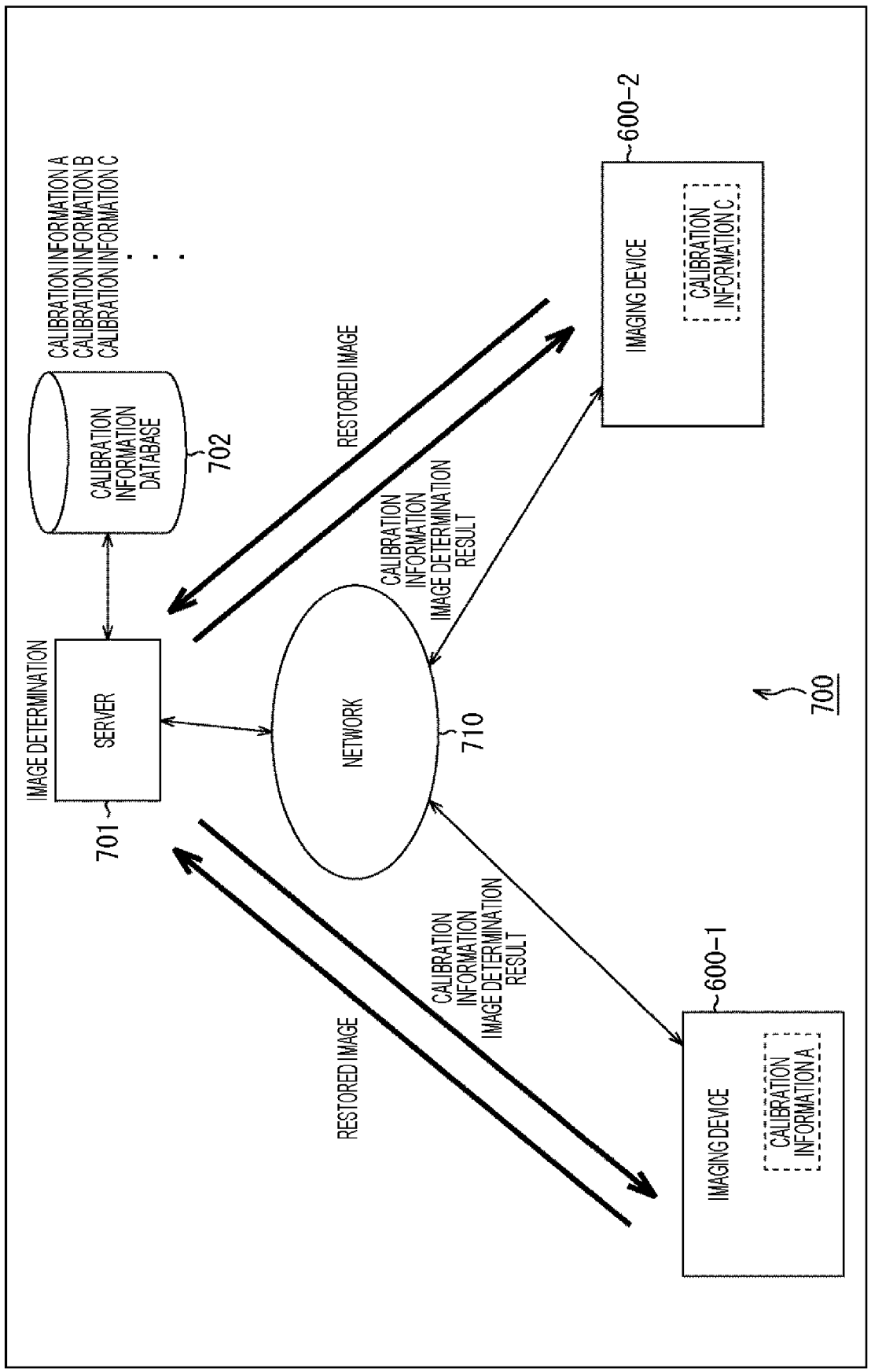
FIG. 38 is a diagram illustrating a main configuration example of an imaging system to which the technology of the present disclosure is applied.

FIG. 38 is a diagram illustrating a main configuration example of a calibration system that is an embodiment of an information processing system to which the present technology is applied. A calibration system 700 illustrated in FIG. 38 is a system that selects calibration information to be used for generating the restoration matrix in the imaging device (or the imaging element) as described above.

As illustrated in FIG. 38, the calibration system 700 includes a server 701, a calibration information database 702, a network 710, and a plurality of imaging devices 600 (for example, imaging devices 600-1 and 600-2).

The server 701 is connected to the imaging devices 600 via the network 710, and performs processing regarding selection of calibration information to be used in each imaging device 600. A plurality of pieces of calibration information is stored in advance in the calibration information database 702.

The imaging device 600 generates a restoration matrix using the calibration information, generates a restored image using the restoration matrix, and supplies the restored image to the server 701 via the network 710.

The server 701 determines the image quality of the restored image and returns an image determination result to the imaging device 600. At this time, in a case where the server 701 determines that the image quality is not sufficient (for example, the S/N ratio is low), the server 701 acquires new calibration information from the calibration information database 702 and supplies the new calibration information together with the image determination result to the imaging device 600.

The imaging device 600 generates a restoration matrix using the supplied calibration information, captures an image again, and generates a restored image using the restoration matrix. The imaging device 600 supplies the restored image to the server 701 again.

The above processing is repeated until the server 701 determines that the image quality of the restored image is sufficient or until the image quality becomes the best.

By doing so, the imaging device 600 can generate a more accurate restored image. That is, the imaging device 600 can suppress reduction in the image quality of the restored image.

6. Appendix

<Computer>
The above-described series of processing can be executed by hardware or by software. In the case of executing the series of processing by software, a program that configures the software is installed in a computer. Here, the computer includes a computer incorporated in dedicated hardware, a computer, for example, general-purpose personal computer, capable of executing various functions by installing various programs, and the like.

Figure 39:
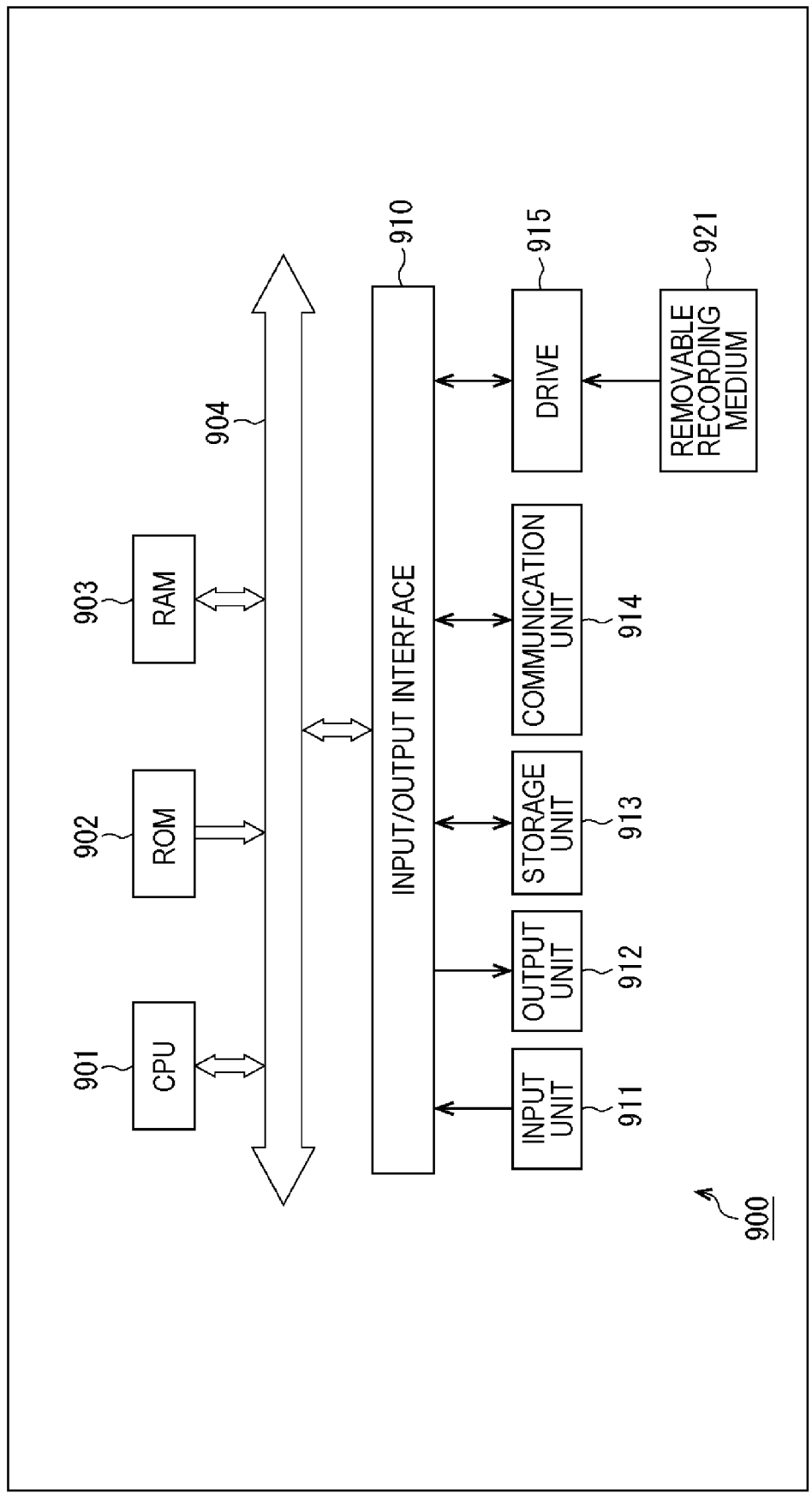
FIG. 39 is a block diagram illustrating a main configuration example of a computer.

FIG. 39 is a block diagram illustrating a configuration example of hardware of a computer that executes the above-described series of processing by a program.

In a computer 900 illustrated in FIG. 39, a central processing unit (CPU) 901, a read only memory (ROM) 902, and a random access memory (RAM) 903 are mutually connected by a bus 904.

An input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, a nonvolatile memory, and the like. The communication unit 914 includes, for example, a network interface. The drive 915 drives a removable recording medium 921 such as a magnetic disk, an optical disk, a magneto-optical disk, or a semiconductor memory.

In the computer configured as described above, the CPU 901 loads, for example, a program stored in the storage unit 913 into the RAM 903 and executes the program via the input/output interface 910 and the bus 904, so that the above-described series of processing is performed. Furthermore, the RAM 903 appropriately stores data and the like necessary for the CPU 901 to execute the various types of processing.

The program to be executed by the computer (CPU 901) can be applied by being recorded on the removable recording medium 921 as a package medium or the like, for example. In that case, the program can be installed to the storage unit 913 via the input/output interface 910 by attaching the removable recording medium 921 to the drive 915.

Furthermore, this program can be provided via a wired or wireless transmission medium such as a local area network, the Internet, or digital satellite broadcast. In that case, the program can be received by the communication unit 914 and installed in the storage unit 913.

Other than the above method, the program can be installed in the ROM 902 or the storage unit 913 in advance.

<Applicable Object of Present Technology>
Note that the systems, devices, processing units, and the like to which the present technology is applied can be used in arbitrary fields such as traffic, medical care, crime prevention, agriculture, livestock industry, mining, beauty, factory, household appliance, weather, and natural surveillance, for example. Furthermore, uses in the arbitrary fields are also arbitrary.

For example, the present technology can be applied to systems and devices provided for providing content for appreciation and the like. Furthermore, for example, the present technology can also be applied to systems and devices used for traffic, such as traffic condition monitoring and automatic driving control. Moreover, for example, the present technology can also be applied to systems and devices provided for security. Furthermore, for example, the present technology can be applied to systems and devices provided for automatic control of machines and the like. Moreover, for example, the present technology can also be applied to systems and devices provided for agriculture or livestock industry. Furthermore, the present technology can also be applied to systems and devices that monitor nature states such as volcanos, forests, and ocean, wildlife, and the like. Moreover, for example, the present technology can also be applied to systems and devices provided for sports.

<Others>
Embodiments of the present technology are not limited to the above-described embodiments, and various modifications can be made without departing from the gist of the present technology.

For example, the present technology can be implemented as any configuration constituting a device or a system, such as a processor as a system large scale integration (LSI) or the like, a module using a plurality of processors or the like, a device unit using a plurality of modules or the like, or a set in which other functions are added to the device unit (that is, a configuration of a part of the device), for example.

Furthermore, the above-described each processing unit can be implemented by an arbitrary configuration. For example, the each processing unit may be configured by a circuit, an LSI, a system LSI, a processor, a module, a device unit, a set, a device, an apparatus, a system, or the like. Furthermore, a plurality of the aforementioned configurations may be combined. At this time, for example, the same type of configurations such as a plurality of circuits or a plurality of processors may be combined, or different types of configurations such as a circuit and an LSI may be combined.

Note that, in this specification, the term "system" means a group of a plurality of configuration elements (devices, modules (parts), and the like), and whether or not all the configuration elements are in the same casing is irrelevant. Therefore, a plurality of devices housed in separate housings and connected via a network, and one device that houses a plurality of modules in one casing are both systems.

Further, for example, the configuration described as one device (or processing unit) may be divided into and configured as a plurality of devices (or processing units). On the contrary, the configuration described as a plurality of devices (or processing units) may be collectively configured as one device (or processing unit). Furthermore, a configuration other than the above-described configuration may be added to the configuration of each device (or each processing unit). Moreover, a part of the configuration of a certain device (or processing unit) may be included in the configuration of another device (or another processing unit) as long as the configuration and operation of the system as a whole are substantially the same.

Further, for example, in the present technology, a configuration of cloud computing in which one function is shared and processed in cooperation by a plurality of devices via a network can be adopted. For example, the present technology can be applied to a cloud service that provides a service regarding a captured image (moving image) to an arbitrary terminal such as a computer, an audio visual (AV) device, a portable information processing terminal, or an internet of things (IoT) device.

Furthermore, for example, the above-described program can be executed by an arbitrary device. In that case, the device is only required to have necessary functions (functional blocks and the like) and obtain necessary information.

Further, for example, the steps described in the above-described flowcharts can be executed by one device or can be executed by a plurality of devices in a shared manner. Moreover, in the case where a plurality of processes is included in one step, the plurality of processes included in the one step can be executed by one device or can be shared and executed by a plurality of devices. In other words, the plurality of processes included in one step can be executed as processes of a plurality of steps. Conversely, the processing described as a plurality of steps can be collectively executed as one step.

In the program executed by the computer, the processing of the steps describing the program may be executed in chronological order according to the order described in the present specification, or may be individually executed in parallel or at necessary timing when a call is made, for example. That is, the processing of each step may be executed in an order different from the above-described order as long as no contradiction occurs. Moreover, the processing of the steps describing the program may be executed in parallel with the processing of another program, or may be executed in combination with the processing of another program.

The plurality of present technologies described in the present specification can be implemented independently of one another as a single unit as long as there is no inconsistency. Of course, an arbitrary number of the present technologies can be implemented together. For example, part or whole of the present technology described in any of the embodiments can be implemented in combination with part or whole of the present technology described in another embodiment. Further, part or whole of the above-described arbitrary present technology can be implemented in combination with another technology not described above.

The present technology can also have the following configurations.

(1) An imaging element including:
a plurality of pixel output units each having a configuration capable of independently setting incident angle directivity for incident light incident without through both of an imaging lens and a pinhole, in which
the plurality of pixel output units includes
a plurality of image restoration pixel output units arranged in a matrix, at least some of the pixel output units having the incident angle directivity both in a row direction and in a column direction of the matrix, and
a unidirectional pixel output unit having the incident angle directivity only in the row direction of the matrix or only in the column direction of the matrix.

(2) The imaging element according to (1), in which
the unidirectional pixel output unit is formed in a region other than an effective pixel region that is a region in which the image restoration pixel output units are formed.

(3) The imaging element according to (2), in which
the unidirectional pixel output unit is formed in an external region outside the effective pixel region.

(4) The imaging element according to (3), in which
the unidirectional pixel output unit having the incident angle directivity only in the column direction of the matrix is formed in the external region outside the rectangular effective pixel region in the row direction of the matrix.

(5) The imaging element according to (3) or (4), in which
the unidirectional pixel output unit having the incident angle directivity only in the row direction of the matrix is formed in the external region outside the rectangular effective pixel region in the column direction of the matrix.

(6) The imaging element according to any one of (3) to (5), in which
at least one of the plurality of image restoration pixel output units formed in the effective pixel region has the same incident angle directivity as at least one of a plurality of the unidirectional pixel output units formed in the external regions in the row direction and in the column direction of the matrix.

(7) The imaging element according to (6), in which
at least one of the image restoration pixel output units in each row of the matrix has the same incident angle directivity in the column direction of the matrix as at least one of the unidirectional pixel output units provided in the same row as the each row, of the external region.

(8) The imaging element according to (6) or (7), in which
at least one of the image restoration pixel output units in each column of the matrix has the same incident angle directivity in the row direction of the matrix as at least one of the unidirectional pixel output units provided in the same column as the each column, of the external region.

(9) The imaging element according to any one of (6) to (8), in which
at least one of the image restoration pixel output units in each row of the matrix has the same incident angle directivity in the column direction of the matrix as at least one of the unidirectional pixel output units provided in another row different from the each row, of the external region.

(10) The imaging element according to any one of (6) to (9), in which
at least one of the image restoration pixel output units in each column of the matrix has the same incident angle directivity in the row direction of the matrix as at least one of the unidirectional pixel output units provided in another column different from the each column, of the external region.

(11) The imaging element according to any one of (6) to (10), in which
all of the image restoration pixel output units formed in the effective pixel region have the same incident angle directivity as at least one of a plurality of the unidirectional pixel output units formed in the external regions in the row direction and in the column direction of the matrix.

(12) The imaging element according to any one of (6) to (10), in which
some image restoration pixel output units in a plurality of the image restoration pixel output units formed in the effective pixel region have the same incident angle directivity as at least one of a plurality of the unidirectional pixel output units formed in the external regions in the row direction and in the column direction of the matrix.

(13) The imaging element according to (12), in which the incident angle directivities in the row direction and in the column direction of the matrix, of the other image restoration pixel output units than the some image restoration pixel output units formed in the effective pixel region, are able to be estimated on the basis of the incident angle directivity of the unidirectional pixel output unit formed in the external region.

(14) The imaging element according to any one of (3) to (13), in which
at least one of the unidirectional pixel output unit or the image restoration pixel output unit is arranged in an arrangement order based on predetermined regularity of the incident angle directivity.

(15) The imaging element according to any one of (1) to (14), in which
the configuration capable of independently setting the incident angle directivity for each pixel output unit is configured using a light-shielding film.

(16) The imaging element according to any one of (1) to (15), further including:
a generation unit configured to generate a restoration matrix to be used when generating a restored image from a detection image obtained in the image restoration pixel output unit, using calibration information that is information regarding calibration of the incident angle directivity of the image restoration pixel output unit generated using the unidirectional pixel output unit.

(17) The imaging element according to (16), further including:
a restoration matrix storage unit configured to store the restoration matrix generated by the generation unit.

(18) An imaging device including:
an imaging element including
a plurality of pixel output units each having a configuration capable of independently setting incident angle directivity for incident light incident without through both of an imaging lens and a pinhole,
the plurality of pixel output units including
a plurality of image restoration pixel output units arranged in a matrix, at least some of the pixel output units having the incident angle directivity both in a row direction and in a column direction of the matrix, and
a unidirectional pixel output unit having the incident angle directivity only in the row direction of the matrix or only in the column direction of the matrix; and
a generation unit configured to generate, using an output of the unidirectional pixel output unit, a restoration matrix to be used when generating a restored image from a detection image that is an output of the plurality of image restoration pixel output units.

(19) The imaging device according to (18), in which
the generation unit generates the restoration matrix, using calibration information that is information generated using the output of the unidirectional pixel output unit, and is regarding calibration of the incident angle directivity of the image restoration pixel output unit.

(20) An information processing method including:
generating, using an output of a unidirectional pixel output unit, a restoration matrix to be used when generating a restored image from a detection image that is an output of a plurality of image restoration pixel output units, of
an imaging element including
a plurality of pixel output units each having a configuration capable of independently setting incident angle directivity for incident light incident without through both of an imaging lens and a pinhole,
the plurality of pixel output units including
the plurality of image restoration pixel output units arranged in a matrix, at least some of the pixel output units having the incident angle directivity both in a row direction and in a column direction of the matrix, and
the unidirectional pixel output unit having the incident angle directivity only in the row direction of the matrix or only in the column direction of the matrix.

(21) The information processing method according to (20), in which
the generating a restoration matrix includes generating the restoration matrix using calibration information generated using an output from the unidirectional pixel output unit.

(22) The information processing method according to (21), further including:
measuring a positional gap of a light-shielding film having a configuration capable of independently setting the incident angle directivity of the imaging element for each pixel output unit, and generating the calibration information including information regarding the positional gap of the light-shielding film.

(23) The information processing method according to (21) or (22), further including:
measuring a height gap of an on-chip lens of the imaging element, and generating the calibration information including information regarding the height gap of an on-chip lens.

(24) The information processing method according to any one of (21) to (23), further including:
in the unidirectional pixel output unit, measuring a detection signal value for each of a plurality of incident angles different from one another of the incident light, and generating the calibration information using each measurement result.

(25) The information processing method according to any one of (21) to (24), further including:
in the unidirectional pixel output unit, measuring a detection signal value for a predetermined incident angle of the incident light, and generating the calibration information using a measurement result and a reference value.

(26) The information processing method according to any one of (21) to (25), further including:
measuring a detection signal value of each of a plurality of the unidirectional pixel output units, and generating the calibration information using a statistical value of measurement results.

REFERENCE SIGNS LIST

102 Restoration matrix generation unit
103 Restoration matrix storage unit
104 Restoration unit
105 Association unit
111 Light-receiving unit
121 Imaging element
401 Effective pixel region
402 Calibration pixel region
411 Calibration pixel
412 Light-shielding film
500 Calibration device
501 Light emission unit
502 Calibration unit
503 Calibration information write unit
511 Light source
600 Imaging device
622 Restoration matrix generation unit
623 Restoration matrix storage unit
624 Restoration unit 625 Association unit
650 Attachment
651 Light source
661 Calibration unit
700 Calibration system
701 Server
702 Calibration information database

The invention claimed is:

1. An imaging element comprising:
a plurality of pixels each having a configuration capable of independently setting incident angle directivity for incident light incident without passage through an imaging lens and a pinhole, wherein
the plurality of pixels includes
a plurality of image restoration pixels arranged in a matrix, at least some of the image restoration pixels having the incident angle directivity both in a row direction and in a column direction of the matrix, and
a unidirectional pixel having the incident angle directivity only in the row direction of the matrix or only in the column direction of the matrix, wherein the unidirectional pixel is formed in a region other than an effective pixel region that is a region in which the image restoration pixels are arranged.

2. The imaging element according to claim 1, wherein the unidirectional pixel is formed in an external region outside the effective pixel region.

3. The imaging element according to claim 2, wherein the unidirectional pixel has the incident angle directivity only in the column direction of the matrix and is formed in the external region outside a rectangular effective pixel region in the row direction of the matrix.

4. The imaging element according to claim 2, wherein the unidirectional pixel has the incident angle directivity only in the row direction of the matrix and is formed in the external region outside a rectangular effective pixel region in the column direction of the matrix.

5. The imaging element according to claim 2, wherein the unidirectional pixel is one of a plurality of unidirectional pixels, and at least one of the image restoration pixels formed in the effective pixel region has a same incident angle directivity as at least some of the unidirectional pixels formed in external regions in the row direction and in the column direction of the matrix.

6. The imaging element according to claim 5, wherein at least one of the image restoration pixels in each row of the matrix has a same incident angle directivity in the column direction of the matrix as at least one of the unidirectional pixels provided in a same row, of the external region.

7. The imaging element according to claim 5, wherein at least one of the image restoration pixels in each column of the matrix has a same incident angle directivity in the row direction of the matrix as at least one of the unidirectional pixels provided in a same column of the external region.

8. The imaging element according to claim 5, wherein at least one of the image restoration pixels in each row of the matrix has the same incident angle directivity in the column direction of the matrix as at least one of the unidirectional pixels provided in another row of the external region.

9. The imaging element according to claim 5, wherein at least one of the image restoration pixels in each column of the matrix has the same incident angle directivity in the row direction of the matrix as at least one of the unidirectional pixels provided in another column of the external region.

10. The imaging element according to claim 5, wherein all of the image restoration pixels that are formed in the effective pixel region have a same incident angle directivity as at least one of a plurality of unidirectional pixels formed in external regions in the row direction and in the column direction of the matrix.

11. The imaging element according to claim 5, wherein some of the image restoration pixels formed in the effective pixel region have the same incident angle directivity as at least one of the unidirectional pixels formed in the external regions in the row direction and in the column direction of the matrix.

12. The imaging element according to claim 11, wherein the incident angle directivities in the row direction and in the column direction of the matrix, of other image restoration pixels than the some of the image restoration pixels formed in the effective pixel region, are able to be estimated on a basis of the incident angle directivity of the unidirectional pixel formed in the external region.

13. The imaging element according to claim 2, wherein at least one of the unidirectional pixel or one of the image restoration pixels is arranged in an arrangement order based on predetermined regularity of the incident angle directivity.

14. The imaging element according to claim 1, wherein a light shielding film is arranged for independently setting the incident angle directivity for each of the pixels.

15. The imaging element according to claim 1, further comprising:
a processor configured to generate a restoration matrix to be used when generating a restored image from a detection image obtained in the image restoration pixels, using calibration information that is information regarding calibration of the incident angle directivity of the image restoration pixels generated using the unidirectional pixel.

16. The imaging element according to claim 15, further comprising:
a memory configured to store the generated restoration matrix.

17. An imaging device comprising:
an imaging element including
a plurality of pixels each having a configuration capable of independently setting incident angle directivity for incident light incident without passage through an imaging lens and a pinhole,
the plurality of pixels including
a plurality of image restoration pixels arranged in a matrix, at least some of the pixels having the incident angle directivity both in a row direction and in a column direction of the matrix, and
a unidirectional pixel having the incident angle directivity only in the row direction of the matrix or only in the column direction of the matrix, wherein the unidirectional pixel is formed in a region other than an effective pixel region that is a region in which the image restoration pixels are arranged; and
a processor configured to generate, using an output of the unidirectional pixel, a restoration matrix to be used when generating a restored image from a detection image that is an output of the plurality of image restoration pixels.

18. The imaging device according to claim 17, wherein the processor is configured to generate the restoration matrix, using calibration information that is information generated using the output of the unidirectional pixel, and is regarding calibration of the incident angle directivity of the image restoration pixels.

19. An information processing method comprising:

generating, using an output of a unidirectional pixel, a restoration matrix to be used when generating a restored image from a detection image that is an output of a plurality of image restoration pixels, of an imaging element including a plurality of pixels each having a configuration capable of independently setting incident angle directivity for incident light incident without passage through an imaging lens and a pinhole, the plurality of pixels including the plurality of image restoration pixels arranged in a matrix, at least some of the image restoration pixels having the incident angle directivity both in a row direction and in a column direction of the matrix, and the unidirectional pixel having the incident angle directivity only in the row direction of the matrix or only in the column direction of the matrix, wherein the unidirectional pixel is formed in a region other than an effective pixel region that is a region in which the image restoration pixels are arranged.

20. The information processing method according to claim 19, wherein the restoration matrix is generated using calibration information generated using an output from the unidirectional pixel.

21. The information processing method according to claim 20, further comprising:

measuring a positional gap of a light-shielding film having a configuration capable of independently setting the incident angle directivity of the imaging element for each of the pixels, and generating the calibration information including information regarding the positional gap of the light-shielding film.

22. The information processing method according to claim 20, further comprising:

measuring a height gap of an on-chip lens of the imaging element, and generating the calibration information including information regarding the height gap of the on-chip lens.

23. The information processing method according to claim 20, further comprising:

in the unidirectional pixel, measuring a detection signal value for each of a plurality of incident angles different from one another of the incident light, and generating the calibration information using each measurement result.

24. The information processing method according to claim 20, further comprising:

in the unidirectional pixel, measuring a detection signal value for a predetermined incident angle of the incident light, and generating the calibration information using a measurement result and a reference value.

25. The information processing method according to claim 20, wherein the unidirectional pixel is one of a plurality of unidirectional pixels, and further comprising:

measuring a detection signal value of each of the plurality of the unidirectional pixels, and generating the calibration information using a statistical value of measurement results.

* * * * *